(12) United States Patent
Li et al.

(10) Patent No.: US 12,382,512 B2
(45) Date of Patent: Aug. 5, 2025

(54) CHANNEL CONTENTION METHOD AND RELATED APPARATUS

(71) Applicant: Huawei Technologies Co., Ltd., Shenzhen (CN)

(72) Inventors: Yiqing Li, Shenzhen (CN); Yunbo Li, Shenzhen (CN); Ming Gan, Shenzhen (CN); Yuchen Guo, Shenzhen (CN); Guogang Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 343 days.

(21) Appl. No.: 18/067,420

(22) Filed: Dec. 16, 2022

(65) Prior Publication Data

US 2023/0124052 A1    Apr. 20, 2023

Related U.S. Application Data

(63) Continuation of application No. PCT/CN2021/099219, filed on Jun. 9, 2021.

(30) Foreign Application Priority Data

Jun. 18, 2020 (CN) .......................... 202010562213.9

(51) Int. Cl.
*H04W 74/0833* (2024.01)
*H04W 74/08* (2009.01)

(52) U.S. Cl.
CPC ..... *H04W 74/085* (2013.01); *H04W 74/0866* (2013.01)

(58) Field of Classification Search
CPC ........... H04W 74/085; H04W 74/0866; H04W 28/08; H04W 76/15; H04W 84/12; H04W 74/0816; H04W 74/08; H04L 45/24; H04L 45/245
See application file for complete search history.

(56) References Cited

U.S. PATENT DOCUMENTS

| 2021/0211375 A1* | 7/2021 | Kwon | H04W 72/535 |
| 2021/0212118 A1* | 7/2021 | Lu | H04W 74/0816 |
| 2023/0114284 A1* | 4/2023 | Kim | H04W 74/0808 370/329 |
| 2023/0164842 A1* | 5/2023 | Jang | H04W 76/15 370/329 |

OTHER PUBLICATIONS

Sharan Naribole et al, "Multi-link TXOP Aggregation Considerations," IEEE 802.11-19/1505r2, Oct. 31, 2019, 8 pages.

(Continued)

*Primary Examiner* — Kan Yuen
(74) *Attorney, Agent, or Firm* — Conley Rose, P.C.

(57) ABSTRACT

A channel contention method includes performing, by a first station and a second station of a multi-link device (MLD), channel contention based on a first enhanced distributed channel access (EDCA) parameter; generating, by the first station and the second station, a point coordination function (PCF) inter-frame space (PIFS) access t imer when the first station performs EDCA access and the second station performs PIFS access; and performing, by the first station and the second station, channel contention based on a second EDCA parameter before the PIFS access timer backs off to 0.

20 Claims, 27 Drawing Sheets

(56) References Cited

OTHER PUBLICATIONS

Duncuan Ho et al, "MLA: Sync PPDUs", IEEE 802.11-20/0026r6, Mar. 14, 2020, 23 pages.
Liwen Chu et al, "Multiple Link Operation Follow up," IEEE 802.11-20/0487r5, Mar. 1, 2020, 15 pages.
Yongho Seok et al, "RTS and CTS Procedure in Synchronous Multi-link Operation," IEEE 802.11-20/0577r0, Apr. 13, 2020, 20 pages.
Zhou Lan et al, "STR AP Sync. PPDU Transmission," IEEE 802.11-20/0638r0, Mar. 20, 2020, 12 pages.
Draft ETSI EN 301 893 V2.0.7, "5 GHz RLAN; Harmonised Standard covering the essential requirements of article 3.2 of Directive 2014/53/EU," Nov. 2016, 123 pages.
IEEE Std 802.Nov. 2016, "IEEE Standard for Information technology—Telecommunications and information exchange between systems Local and metropolitan area networks—Specific requirements, Part 11: Wireless LAN Medium Access Control (MAC) and Physical Layer (PHY) Specifications," Dec. 7, 2016, 3534 pages.
IEEE P802.11ax/D6.0, "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," Nov. 2019, 780 pages.

\* cited by examiner

CHANNEL CONTENTION METHOD AND RELATED APPARATUS

CROSS-REFERENCE TO RELATED APPLICATIONS

This is a continuation of International Patent Application No. PCT/CN2021/099219 filed on Jun. 9, 2021, which claims priority to Chinese Patent Application No. 202010562213.9 filed on Jun. 18, 2020. The disclosures of the aforementioned applications are hereby incorporated by reference in their entireties.

TECHNICAL FIELD

This disclosure relates to the field of wireless local area network technologies, and in particular, to a channel contention method and a related apparatus.

BACKGROUND

To improve data transmission efficiency, one wireless network device may transmit data through multiple channels. For example, a multi-link device (MLD) may transmit data through multiple channels over multiple links. Alternatively, in a scenario of multiple primary channel communication and multi-segment communication, one wireless network device can also transmit data through multiple channels.

When the wireless network device needs to transmit data through multiple channels, the wireless network device needs to contend for the multiple channels, to obtain permission to use the multiple channels.

A related technology provides a channel contention solution used when an MLD performs multi-link communication. At least one access point (AP) of the MLD accesses a channel based on an enhanced distributed channel access (EDCA) mechanism when a backoff window backs off to 0. When at least one AP (or station (STA)) of the wireless device accesses a channel based on the EDCA mechanism when a backoff window backs off to 0, if a listened channel is idle within a point coordination function (PCF) inter-frame space (PIFS), remaining APs also access the channel. It can be learned a backoff window does not need to back off to 0, and these remaining APs can still access the channel.

In this way, a wireless network device that can transmit data through multiple channels has an opportunity to obtain a channel in a same frequency domain range through contention for multiple times. However, a wireless network device that needs to transmit data through a channel within the frequency domain range and that cannot simultaneously transmit data through multiple channels can access the channel only when a backoff window backs off to 0. In this way, in a channel contention process, it is unfair for these wireless network devices that cannot simultaneously transmit data through multiple channels.

SUMMARY

Embodiments of this disclosure provide a channel contention method and a related apparatus, to help improve fairness in a channel contention process.

According to a first aspect, this disclosure provides a channel contention method for an MLD. The MLD includes a first station and a second station, a link on which the first station works is a first link, a link on which the second station works is a second link, and the first station and the second station are access point stations or non-access point stations. The channel contention method includes the following.

When the first station contends for a first channel of the first link based on a first EDCA parameter set, if detecting, at a first moment, that a backoff count value of the contended first channel of the first link backs off to 0, the first station obtains a transmission opportunity of the first channel.

When the second station contends for a second channel of the second link based on the first EDCA parameter set, the second station learns that at the first moment, the backoff count value of the first channel contended by the first station backs off to 0, and the second station senses that the second channel is idle within one PIFS before the first moment. The second station obtains a transmission opportunity of the second channel.

When the second station obtains the transmission opportunity of the second channel, the first station generates a PIFS access timer of the first station, and starts backoff of a count value of the PIFS access timer of the first station, where within a backoff time before the count value of the PIFS access timer of the first station backs off to 0, the first station performs channel contention based on a second EDCA parameter, and/or when the second station obtains the transmission opportunity of the second channel, the second station generates a PIFS access timer of the second station, and starts backoff of a count value of the PIFS access timer of the second station. Within a backoff time before the count value of the PIFS access timer of the second station backs off to 0, the second station performs channel contention based on the second EDCA parameter, and at least one parameter of an arbitration inter-frame space number (AIFSN), a maximum contention window (CWmax), or a minimum contention window (CWmin) in the second EDCA parameter set is different from a corresponding parameter in the first EDCA parameter set.

For example, AIFSN corresponding to any access category (AC) in the second EDCA parameter set may be greater than, less than, or equal to AIFSN corresponding to a same AC in the first EDCA parameter set. CWmax corresponding to any AC in the second EDCA parameter set may be greater than, less than, or equal to CWmax corresponding to a same AC in the first EDCA parameter set. CWmin corresponding to any AC in the second EDCA parameter set may be greater than, less than, or equal to CWmin corresponding to a same AC in the first EDCA parameter set.

It can be learned that, in the technical solutions of this disclosure, when the first station performs EDCA access and the second station performs PIFS access, the first station and/or the second station generate/generates the PIFS access timer. In a backoff process before the PIFS access timer backs off to 0, a corresponding station performs channel contention based on the second EDCA parameter.

In this way, a parameter in the second EDCA parameter set can be appropriately set, to increase a difficulty of successfully accessing a channel by the first station and the second station in subsequent channel contention, reduce a probability of successfully accessing the channel by the first station and the second station in subsequent channel contention, and increase a probability of successfully accessing the channel by another network device. This helps limit the second station to continue to perform PIFS access in next channel contention, and can improve fairness in an access process of multiple channels.

For example, AIFSN in the second EDCA parameter set is greater than AIFSN in the first EDCA parameter set, or CWmax in the second EDCA parameter set is greater than CWmax in the first EDCA parameter set, or CWmin in the second EDCA parameter set is greater than CWmin in the first EDCA parameter set. The second EDCA parameter set may meet one or more of the foregoing three cases.

The following provides some possible implementations of the channel contention method in a backoff process before the PIFS access timer backs off to 0.

In a possible implementation, the channel contention method further includes the following.

When the second station contends for a fourth channel of the second link based on the second EDCA parameter set within the backoff time before the count value of the PIFS access timer of the second station backs off to 0, if a backoff count value of the fourth channel contended by the second station backs off to 0 at a second moment, the second station obtains a transmission opportunity of the fourth channel.

Within the backoff time before the count value of the PIFS access timer of the first station backs off to 0, the first station learns that the backoff count value of the fourth channel contended by the second station backs off to 0 at the second moment. If the first station senses that a third channel of the contended first link is idle within one PIFS before the second moment, the first station accesses the third channel through PIFS access, and increases the count value of the PIFS access timer of the first station.

The second station learns that the first station accesses the third channel at the second moment through PIFS access. The second station increases the count value of the PIFS access timer of the second station.

In another possible implementation, the channel contention method further includes the following.

When the first station contends for a third channel of the first link based on the second EDCA parameter set within the backoff time before the count value of the PIFS access timer of the first station backs off to 0, a backoff count value of the third channel contended by the first station backs off to 0 at a second moment, and the first station obtains a transmission opportunity of the third channel.

Within the backoff time before the count value of the PIFS access timer of the second station backs off to 0, the second station learns that the backoff count value of the third channel contended by the first station backs off to 0 at the second moment, and the second station senses that a fourth channel of the contended second link is idle within one PIFS before the second moment. The second station accesses the fourth channel through PIFS access, and increases the count value of the PIFS access timer of the second station.

The first station learns that the second station accesses the fourth channel at the second moment through PIFS access. The first station increases the count value of the PIFS access timer of the first station.

The third channel and the first channel in the foregoing two possible implementations may be a same channel or different channels, and the fourth channel and the second channel may be a same channel or different channels.

In the foregoing two possible implementations, after the first station obtains the transmission opportunity of the first channel and the second station obtains the transmission opportunity of the second channel, and before the PIFS access timers of the first station and the second station back off to 0, if the first station or the second station performs PIFS access again, count values of the PIFS access timers of the first station and the second station are increased, to prolong a backoff time of the PIFS access timers. In this way, backoff duration of the PIFS access timers is prolonged, so that duration in which the first station and the second station perform channel contention based on the second EDCA parameter set can be prolonged, to further increase a difficulty of successfully accessing a channel by the first station and the second station in subsequent channel contention, and increase a probability of successfully accessing the channel by another network device. This helps limit the second station to continue to perform PIFS access in next channel contention, and can improve fairness in an access process of multiple channels.

According to a second aspect, this disclosure further provides a channel contention method for a MLD. The MLD includes a first station and a second station, a link on which the first station works is a first link, a link on which the second station works is a second link, and the first station and the second station are access point stations or non-access point stations. The channel contention method includes the following.

When the second station contends for a second channel of the second link based on a first EDCA parameter set, if learning that at a first moment, a backoff count value of a first channel that is of the first link and that is contended by the first station backs off to 0, and the second channel is idle within one PIFS before the first moment, the second station obtains a transmission opportunity of the second channel.

When obtaining the transmission opportunity of the second channel, the second station generates a PIFS access timer, and starts backoff of a count value of the PIFS access timer. Before the count value of the PIFS access timer backs off to 0, the second station performs channel contention based on a second EDCA parameter set, and at least one parameter of AIFSN, CWmax, or CWmin in the second EDCA parameter set is different from a corresponding parameter in the first EDCA parameter set.

In this way, a parameter in the second EDCA parameter set can be appropriately set, to increase a difficulty of successfully accessing a channel by the first station and the second station in subsequent channel contention, reduce a probability of successfully accessing the channel by the first station and the second station in subsequent channel contention, and increase a probability of successfully accessing the channel by another network device. This helps limit the second station to continue to perform PIFS access in next channel contention, and can improve fairness in an access process of multiple channels.

For example, AIFSN in the second EDCA parameter set is greater than AIFSN in the first EDCA parameter set, or CWmax in the second EDCA parameter set is greater than CWmax in the first EDCA parameter set, or CWmin in the second EDCA parameter set is greater than CWmin in the first EDCA parameter set. The second EDCA parameter set may meet one or more of the foregoing three cases.

The following provides some possible implementations of the channel contention method in a backoff process before the PIFS access timer backs off to 0.

In a possible implementation, the method further includes the following.

When the second station contends for a fourth channel of the second link based on the second EDCA parameter set before the count value of the PIFS access timer backs off to 0, the second station learns that a backoff count value of a third channel that is of the first link and that is contended by the first station at the second moment backs off to 0, and the fourth channel is idle within one PIFS before the first moment. The second station obtains a transmission opportunity of the fourth channel.

The second station increases the count value of the PIFS access timer when obtaining the transmission opportunity of the fourth channel.

In another possible implementation, the method further includes the following.

When the second station contends for a fourth channel of the second link based on the second EDCA parameter set before the count value of the PIFS access timer backs off 0, the second station detects that a count value for contending for the fourth channel backs off to 0 at a second moment. The second station obtains a transmission opportunity of the fourth channel.

The second station learns that the first station accesses the contended channel at the second moment through PIFS access. The second station increases the count value of the PIFS access timer.

The third channel and the first channel in the foregoing two possible implementations may be a same channel or different channels, and the fourth channel and the second channel may be a same channel or different channels.

In the foregoing two possible implementations, after the first station obtains the transmission opportunity of the first channel and the second station obtains the transmission opportunity of the second channel, and before the PIFS access timers of the first station and the second station back off to 0, if the first station or the second station performs PIFS access again, count values of the PIFS access timers of the first station and the second station are increased, to prolong a backoff time of the PIFS access timers. In this way, backoff duration of the PIFS access timers is prolonged, so that duration in which the first station and the second station perform channel contention based on the second EDCA parameter set can be prolonged, to further increase a difficulty of successfully accessing a channel by the first station and the second station in subsequent channel contention, and increase a probability of successfully accessing the channel by another network device. This helps limit the second station to continue to perform PIFS access in next channel contention, and can improve fairness in an access process of multiple channels.

For related descriptions of the first station, the second station, and the second EDCA parameter set, refer to related descriptions in the channel contention method in the first aspect. Details are not described herein again.

According to a third aspect, this disclosure further provides a channel contention method for a MLD. The MLD includes a first station and a second station, a link on which the first station works is a first link, a link on which the second station works is a second link, and the first station and the second station are access point stations or non-access point stations. The channel contention method includes the following.

When the first station contends for a first channel of the first link based on a first EDCA parameter set, the first station detects, at a first moment, that a backoff count value of the contended first channel backs off to 0, and obtains a transmission opportunity of the first channel. when the first station learns that the second station accesses a second channel of the second link at the first moment through PIFS access, the first station generates a PIFS access timer, and starts backoff of a count value of the PIFS access timer. Before the count value of the PIFS access timer backs off to 0, the first station performs channel contention based on a second EDCA parameter set, and at least one parameter of AIFSN, CWmax, or CWmin in the second EDCA parameter set is different from a corresponding parameter in the first EDCA parameter set.

It can be learned that, in the technical solutions of this disclosure, when the first station performs EDCA access and the second station performs PIFS access, the first station and/or the second station generate/generates the PIFS access timer. In a backoff process before the PIFS access timer backs off to 0, a corresponding station performs channel contention based on the second EDCA parameter.

In this way, a parameter in the second EDCA parameter set can be appropriately set, to increase a difficulty of successfully accessing a channel by the first station and the second station in subsequent channel contention, reduce a probability of successfully accessing the channel by the first station and the second station in subsequent channel contention, and increase a probability of successfully accessing the channel by another network device. This helps limit the second station to continue to perform PIFS access in next channel contention, and can improve fairness in an access process of multiple channels.

For example, AIFSN in the second EDCA parameter set is greater than AIFSN in the first EDCA parameter set, or CWmax in the second EDCA parameter set is greater than CWmax in the first EDCA parameter set, or CWmin in the second EDCA parameter set is greater than CWmin in the first EDCA parameter set. The second EDCA parameter set may meet one or more of the foregoing three cases.

The following provides some possible implementations of the channel contention method in a backoff process before the PIFS access timer backs off to 0.

In a possible implementation, the channel contention method further includes, when the first station contends for a third channel of the first link based on the second EDCA parameter set before the PIFS access timer backs off to 0, a backoff count value of the third channel contended by the first station backs off to 0 at a second moment. The first station obtains a transmission opportunity of the third channel.

The first station learns that the second station accesses a fourth channel of the second link at the second moment through PIFS access. The first station increases the count value of the PIFS access timer.

In another possible implementation, the channel contention method further includes the following.

When the first station contends for a third channel of the first link based on the second EDCA parameter set before the count value of the PIFS access timer backs off to 0, the first station learns that a backoff count value of a fourth channel that is of the second link and that is contended by the second station backs off to 0 at a second moment, and the third channel is idle within one PIFS before the second moment. The first station obtains a transmission opportunity of the third channel.

The first station increases the count value of the PIFS access timer when obtaining the transmission opportunity of the third channel.

The third channel and the first channel in the foregoing two possible implementations may be a same channel or different channels, and the fourth channel and the second channel may be a same channel or different channels.

In the foregoing two possible implementations, after the first station obtains the transmission opportunity of the first channel and the second station obtains the transmission opportunity of the second channel, and before the PIFS access timers of the first station and the second station back off to 0, if the first station or the second station performs PIFS access again, count values of the PIFS access timers of the first station and the second station are increased, to prolong a backoff time of the PIFS access timers. In this way, backoff duration of the PIFS access timers is prolonged, so that duration in which the first station and the second station perform channel contention based on the second EDCA parameter set can be prolonged, to further increase a difficulty of successfully accessing a channel by the first station and the second station in subsequent channel contention, and increase a probability of successfully accessing the channel by another network device. This helps limit the second station to continue to perform PIFS access in next channel contention, and can improve fairness in an access process of multiple channels.

According to a fourth aspect, this disclosure further provides a channel contention method for an MLD. The MLD includes a first station and a second station, a link on which the first station works is a first link, a link on which the second station works is a second link, and the first station and the second station are access point stations or non-access point stations. The channel contention method includes the following.

When the second station contends for a channel of the second link, the second station learns that at a first moment, a backoff count value of a channel that is of the first link and that is contended by the first station backs off to 0, and the channel of the second link is idle within one PIFS before the first moment. The second station obtains a transmission opportunity of the channel of the second link.

The second station generates a disallow timer when obtaining the transmission opportunity of the channel of the second link, and starts backoff of a count value of the disallow timer. Within a backoff time before the disallow count value backs off to 0, the disallow timer is used for disallowing PIFS access of the second station.

The count value obtained when the disallow timer is generated may be a number of slots or may be a number of seconds. In other words, the disallow timer may perform backoff in a unit of a slot, or may perform backoff in a time unit such as second, millisecond, or microsecond.

It can be learned that, in the technical solutions of this disclosure, the disallow timer is used for limiting the second station to access a channel again through PIFS access within a period of time after the second station accesses the channel through PIFS access and obtains a transmission opportunity of the channel. This helps reduce a probability of accessing a channel consecutively by a same station through PIFS access, and improve fairness in an access process of multiple channels.

According to a fifth aspect, an embodiment of this disclosure further provides an MLD, including a first station and a second station. A link on which the first station works is a first link, a link on which the second station works is a second link. The first station and the second station are access point stations or non-access point stations.

The first station is configured to, when contending for a first channel of the first link based on a first EDCA parameter set, detect, at a first moment, that a backoff count value of the contended first channel of the first link backs off to 0, and obtain a transmission opportunity of the first channel.

The second station is configured to, when contending for a second channel of the second link based on the first EDCA parameter set, learn that at the first moment, the backoff count value of the first channel contended by the first station backs off to 0, and the second station senses that the second channel is idle within one PIFS before the first moment, and obtain a transmission opportunity of the second channel.

The first station is further configured to, when the second station obtains the transmission opportunity of the second channel, generate a PIFS access timer of the first station, and start backoff of a count value of the PIFS access timer of the first station. Within a backoff time before the count value of the PIFS access timer of the first station backs off to 0, the first station performs channel contention based on a second EDCA parameter.

The second station is further configured to, when the second station obtains the transmission opportunity of the second channel, generate a PIFS access timer of the second station, and start backoff of a count value of the PIFS access timer of the second station. Within a backoff time before the count value of the PIFS access timer of the second station backs off to 0, the second station performs channel contention based on the second EDCA parameter, and at least one parameter of an AIFSN, a CWmax, or a CWmin in the second EDCA parameter set is different from a corresponding parameter in the first EDCA parameter set.

It can be learned that, in the technical solutions of this disclosure, when the first station performs EDCA access and the second station performs PIFS access, the first station and/or the second station generate/generates the PIFS access timer. In a backoff process before the PIFS access timer backs off to 0, a corresponding station performs channel contention based on the second EDCA parameter.

In this way, a parameter in the second EDCA parameter set can be appropriately set, to increase a difficulty of successfully accessing a channel by the first station and the second station in subsequent channel contention, reduce a probability of successfully accessing the channel by the first station and the second station in subsequent channel contention, and increase a probability of successfully accessing the channel by another network device. This helps limit the second station to continue to perform PIFS access in next channel contention, and can improve fairness in an access process of multiple channels.

For example, AIFSN in the second EDCA parameter set is greater than AIFSN in the first EDCA parameter set, or CWmax in the second EDCA parameter set is greater than CWmax in the first EDCA parameter set, or CWmin in the second EDCA parameter set is greater than CWmin in the first EDCA parameter set. The second EDCA parameter set may meet one or more of the foregoing three cases.

In some possible implementations, the second station is further configured to, when the second station contends for a fourth channel of the second link based on the second EDCA parameter set within the backoff time before the count value of the PIFS access timer of the second station backs off to 0, if a backoff count value of the fourth channel contended by the second station backs off to 0 at a second moment, obtain a transmission opportunity of the fourth channel. The first station is further configured to, within the backoff time before the count value of the PIFS access timer of the first station backs off to 0, when learning that the backoff count value of the fourth channel contended by the second station backs off to 0 at the second moment, and if the first station senses that a third channel of the contended first link is idle within one PIFS before the second moment, access the third channel through PIFS access, and increase the count value of the PIFS access timer of the first station. The second station is further configured to, when learning that the first station accesses the third channel at the second moment through PIFS access, increase the count value of the PIFS access timer of the second station.

The third channel and the first channel may be a same channel or different channels, and the fourth channel and the second channel may be a same channel or different channels.

In some other possible implementations, the first station is further configured to, when the first station contends for a third channel of the first link based on the second EDCA parameter set within the backoff time before the count value of the PIFS access timer of the first station backs off to 0, if a backoff count value of the third channel contended by the first station backs off to 0 at a second moment, obtain a transmission opportunity of the third channel. The second station is further configured to, within the backoff time before the count value of the PIFS access timer of the second station backs off to 0, if learning that the backoff count value of the third channel contended by the first station backs off to 0 at the second moment, and sensing that a fourth channel of the contended second link is idle within one PIFS before the second moment, access the fourth channel through PIFS access, and increase the count value of the PIFS access timer of the second station. The first station is further configured to, when learning that the second station accesses the fourth channel at the second moment through PIFS access, increase the count value of the PIFS access timer of the first station.

The third channel and the first channel may be a same channel or different channels, and the fourth channel and the second channel may be a same channel or different channels.

According to a sixth aspect, an implementation of this disclosure provides a channel contention apparatus, applied to an MLD. The MLD includes a first station and a second station, a link on which the first station works is a first link, a link on which the second station works is a second link, and the first station and the second station are access point stations or non-access point stations. The channel contention apparatus may be deployed on the second station, and the channel contention apparatus includes a processing unit configured to, when contending for a second channel of the second link based on a first EDCA parameter set, if learning that at a first moment, a backoff count value of a first channel that is of the first link and that is contended by the first station backs off to 0, and the second channel is idle within one PIFS before the first moment, obtain a transmission opportunity of the second channel, and when obtaining the transmission opportunity of the second channel, generate a PIFS access timer, and start backoff of a count value of the PIFS access timer. Before the count value of the PIFS access timer backs off to 0, the second station performs channel contention based on a second EDCA parameter set, and at least one parameter of AIFSN, CWmax, or CWmin in the second EDCA parameter set is different from a corresponding parameter in the first EDCA parameter set.

In this way, a parameter in the second EDCA parameter set can be appropriately set, to increase a difficulty of successfully accessing a channel by the first station and the second station in subsequent channel contention, reduce a probability of successfully accessing the channel by the first station and the second station in subsequent channel contention, and increase a probability of successfully accessing the channel by another network device. This helps limit the second station to continue to perform PIFS access in next channel contention, and can improve fairness in an access process of multiple channels.

For example, AIFSN in the second EDCA parameter set is greater than AIFSN in the first EDCA parameter set, or CWmax in the second EDCA parameter set is greater than CWmax in the first EDCA parameter set, or CWmin in the second EDCA parameter set is greater than CWmin in the first EDCA parameter set. The second EDCA parameter set may meet one or more of the foregoing three cases.

In a possible implementation, the processing unit is further configured to, when contending for a fourth channel of the second link based on the second EDCA parameter set before the count value of the PIFS access timer backs off to 0, learn that a backoff count value of a third channel that is of the first link and that is contended by the first station at the second moment backs off to 0, and the fourth channel is idle within one PIFS before the first moment, and obtain a transmission opportunity of the fourth channel, and increase the count value of the PIFS access timer when obtaining the transmission opportunity of the fourth channel.

In another possible implementation, the processing unit is further configured to, when the second station contends for a fourth channel of the second link based on the second EDCA parameter set before the count value of the PIFS access timer backs off 0, if detecting that a count value for contending for the fourth channel backs off to 0 at a second moment, obtain a transmission opportunity of the fourth channel, and increase the count value of the PIFS access timer when learning that the first station accesses the contended channel at the second moment through PIFS access.

The third channel and the first channel in the foregoing two possible implementations may be a same channel or different channels, and the fourth channel and the second channel may be a same channel or different channels.

In the foregoing two possible implementations, after the first station obtains the transmission opportunity of the first channel and the second station obtains the transmission opportunity of the second channel, and before the PIFS access timers of the first station and the second station back off to 0, if the first station or the second station performs PIFS access again, count values of the PIFS access timers of the first station and the second station are increased, to prolong a backoff time of the PIFS access timers. In this way, backoff duration of the PIFS access timers is prolonged, so that duration in which the first station and the second station perform channel contention based on the second EDCA parameter set can be prolonged, to further increase a difficulty of successfully accessing a channel by the first station and the second station in subsequent channel contention, and increase a probability of successfully accessing the channel by another network device. This helps limit the second station to continue to perform PIFS access in next channel contention, and can improve fairness in an access process of multiple channels.

According to a seventh aspect, this disclosure further provides a channel contention apparatus, applied to an MLD. The MLD includes a first station and a second station, a link on which the first station works is a first link, a link on which the second station works is a second link, and the first station and the second station are access point stations or non-access point stations. The channel contention apparatus may be deployed on the first station, and the channel contention apparatus includes a processing unit configured to, when contending for a first channel of the first link based on a first EDCA parameter set, detect, at a first moment, that a backoff count value of the contended first channel backs off to 0, and obtain a transmission opportunity of the first channel, and when learning that the second station accesses a second channel of the second link at the first moment through PIFS access, generate a PIFS access timer, and start backoff of a count value of the PIFS access timer. Before the count value of the PIFS access timer backs off to 0, the first station performs channel contention based on a second EDCA parameter set, and at least one parameter of AIFSN, CWmax, or CWmin in the second EDCA parameter set is different from a corresponding parameter in the first EDCA parameter set.

It can be learned that, in the technical solutions of this disclosure, when the first station performs EDCA access and the second station performs PIFS access, the first station and/or the second station generate/generates the PIFS access timer. In a backoff process before the PIFS access timer backs off to 0, a corresponding station performs channel contention based on the second EDCA parameter.

In this way, a parameter in the second EDCA parameter set can be appropriately set, to increase a difficulty of successfully accessing a channel by the first station and the second station in subsequent channel contention, reduce a probability of successfully accessing the channel by the first station and the second station in subsequent channel contention, and increase a probability of successfully accessing the channel by another network device. This helps limit the second station to continue to perform PIFS access in next channel contention, and can improve fairness in an access process of multiple channels.

For example, AIFSN in the second EDCA parameter set is greater than AIFSN in the first EDCA parameter set, or CWmax in the second EDCA parameter set is greater than CWmax in the first EDCA parameter set, or CWmin in the second EDCA parameter set is greater than CWmin in the first EDCA parameter set. The second EDCA parameter set may meet one or more of the foregoing three cases.

In a possible implementation, the processing unit is further configured to, when contending for a third channel of the first link based on the second EDCA parameter set before the PIFS access timer backs off to 0, if a backoff count value of the third channel contended by the first station backs off to 0 at a second moment, obtain a transmission opportunity of the third channel, and increase the count value of the PIFS access timer when learning that the second station accesses the fourth channel of the second link through PIFS access at the second moment.

In another possible implementation, the processing unit is further configured to, when contending for a third channel of the first link based on the second EDCA parameter set before the count value of the PIFS access timer backs off to 0, if learning that a backoff count value of a fourth channel that is of the second link and that is contended by the second station backs off to 0 at a second moment, and the third channel is idle within one PIFS before the second moment, obtain a transmission opportunity of the third channel, and increase the count value of the PIFS access timer when obtaining the transmission opportunity of the third channel.

The third channel and the first channel in the foregoing two possible implementations may be a same channel or different channels, and the fourth channel and the second channel may be a same channel or different channels.

In the foregoing two possible implementations, after the first station obtains the transmission opportunity of the first channel and the second station obtains the transmission opportunity of the second channel, and before the PIFS access timers of the first station and the second station back off to 0, if the first station or the second station performs PIFS access again, count values of the PIFS access timers of the first station and the second station are increased, to prolong a backoff time of the PIFS access timers. In this way, backoff duration of the PIFS access timers is prolonged, so that duration in which the first station and the second station perform channel contention based on the second EDCA parameter set can be prolonged, to further increase a difficulty of successfully accessing a channel by the first station and the second station in subsequent channel contention, and increase a probability of successfully accessing the channel by another network device. This helps limit the second station to continue to perform PIFS access in next channel contention, and can improve fairness in an access process of multiple channels.

According to an eighth aspect, this disclosure further provides a second station of an MLD. The MLD includes a first station and the second station, a link on which the first station works is a first link, a link on which the second station works is a second link, and the first station and the second station are access point stations or non-access point stations. The second station includes a processing unit configured to, when contending for a channel of the second link, learn that at a first moment, a backoff count value of a channel that is of the first link and that is contended by the first station backs off to 0, and when the channel of the second link is idle within one PIFS before the first moment, obtain a transmission opportunity of the channel of the second link, and generate a disallow timer when obtaining the transmission opportunity of the channel of the second link, and start backoff of a count value of the disallow timer. Within a backoff time before the disallow count value backs off to 0, the disallow timer is used for disallowing PIFS access of the second station.

The count value obtained when the disallow timer is generated may be a number of slots or may be a number of seconds. In other words, the disallow timer may perform backoff in a unit of a slot, or may perform backoff in a time unit such as second, millisecond, or microsecond.

It can be learned that, in the technical solutions of this disclosure, the disallow timer is used for limiting the second station to access a channel again through PIFS access within a period of time after the second station accesses the channel through PIFS access and obtains a transmission opportunity of the channel. This helps reduce a probability of accessing a channel consecutively by a same station through PIFS access, and improve fairness in an access process of multiple channels.

According to a ninth aspect, this disclosure further provides a second station of an MLD. The MLD includes a first station and the second station, a link on which the first station works is a first link, a link on which the second station works is a second link, and the first station and the second station are access point stations or non-access point stations. The second station includes a processor, the processor is coupled to a memory. When the processor executes a computer program or instructions in the memory, the method according to the second aspect is performed, or the method according to the fourth aspect is performed.

According to a tenth aspect, this disclosure further provides a first station of an MLD. The MLD includes a first station and the second station, a link on which the first station works is a first link, a link on which the second station works is a second link, and the first station and the second station are access point stations or non-access point stations. The second station includes a processor, the processor is coupled to a memory. When the processor executes a computer program or instructions in the memory, the method according to the third aspect is performed.

According to an eleventh aspect, this disclosure further provides an MLD, including the second station in the ninth aspect and the first station in the tenth aspect.

According to a twelfth aspect, an implementation of this disclosure further provides a computer-readable storage medium. The computer-readable storage medium stores computer instructions, and the computer instructions instruct a channel contention apparatus to perform the method according to any one of the implementations of the second aspect to the fourth aspect.

According to a thirteenth aspect, an implementation of this disclosure further provides a computer program product. The computer program product includes a computer program. When the computer program runs on a computer, the computer is enabled to perform the method according to any one of the implementations of the second aspect to the fourth aspect.

According to a fourteenth aspect, this disclosure further provides a processor configured to perform the method according to one of the implementations of the second aspect to the fourth aspect. In a process of performing these methods, a process of sending the information and a process of receiving the information in the methods may be understood as a process of outputting the information by the processor and a process of receiving the input information by the processor. Further, when outputting the information, the processor outputs the information to a transceiver, so that the transceiver transmits the information.

Still further, after the information is output by the processor, other processing may further need to be performed before the information arrives at the transceiver. Similarly, when the processor receives the input information, the transceiver receives the information and inputs the information into the processor. Still further, after the transceiver receives the information, other processing may need to be performed on the information before the information is input into the processor.

In this case, for operations such as transmission, sending, and receiving related to the processor, if there is no particular statement, or if the operations do not contradict an actual function or internal logic of the operations in related descriptions, the operations may be more generally understood as operations such as output, receiving, and input of the processor, instead of operations such as transmission, sending, and receiving directly performed by a radio frequency circuit and an antenna.

In a specific implementation process, the processor may be a processor specially configured to perform these methods, or a processor, for example, a general-purpose processor, that executes computer instructions in a memory to perform these methods. The memory may be a non-transitory memory such as a read-only memory (ROM). The memory and the processor may be integrated on a same chip, or may be separately disposed on different chips. A type of the memory and a manner of disposing the memory and the processor are not limited in implementations of the present disclosure.

According to a fifteenth aspect, this disclosure provides a chip system. The chip system includes a processor and an interface configured to support a communication transmission device in implementing the functions in the methods according to the second aspect to the fourth aspect, for example, determining or processing at least one of data or information in the foregoing methods. In a possible design, the chip system further includes a memory, and the memory is configured to store information and data that are necessary for the channel contention apparatus. The chip system may include a chip, or may include a chip and another discrete component.

According to a sixteenth aspect, this disclosure provides a functional entity. The functional entity is configured to implement the method according to any one of the second aspect to the fourth aspect.

DESCRIPTION OF EMBODIMENTS

The following describes technical solutions of this disclosure with reference to accompanying drawings.

Figure 1:
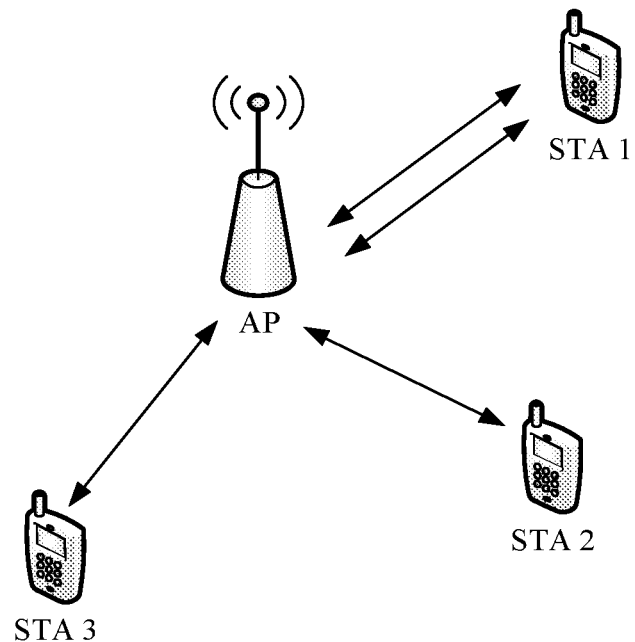
FIG. 1 is a schematic diagram of a network architecture of a communication system according to an embodiment of this disclosure.

FIG. 1 is a schematic diagram of an architecture of a communication system according to an embodiment of this disclosure. The communication system includes an access point device and a station device. An MLD in embodiments of this disclosure may be a station device, or may be an access point device. If the MLD is an access point device, the MLD includes one or more access points (APs). If the MLD is a station device, the MLD includes one or more stations (STAs). The architecture may also be extensively used in an application scenario in which a base station (BS) and a terminal device (or a user equipment (UE)) are included. The AP may be an access point used for a mobile user to access a wired network. The AP is mainly deployed inside a house, a building, and a campus, with a typical coverage radius of tens of meters to hundreds of meters. Certainly, the AP may alternatively be deployed outdoors. The AP is equivalent to a bridge that connects the wired network and a wireless network. The AP is mainly used to connect wireless network clients to each other, and then connect the wireless network to the Ethernet. Further, the AP may be a terminal device or network device with a WI-FI chip. The AP may be a device that supports the Institute of Electrical and Electronics Engineers (IEEE) 802.11ax standard. Alternatively, the AP may be a device that supports multiple wireless local area network (WLAN) standards such as 802.11ac, 802.11n, 802.11g, 802.11b, and 802.11a. The STA may be a wireless communication chip, a wireless sensor, or a wireless communication terminal, for example, a mobile phone that supports a WI-FI communication function, a tablet computer that supports a WI-FI communication function, a set-top box that supports a WI-FI communication function, a smart television that supports a WI-FI communication function, a smart wearable device that supports a WI-FI communication function, a vehicle-mounted communication device that supports a WI-FI communication function, or a computer that supports a WI-FI communication function. Optionally, the STA may support the 802.11ax standard. The STA may also support multiple WLAN standards such as 802.11ac, 802.11n, 802.11g, 802.11b, and 802.11a.

The MLD is a wireless communication device that supports parallel transmission of multiple links, for example, referred to as an MLD or a multi-band device. Compared with a device that supports only single-link transmission, the MLD has higher transmission efficiency and a higher throughput.

The MLD includes one or more affiliated STAs. The affiliated STA is a logical station and may work on one link.

A link is determined based on an operating frequency band of a station or the operating frequency band and a channel of the station. One frequency band may include multiple channels. If multiple stations work on different frequency bands, the multiple stations work on different links. Alternatively, if the multiple stations work on a same frequency band but different channels, the multiple stations also work on different links.

The affiliated station may be an access point (AP) or a non-access point station (non-AP STA). For ease of description, in this disclosure, an MLD whose affiliated station is an AP may be referred to as a multi-link AP, a multi-link AP device, or an AP MLD. An MLD whose affiliated station is a non-AP STA may be referred to as a multi-link STA, a multi-link STA device, or a STA MLD.

The MLD may implement wireless communication according to 802.11 series protocols. For example, a device complying with an Extremely High Throughput (EHT), or a device complying with 802.11be or compatible with a station supporting 802.11be implements communication with another device. Certainly, the other device may be a MLD, or may not be a MLD.

Figure 2:
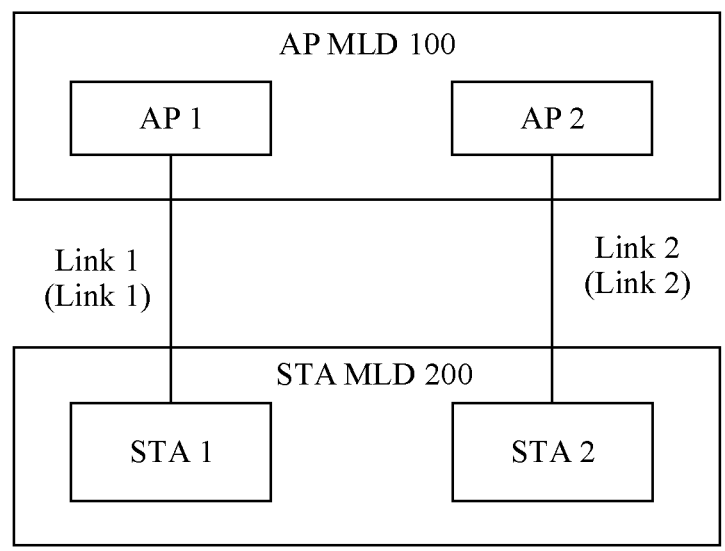
FIG. 2 is a schematic diagram of a communication scenario of a multi-link communication device in a multi-link system according to an embodiment of this disclosure.

FIG. 2 is a schematic diagram of a communication scenario of a multi-link communication device in a multi-link system according to an embodiment of this disclosure. The multi-link communication system 100 includes an AP MLD 100 and a STA MLD 200. The AP MLD 100 includes multiple APs (for example, an AP 1, an AP 2, . . . , in FIG. 2), and the STA MLD 200 includes multiple STAs (for example, a STA 1, a STA 2, . . . , in FIG. 2). The AP 1 and the STA 1 perform access and transmission on one frequency band, and the AP 2 and the STA 2 perform channel access and data transmission on one frequency band. In this way, a link 1 is formed between the AP 1 and the STA 1, and a link 2 is formed between the AP 2 and the STA 2. The AP MLD 100 and the STA MLD 200 communicate based on the link 1 and the link 2 to form MLD communication.

Figure 3B:
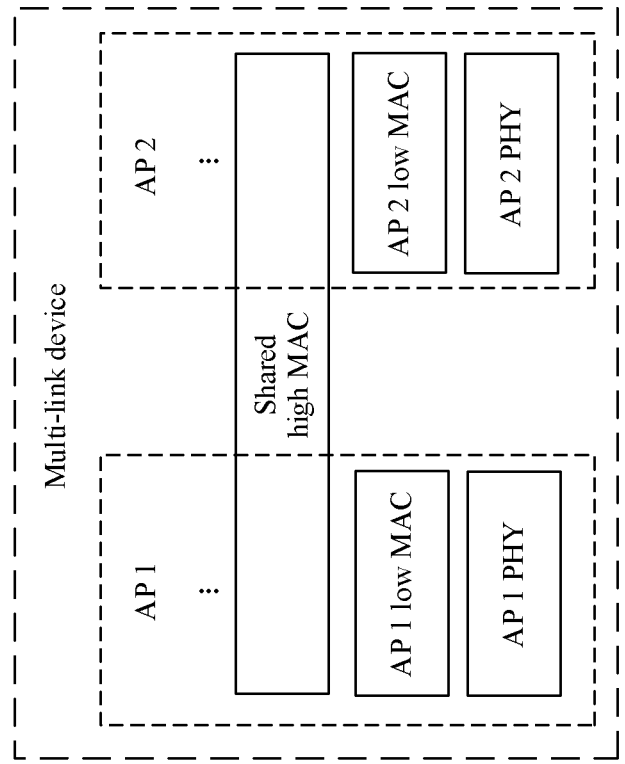
FIG. 3A and FIG. 3B are schematic diagrams of a structure of an MLD according to an embodiment of this disclosure.
Figure 3A:
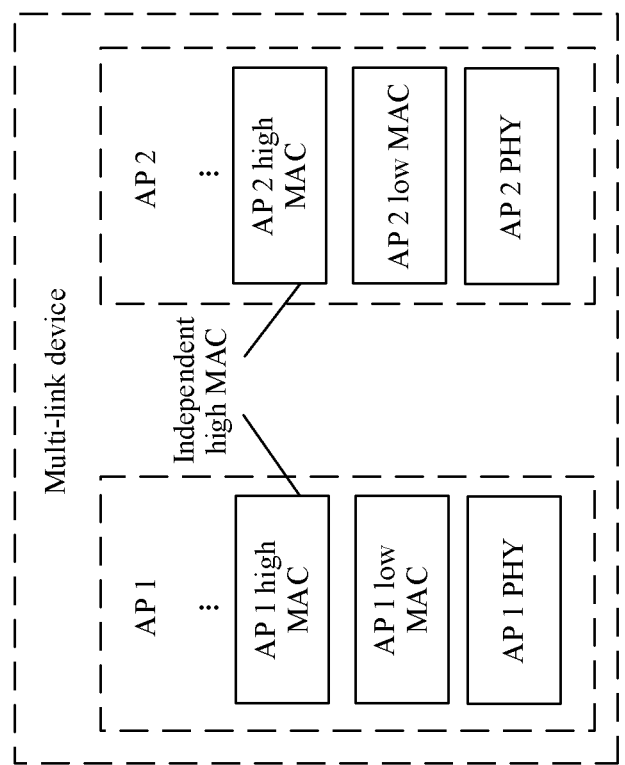

FIG. 3A and FIG. 3B are schematic diagrams of a structure of an MLD according to an embodiment of this disclosure. The 802.11 standard focuses on an 802.11 physical layer (PHY) part and a media access control (MAC) layer part in a MLD. As shown in FIG. 3A, multiple APs included in the MLD are independent of each other at a low MAC layer and a PHY layer, and are also independent of each other at a high MAC layer. As shown in FIG. 3B, multiple APs included in the MLD are independent of each other at a low MAC layer and a PHY layer, and share a high MAC layer. A schematic diagram of an internal structure of the MLD is not limited in this embodiment of this disclosure. FIGS. 3A and 3B are merely an example for description. For example, the high MAC layer or the low MAC layer may be implemented by one processor in a chip system of the MLD, or may be implemented by different processing modules in a chip system.

For example, the MLD in embodiments of this disclosure may be a single-antenna device, or may be a multi-antenna device. For example, the MLD may be a device with more than two antennas. A number of antennas included in the MLD is not limited in this embodiment of this disclosure. In embodiments of this disclosure, the MLD may allow services of a same access type to be transmitted on different links, or even allow same data packets to be transmitted on different links. Alternatively, the MLD may not allow services of a same access type to be transmitted on different links, but may allow services of different access types to be transmitted on different links. The MLD can work on a frequency band of sub 1 gigahertz (GHz), 2.4 GHz, 5 GHz, 6 GHz, and a high frequency band of 60 GHz.

For example, the MLD is an apparatus having a wireless communication function. The apparatus may be a device of an entire system, or may be a chip, a processing system, or the like installed in the device of the entire system. The device on which the chip or the processing system is installed may be controlled by the chip or the processing system, to implement the method and functions in embodiments of this disclosure. For example, the multi-link STA in embodiments of this disclosure has a wireless transceiver function, may support the 802.11 series protocols, and may communicate with the multi-link AP, another multi-link STA, or a single-link device. For example, the multi-link STA is any user communication device that allows a user to communicate with an AP and then with the WLAN. For example, the multi-link STA may be user equipment that can access a network, for example, a tablet computer, a desktop computer, a laptop computer, a notebook computer, an ultra-mobile personal computer (UMPC), a handheld computer, a netbook, a personal digital assistant (PDA), or a mobile phone, or may be an Internet of Things node in the Internet of Things, an in-vehicle communication apparatus in the internet of vehicles, or the like. The multi-link STA may alternatively be a chip or a processing system in the foregoing terminals. The multi-link AP in embodiments of this disclosure is an apparatus that provides a service to the multi-link STA, and may support the 802.11 series protocols. For example, the multi-link AP may be a communication entity such as a communication server, a router, a switch, or a network bridge, or the multi-link AP may include various forms of macro base stations, micro base stations, relay stations, or the like. Certainly, the multi-link AP may further be a chip and a processing system in the various forms of devices, to implement the method and functions in embodiments of this disclosure. In addition, the MLD may support high-rate and low-latency transmission. With continuous evolution of application scenarios of a wireless local area network, the MLD may be further applied to more scenarios, for example, a sensor node (for example, a smart water meter, a smart electricity meter, and a smart air detection node) in a smart city, a smart device (for example, a smart camera, a projector, a display, a television, a stereo, a refrigerator, and a washing machine) in a smart home, a node in an Internet of things, an entertainment terminal (for example, a wearable device such as an augmented reality (AR) and a virtual reality (VR)), a smart device (for example, a printer or a projector) in a smart office, an Internet of vehicles device in an Internet of vehicles, and some infrastructures (for example, a vending machine, a self-service navigation console in a supermarket, a self-service cash register, and a self-service ordering machine) in a daily life scenario. Specific forms of the multi-link STA and the multi-link AP are not limited in embodiments of this disclosure, and are merely examples for description herein. The 802.11 protocol may be a protocol that supports 802.11be or is compatible with 802.11be.

Figure 4A:
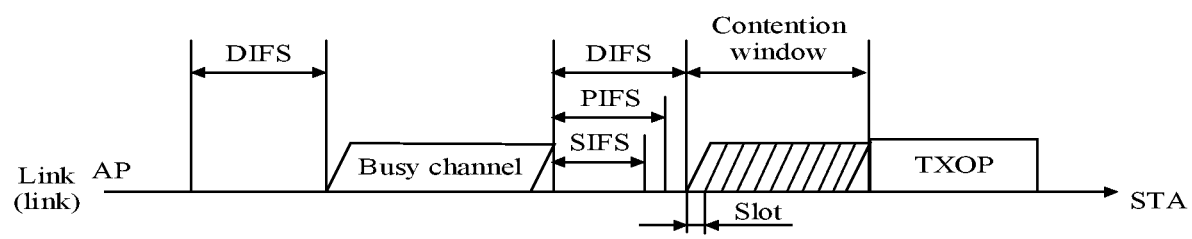
FIG. 4A is a schematic diagram of a scenario of accessing a channel based on a carrier-sense multiple access with collision avoidance (CSMA/CA) mechanism.

To ensure that a link between an access point (AP) and a station (STA) can access a channel and do not collide with each other, the 802.11 standard uses the CSMA/CA mechanism. The mechanism is called a distributed coordination function (DCF). FIG. 4A is a schematic diagram of a scenario of accessing a channel based on a CSMA/CA mechanism. When an AP needs to transmit data, the AP first listens to a channel for one fixed duration to perform a clear channel assessment (CCA). If the channel is idle, a STA obtains a transmission opportunity of the channel. If the channel is busy, the STA needs to delay for one fixed duration. If sensing, within the delayed fixed duration, that the channel is continuously idle, the AP selects a value from a contention window (CW) as a backoff count value (or back off counter), and perform random backoff (BO) by using the backoff count value. If the backoff count value is 0, the AP considers that the channel is idle and obtains a transmission opportunity (TXOP) of the channel. If transmission fails after the AP obtains the transmission opportunity, the AP determines a backoff count value from the CW again, starts backoff of the backoff count value, and obtains a transmission opportunity of the contended channel again when the backoff count value backs off to 0. This backoff count value is greater than the backoff count value of the previous channel contention. The fixed duration may be, for example, a distributed coordination function inter-frame space (DIFS), a PIFS, and a short inter-frame space (SIFS).

Figure 4B:
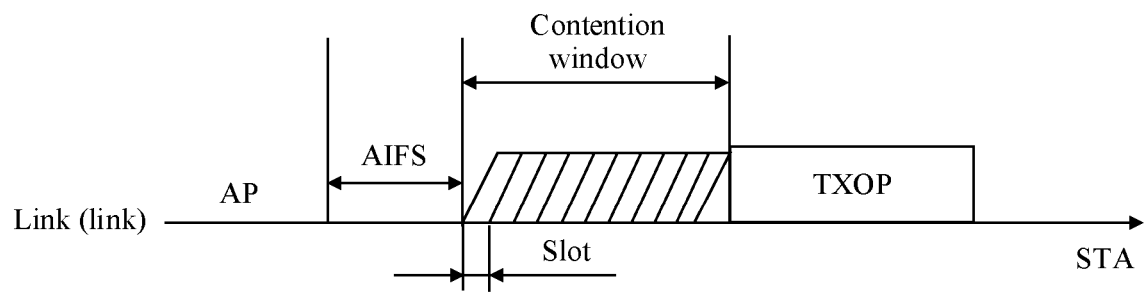
FIG. 4B is a schematic diagram of a scenario of accessing a channel based on an EDCA mechanism.

An EDCA mechanism is an enhanced DCF mechanism. In the EDCA mechanism, four access categories (ACs) are defined, and each AP corresponds to one AC. An EDCA parameter set includes an EDCA parameter corresponding to each AC. The EDCA parameter set includes a CWmin, a CWmax CWmax, an AIFSN, a TXOP limit, and the like that are corresponding to each AC. The AIFSN is used for determining the AIFS. In an access solution based on the EDCA mechanism, the AP contends for a channel based on an EDCA parameter corresponding to an AC of the AP in the EDCA parameter set. FIG. 4B is a schematic diagram of a scenario of accessing a channel based on an EDCA mechanism. In a scenario of contending for a channel based on the EDCA mechanism, when contending for the channel, an AP first performs listening on the channel for one AIFS, and listens to whether the channel is idle within the AIFS. When sensing that the channel is idle within the AIFS, the AP determines a CW from [CWmin, CWmax], then determines a random value from (0, CW] as a backoff count value of a contended channel of this link, and starts backoff of the backoff count value. CWmin and CWmax are CWmin and CWmax in the EDCA parameter set. When the backoff count value backs off to 0, a transmission opportunity of the channel in a period of time is obtained. If the channel contended by the AP changes to a busy state in a backoff process of the backoff count value, the AP reserves a remaining backoff count value, and when the AP senses that the channel is idle within one AIFS again, the AP continues backoff of the remaining backoff count value. After the transmission opportunity obtained by the AP ends, the AP enters a state of channel contention again, and when sensing that a contended channel is idle within an AIFS, the AP regenerates a backoff count value, and starts backoff. AIFS=SIFS+a slot time+AIFSN, where a slot time is one slot duration. One slot duration is 9 microseconds.

Multiple APs or multiple STAs of an MLD can implement data transmission on multiple links on different frequency bands. MLDs can be classified into a simultaneous transmitting and receiving (STR) MLD that has a capability of simultaneous transmitting and receiving and a non-STR MLD that does not have a capability of simultaneous transmitting and receiving. Multiple links for data transmission of the non-STR MLD may interfere with each other. When the non-STR MLD receives data over one link, data sending over a link whose operating frequency is close to that of the link may be affected. When the non-STR MLD sends data over one link, data receiving over a link whose operating frequency is close to that of the link may be affected.

A link is established between the AP and the STA. Data can be transmitted over one link through one or more channels. The AP or the STA may transmit data to each other through a channel of the link. When the AP or the STA needs to transmit data over a link between the AP and the STA, the AP or the STA needs to contend with another wireless network device for a channel of the link. When a transmission opportunity of the channel is obtained, the link between the AP and the STA accesses the channel, and the AP or the STA transmits the data through the channel.

In a multi-link communication scenario, the MLD may send data over one link and receive data over another link. However, the non-STR MLD does not have a capability of sending data over one link and receiving data over another link. If the non-STR MLD sends data over one link and receive data over another link, data sending or receiving may fail.

To avoid sending data over one link while receiving data over another link by the non-STR MLD, in a related technology, the non-STR MLD uses a multi-link synchronous channel access solution. In this way, multiple links synchronously access a channel and start data transmission, to avoid sending data over one link while receiving data over another link.

Figure 5:
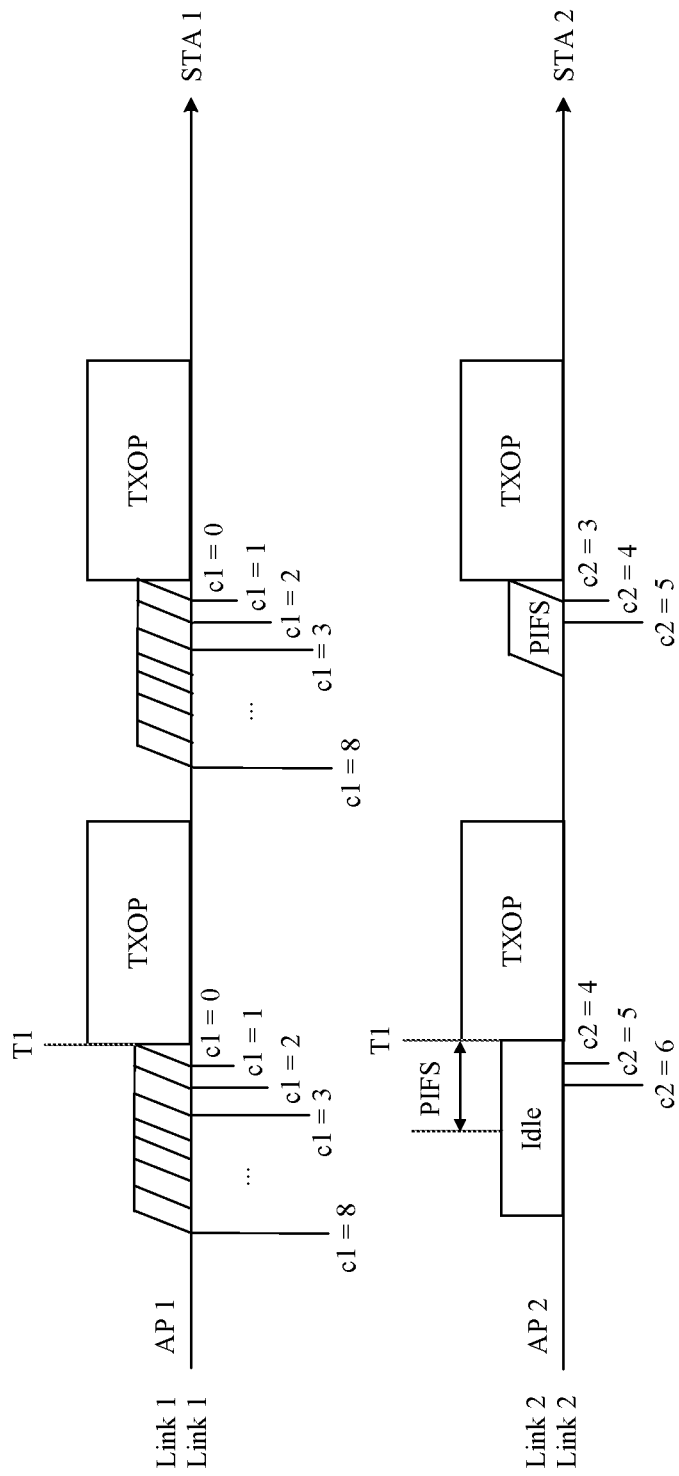
FIG. 5 is a schematic diagram of a scenario of a synchronous channel access solution of a MLD.

FIG. 5 is a schematic diagram of a scenario of a synchronous channel access solution of a MLD according to a related technology. The synchronous channel access solution may be used in a scenario in which an AP or a STA of an MLD contends for a channel. The scenario in which the AP contends for the channel is used as an example. An AP (AP 1) in the MLD transmits a signal to a STA 1 over a link 1, and another AP (AP 2) of the MLD transmits a signal to a STA 2 over a link 2. When the AP 1 needs to transmit data to the STA 1, the AP 1 first contends for a channel of the link 1, to obtain a transmission opportunity of the channel of the link 1. The AP 1 accesses the channel, and then the AP 1 transmits the data to the STA through the channel.

Based on an EDCA mechanism, a backoff count value c1 for contending for the channel of the link 1 at a first moment T1 by the AP 1 backs off to 0. The AP 1 accesses the channel of the link 1, to obtain the transmission opportunity of the channel. This access mode can be considered as EDCA access.

For any AP (for example, the AP 2) in APs other than the AP 1 of the MLD, when the backoff count value of the AP 1 of the MLD backs off to 0, if a channel that is contended by the AP 2 and that is of the link 2 is idle within one PIFS before the first moment T1 at which the backoff count value of the AP 1 backs off to 0, the AP 2 may also access the channel. This access mode can be considered as PIFS access. A PIFS is a SIFS plus a slot.

In the example shown in FIG. 5, within one PIFS before the first moment T1 at which the backoff count value of the AP 1 backs off to 0, the channel that is contended by the AP 2 and that is of the link 2 is idle, and the AP 2 is in a backoff state at the first moment. In another example, when the AP performs PIFS access, the AP may not start backoff, and is in a phase of listening to a channel for one AIFS.

It can be learned that, in EDCA access, a backoff count value of a channel that is of a current link and that is contended by the AP needs to back off to 0. However, during PIFS access, a backoff count value of a channel that is of a current link and that is contended by the AP is not required to back off to 0. At a moment at which a backoff count value of a channel that is of a current link and that is contended by one AP of the MLD backs off to 0 to perform EDCA access, if another AP of the MLD senses that the contended channel is idle within one PIFS before the moment, the other AP of the MLD may access the channel through PIFS access. The current link is a link used by the AP to transmit data to a STA.

In such a synchronous channel access solution, an AP or a STA may perform EDCA access for multiple times, and some other APs or STAs may not back off to 0 for multiple times, and perform PIFS access. This is unfair for a single-link device and another wireless network device that cannot simultaneously perform data transmission through multiple channels.

Therefore, embodiments of this disclosure provide some channel contention solutions that can improve fairness in a multiple channel access process.

The channel contention solution in embodiments of this disclosure may be used in a scenario in which a wireless network device accesses multiple channels. For example, a scenario in which multiple APs or STAs of a MLD synchronously access multiple channels, or a scenario in which a wireless network device accesses multiple channels during multiple primary channel communication or multi-segment communication. In embodiments of this disclosure, a process in which multiple APs of a MLD access multiple channels is used as an example for description.

The MLD includes an AP 1 and an AP 2. The AP 1 transmits data with a STA 1 over a link 1, and the AP 2 transmits data with a STA 2 over a link 2. The AP 1 and the AP 2 may communicate with each other. The AP 1 may be understood as a first station, and the AP 2 may be understood as a second station. The STA 1 and the STA 2 may be deployed on a same communication device, or may be separately deployed on different communication devices. It may be understood that when the STA 1 and the STA 2 are deployed on a same communication device, the same communication device is a STA MLD.

In the first channel contention solution provided in embodiments of this disclosure, the AP of the MLD contends for the channel based on the EDCA mechanism. An EDCA parameter set is deployed on each AP of the MLD. Each AP may contend for a channel based on the EDCA parameter set of the AP. In this solution, a new EDCA parameter set is provided. The AP 1 of the MLD performs EDCA access at a first moment, and the AP 2 performs PIFS access when learning that the AP 1 performs EDCA access. In a period of time after the first moment, the AP (AP 1) that performs EDCA access and/or the AP (AP 2) that performs PIFS access perform/performs subsequent channel contention based on a new EDCA parameter. In this solution, a new EDCA parameter can be appropriately set to increase a difficulty of successfully accessing a channel by the AP (for example, the AP 2) that performs PIFS access in subsequent channel contention, reduce a probability of successfully accessing the channel by the AP that performs PIFS access in subsequent channel contention, and increase a probability of accessing the channel by another network device. This helps improve fairness in an access process of multiple channels. The following describes the channel contention solution in detail with reference to a channel contention method in embodiments of this disclosure.

Figure 6:
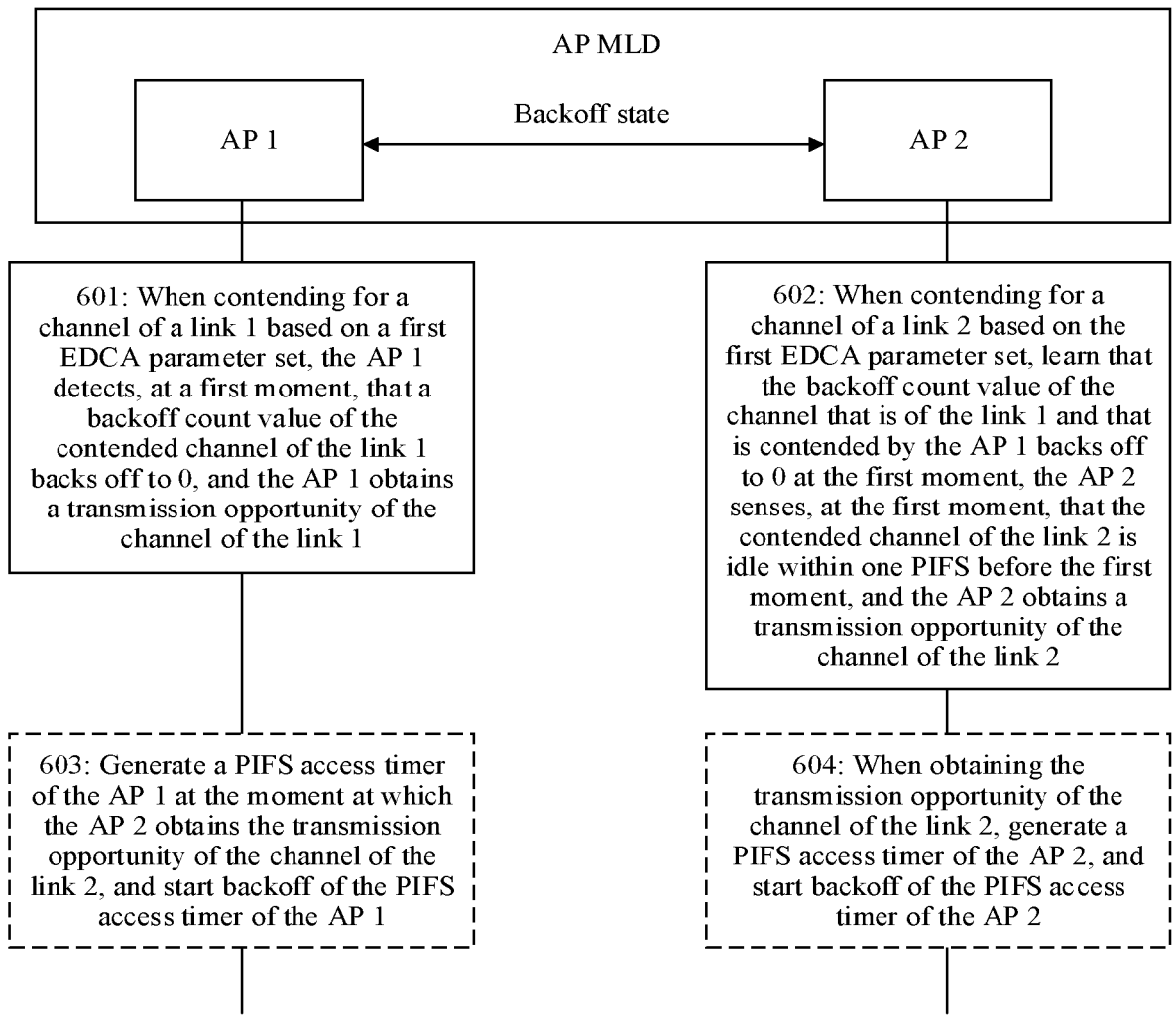
FIG. 6 is a schematic flowchart of a channel contention method according to an embodiment of this disclosure.

FIG. 6 is a schematic flowchart of a channel contention method according to an embodiment of this disclosure. The channel contention method may include the following steps.

601: When contending for a channel of a link 1 based on a first EDCA parameter set, an AP 1 detects, at a first moment, that a backoff count value of the contended channel of the link 1 backs off to 0, and the AP 1 obtains a TXOP of the channel of the link 1.

602: When contending for a channel of a link 2 based on the first EDCA parameter set, an AP 2 learns that the backoff count value of the channel that is of the link 1 and that is contended by the AP 1 backs off to 0 at the first moment, the AP 2 senses, at the first moment, that the contended channel of the link 2 is idle within one PIFS before the first moment, and the AP 2 obtains a transmission opportunity of the channel of the link 2.

In this embodiment, the AP 2 learns, at the first moment or a time point close to the first moment, that the backoff count value of the channel that is of the link 1 and that is contended by the AP 1 backs off to 0 at the first moment. The AP 2 obtains the transmission opportunity of the channel of the link 2 at the first moment or a time point close to the first moment. To be specific, the AP 2 learns, at the first moment or the time point close to the first moment, that the AP 1 performs EDCA access at the first moment, and the AP 2 obtains the transmission opportunity of the channel of the link 2 at the first moment or the time point close to the first moment. There may be deviation between a moment at which the AP 2 obtains the transmission opportunity of the channel of the link 2 and the first moment. For ease of description, in an example in this disclosure, an example in which the AP 2 obtains the transmission opportunity of the channel of the link 2 at the first moment is used for description.

The channel contention method further includes at least one of the following step 603 and step 604.

603: The AP 1 generates a PIFS access timer (PIFSAccessTimer[AC]) of the AP 1 at the moment at which the AP 2 obtains the transmission opportunity of the channel of the link 2, and starts backoff of the PIFS access timer of the AP 1. After the transmission opportunity that is of the channel of the link 1 and that is obtained by the AP 1 at the first moment ends, within a backoff time before the PIFS access timer of the AP 1 backs off to 0, the AP 1 performs channel contention based on a second EDCA parameter. For example, within a backoff time in which the PIFS access timer of the AP 1 backs off to 0, the AP 1 determines a contention window based on the second EDCA parameter.

604: When obtaining the transmission opportunity of the channel of the link 2, the AP 2 generates a PIFS access timer of the AP 2, and starts backoff of the PIFS access timer of the AP 2. After the transmission opportunity of the channel of the link 2 ends and before the PIFS access timer of the AP 2 backs off to 0, the AP 2 performs channel contention based on the second EDCA parameter. For example, within a backoff time in which the PIFS access timer of the AP 2 backs off to 0, the AP 2 determines a contention window based on the second EDCA parameter.

After the AP 1 and/or the AP 2 generate/generates the PIFS access timer, the AP 1 and/or the AP 2 back/backs off based on a count value of the PIFS access timer. When a remaining count value of the PIFS access timer is 0, it is considered that the PIFS access timer backs off to 0.

When the AP 1 and/or the AP 2 generate/generates the PIFS access timer, a count value obtained when the PIFS access timer is generated may be fixed, or may be default, for example, may be specified in a communication standard. Alternatively, a backoff count value obtained when the PIFS access timer is generated may dynamically change, for example, may be set by an AP.

The AP may send, to a STA that receives a signal transmitted by the AP, the set count value generated by the PIFS access timer. For example, the AP may send, to the STA by using a beacon frame, a probe request frame, or a probe response frame, the count value obtained when the PIFS access timer is generated.

The STA that receives the signal transmitted by the AP may first detect whether the count value obtained when the PIFS access timer is generated exists in the beacon frame, the probe request frame, or the probe response frame sent by the AP. If the count value exists, the STA obtains, from the beacon frame, the probe request frame, or the probe response frame sent by the AP, the count value obtained when the PIFS access timer is generated. If the count value does not exist, in other words, if the STA does not obtain, from the AP, the count value obtained when the PIFS access timer is generated, the STA determines that the count value obtained when the PIFS access timer is generated is a default value.

The count value obtained when the PIFS access timer is generated may be a number of slots or may be a number of seconds. In other words, the PIFS access timer may perform backoff in a unit of a slot, or may perform backoff in a time unit such as second, millisecond, or microsecond. One slot is 9 microseconds.

The AP 2 may obtain, by interacting with the AP 1, a backoff state of the backoff count value of the channel that is of the link 1 and that is contended by the AP 1. The AP 1 may also obtain, by interacting with the AP 2, a backoff state of a backoff count value of the channel that is of the link 2 and that is contended by the AP 2. For example, the AP 1 and the AP 2 may send backoff states of backoff count values to each other at a specific frequency. Alternatively, the AP 2 may send a request to the AP 1, to request the AP 1 to send the backoff state of the backoff count value of the contended channel of the link 1, and the AP 1 sends, based on the request sent by the AP 2, the backoff state of the backoff count value of the contended channel of the link 1 to the AP 2. The AP 1 may send a request to the AP 2, to request the AP 2 to send the backoff state of the backoff count value of the contended channel of the link 2. The AP 2 sends, based on the request sent by the AP 1, the backoff state of the backoff count value of the contended channel of the link 2 to the AP 1.

In a possible implementation, the AP 2 obtains, at a moment (for example, T0) before the first moment, a remaining backoff count value of the channel that is of the link 1 and that is contended by the AP 1. In this way, the AP 2 can obtain, through calculation based on the remaining backoff count value of the channel that is of the link 1 and that is contended by the AP 1 at T0, that the backoff count value of the channel that is of the link 1 and that is contended by the AP 1 at the first moment backs off to 0. For example, if the AP 2 learns, at a moment of five slots before the first moment, that the remaining backoff count value of the channel that is of the link 1 and that is contended by the AP 1 is five slots, the AP 2 can learn that the remaining backoff count value of the channel that is of the link 1 and that is contended by the AP 1 at the first moment is 0.

It should be understood that a manner in which the AP 2 obtains the backoff state of the backoff count value of the channel that is of the link 1 and that is contended by the AP 1 and a manner in which the AP 1 obtains the backoff count value of the channel that is of the link 2 and that is contended by the AP 2 are merely used for description. A manner in which the AP 2 obtains the backoff state of the backoff count value of the channel that is of the link 1 and that is contended by the AP 1 is not limited in this embodiment of this disclosure, and a manner in which the AP 1 obtains the backoff state of the backoff count value of the channel that is of the link 1 and that is contended by the AP 2. In another embodiment, the AP 1 and the AP 2 may alternatively obtain the backoff state of the backoff count value of each other in another manner. For example, the AP 1 and the AP 2 share a MAC layer, and share the backoff states of the backoff count values of the AP 1 and the AP 2. In this way, the AP 1 and the AP 2 may obtain the backoff state of the backoff count value of each other by using the shared MAC layer.

An EDCA parameter set includes multiple parameters. Further, the first EDCA parameter set includes multiple AIFSNs corresponding to each of multiple ACs, multiple CWmaxs corresponding to each of the multiple ACs, and multiple CWmins respectively corresponding to the multiple ACs. The second EDCA parameter set includes multiple AIFSNs corresponding to each of multiple ACs, multiple CWmaxs corresponding to each of the multiple ACs, and multiple CWmins respectively corresponding to the multiple ACs.

A parameter value of at least one parameter of AIFSN, CWmax, and CWmin in the second EDCA parameter set is different from a value of a parameter of a corresponding AC in the first EDCA parameter set.

Further, AIFSN corresponding to any AC in the second EDCA parameter set may be greater than, less than, or equal to AIFSN corresponding to a same AC in the first EDCA parameter set. CWmax corresponding to any AC in the second EDCA parameter set may be greater than, less than, or equal to CWmax corresponding to a same AC in the first EDCA parameter set. CWmin corresponding to any AC in the second EDCA parameter set may be greater than, less than, or equal to CWmin corresponding to a same AC in the first EDCA parameter set.

The first EDCA parameter set may further include a TXOP limit corresponding to each AC, and the second EDCA parameter set may further include a TXOP limit corresponding to each AC. A TXOP limit corresponding to any AC in the first EDCA parameter set may be the same as a TXOP limit corresponding to a same AC in the second EDCA parameter set.

The second EDCA parameter set may be preset, or may be determined by an MLD. If the second EDCA parameter set is determined by an AP MLD, the AP MLD sends the second EDCA parameter set to a STA that receives a signal transmitted by the MLD. For example, the AP MLD may send, by using one of a beacon frame, a probe request frame, or a probe response frame, the second EDCA parameter set to the STA that receives the signal transmitted by the MLD.

The STA that receives the signal transmitted by the MLD may first detect whether the count value obtained when the PIFS access timer is generated exists in the beacon frame, the probe request frame, or the probe response frame sent by the MLD. If the count value exists, the STA obtains, from the beacon frame, the probe request frame, or the probe response frame sent by the MLD, the second EDCA parameter set. If the count value does not exist, in other words, if the STA does not obtain, from the MLD, the second EDCA parameter set, the STA determines that the second EDCA parameter set is a default value.

In the technical solution of this disclosure, after the AP 2 accesses the channel through PIFS access, in a next period of time, the AP 1 and/or the AP 2 perform/performs next channel contention based on the second EDCA parameter set. In this way, a parameter in the second EDCA parameter set can be appropriately set, to increase a difficulty of successfully accessing a channel by the AP 1 and the AP 2 in subsequent channel contention, reduce a probability of successfully accessing the channel by the AP 1 and the AP 2 in subsequent channel contention, and increase a probability of successfully accessing the channel by another network device. This helps improve fairness in an access process of multiple channels.

In a possible implementation, AIFSN, CWmax, and CWmin in the second EDCA parameter set are respectively greater than AIFSN, CWmax, and CWmin in the first EDCA parameter set.

Further, in the second EDCA parameter set, AIFSN corresponding to any AC is greater than AIFSN corresponding to a same AC in the first EDCA parameter set. In the second EDCA parameter set, CWmax corresponding to any AC is greater than CWmax corresponding to a same AC in the first EDCA parameter set. In the second EDCA parameter set, CWmin corresponding to any AC is greater than CWmin corresponding to a same AC in the first EDCA parameter set.

Optionally, in the first EDCA parameter set, CWmin= $(2^N)-1$, and in the second EDCA parameter set, CWmin= $2^{(N+1)}-1$. N is a positive integer. For example, N=3, CWmin in the first EDCA parameter set is 7, and CWmin in the second EDCA parameter set is 15.

As shown in schematic diagrams of scenarios of channel access processes in FIG. 7A to FIG. 7D, a count value of a PIFS access timer starts to back off from the moment at which the AP 2 obtains the transmission opportunity of the channel of a link 2. After the transmission opportunity that is of the channel of the link 2 and that is obtained by the AP 2 ends and before the count value of the PIFS access timer backs off to 0, an AP corresponding to the PIFS access timer performs channel contention based on the second EDCA parameter set. After the count value of the PIFS access timer backs off to 0, the AP corresponding to the PIFS access timer determines, based on the first EDCA parameter, an AIFS and a CW used for channel contention. The CW is used for determining a backoff count value. The second EDCA parameter set may be understood as a non-STR EDCA parameter set. The AP corresponding to the PIFS access timer is an AP that performs backoff of the PIFS access timer.

In some embodiments, the channel contention method includes steps 601 to 604. As shown in schematic diagrams of scenarios of channel access processes in FIG. 7A and FIG. 7B, the AP 1 and the AP 2 generate PIFS access timers at the moment at which the AP 2 obtains the transmission opportunity of the channel of the link 2, and start backoff of the PIFS access timers. In a backoff process in which the corresponding PIFS access timers back off to 0, the AP 1 and the AP 2 perform channel contention based on the second EDCA parameter set. In such an embodiment, within a period of time after the AP 1 performs EDCA access and the AP 2 performs PIFS access, the AP 1 and the AP 2 perform subsequent channel contention based on the second EDCA parameter set, to increase difficulty of backing off to 0 of backoff count values that are of current links and that are contended by the AP 1 and the AP 2, reduce a probability of successfully accessing the channel by the AP 1 and the AP 2 in subsequent channel contention, and increase a probability of successfully accessing the channel by another wireless network device that contends for a same channel as the AP 1 or the AP 2. This helps improve fairness in an access process of multiple channels.

For example, in the second EDCA parameter set, AIFSN corresponding to any AC is greater than AIFSN corresponding to a same AC in the first EDCA parameter set. In the second EDCA parameter set, CWmax corresponding to any AC is greater than CWmax corresponding to a same AC in the first EDCA parameter set. In the second EDCA parameter set, CWmin corresponding to any AC is greater than CWmin corresponding to a same AC in the first EDCA parameter set. Certainly, two or three of the foregoing three parameters may alternatively be adjusted at the same time. In this way, after the AP 2 performs PIFS access, required duration in which backoff count values of the channels contended by the AP 1 and the AP 2 in next channel contention back off to 0 can be increased. This helps reduce a probability of successfully accessing the channel by the AP 1 and the AP 2 in next channel contention, and improve fairness in an access process of multiple channels.

It should be understood that in such an embodiment, when at least one AP of the MLD performs EDCA access and at least another AP performs PIFS access, the AP performing EDCA access and the AP performing PIFS access each generate a PIFS access timer. Within a backoff time in which the PIFS access timer backs off to 0, both the AP performing EDCA access and the AP performing PIFS access perform subsequent channel contention based on the second EDCA parameter.

Figure 7A:
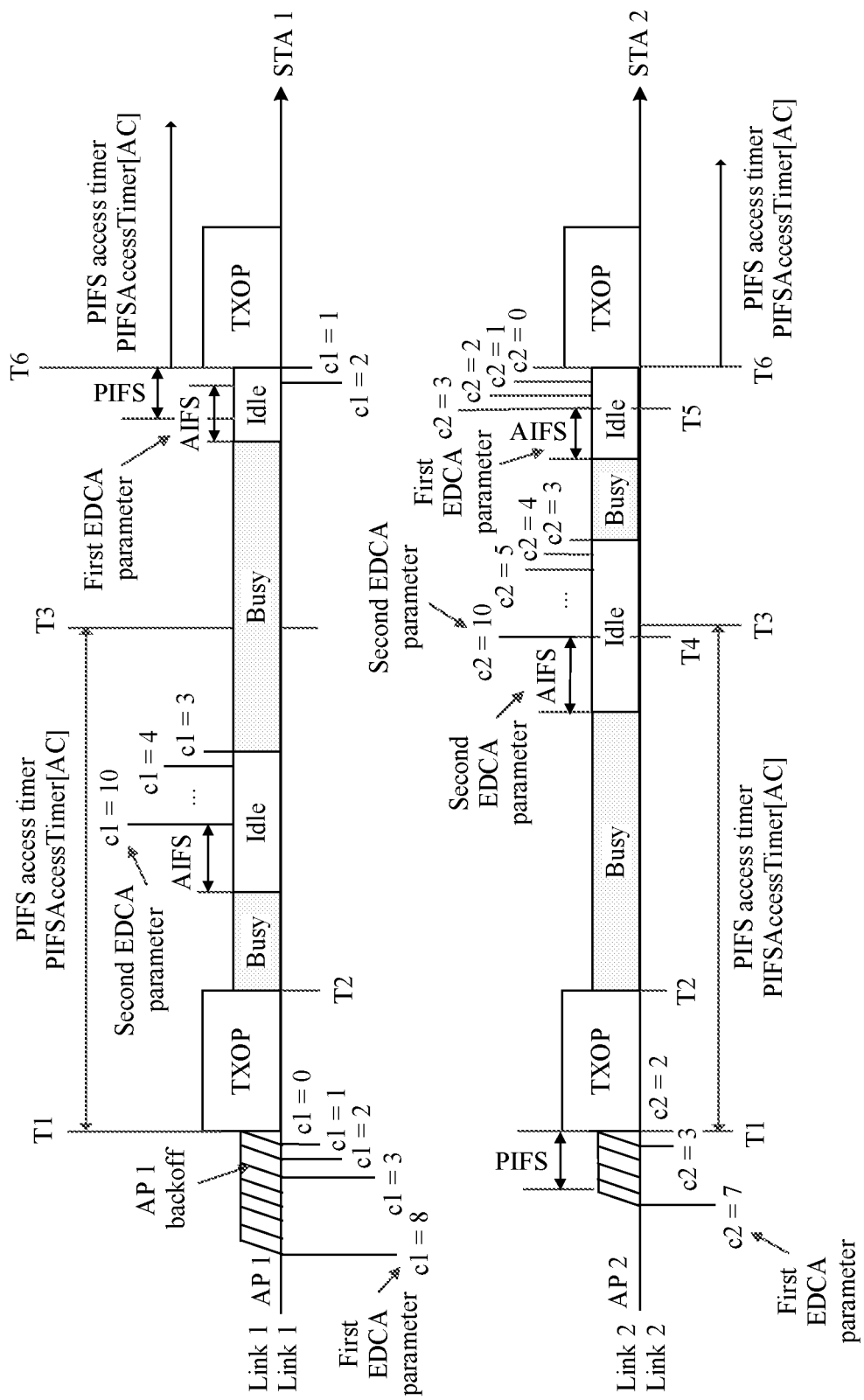
FIG. 7A is a schematic diagram of a scenario of a channel access process according to an embodiment of this disclosure.

As shown in FIG. 7A, a start time point at which the AP 1 obtains a transmission opportunity of a channel of the link 1 is a first moment T1, and an end time point is a second moment T2. A start time point at which the AP 2 obtains a transmission opportunity of a channel of the link 2 is the first moment T1, and an end time point is the second moment T2. At the second moment, the AP 2 may start channel contention based on the second EDCA parameter set.

In the example shown in FIG. 7A, a moment at which the AP 1 starts backoff of the PIFS access timer is the first moment T1, and a moment at which the PIFS access timer backs off to 0 is a third moment T3. At the second moment T2, the transmission opportunity that is of the channel of the link 1 and that is obtained by the AP 1 at T1 ends. The AP 1 enters next channel contention, and listens to whether the channel of the link 1 is idle. A moment at which the AP 2 starts backoff of the PIFS access timer is the first moment T1, and a moment at which the PIFS access timer backs off to 0 is the third moment T3. At the second moment T2, the transmission opportunity that is of the channel of the link 1 and that is obtained by the AP 2 at T1 ends. The AP 2 enters next channel contention, and listens to whether the channel of the link 2 is idle.

It should be understood that the moment at which the PIFS access timer of the AP 1 backs off to 0 may be different from the moment at which the PIFS access timer of the AP 2 backs off to 0. That is, backoff duration of PIFS access timers of different APs may be the same or may be different. For ease of description, in this disclosure, that both the moment at which the PIFS access timer of the AP 1 and the moment at which the PIFS access timer of the AP 2 backs off to 0 are T3 are used for description. The moment at which the PIFS access timer of the AP 1 backs off to 0 is not limited to be the same as the moment at which the PIFS access timer of the AP 2 backs off to 0.

In a backoff process before the PIFS access timer backs off to 0, a corresponding AP performs channel contention based on the second EDCA parameter set. At a moment at which the PIFS access timer backs off to 0, the corresponding AP switches to the first EDCA parameter set to perform channel contention.

In the example shown in FIG. 7A, before T1, the AP 1 contends for the channel of the link 1 based on the first EDCA parameter. For example, before T1, a backoff count value c1 of a channel that is of the link 1 and that is contended by the AP 1 is a random value in (0, CW11], and CW11 is obtained by the AP 1 based on CWmin and CWmax that are in the first EDCA parameter set and that are corresponding to an AC of the AP 1.

Between T1 and T3, an AIFS and a backoff count value of the channel that is of the link 1 and that is contended by the AP 1 are obtained based on the second EDCA parameter set. Further, between T1 and T3, the AIFS of the channel that is of the link 1 and that is contended by the AP 1 is obtained based on AIFSN corresponding to an AC of the AP 1 in the second EDCA parameter set. The backoff count value c1 of the channel that is of the link 1 and that is contended by the AP 1 is a random value in (0, CW21]. CW21 is obtained by the AP 1 based on CWmin and CWmax that are corresponding to the AC of the AP 1 in the second EDCA parameter set. At the moment T3, the AP 1 switches to the first EDCA parameter set to perform channel contention.

As shown in FIG. 7A, after T2, the AP 1 starts to contend for the channel of the link 1. When the AP 1 senses that the channel of the link 1 is idle within one AIFS, the backoff count value c1 that is of the channel of the link 1 and that is contended by the AP 1 from (0, CW21] is 10, and the AP 1 starts backoff of the backoff count value. When the backoff count value backs off to 3, the contended channel enters a busy state. The AP 1 does not obtain a transmission opportunity of the contended channel. The AP 1 continues channel contention.

Between T3 and T6, the AP 1 contends for the channel of the link 1 based on the first EDCA parameter set. At a sixth moment T6 after T3, the AP 1 learns that a backoff count value c2 of a channel that is of the link 2 and that is contended by the AP 2 backs off to 0, and the channel that is of the link 1 and that is contended by the AP 1 is idle within one PIFS before T6. The AP 1 obtains a transmission opportunity of the contended channel of the link 1. In other words, the AP 1 performs PIFS access at T6. The AP 1 generates a PIFS timer at T6, and starts backoff of the PIFS timer.

Before T1, the AP 2 contends for the channel of the link 2 based on the first EDCA parameter. For example, before T1, a backoff count value c2 of a channel that is of the link 2 and that is contended by the AP 2 is a random value in (0, CW21], and CW21 is obtained by the AP 2 based on CWmin and CWmax that are in the first EDCA parameter set and that are corresponding to an AC of the AP 2.

Between T1 and T3, an AIFS and a backoff count value of the channel that is of the link 2 and that is contended by the AP 2 are obtained based on the second EDCA parameter set. Further, the AIFS of the channel that is of the link 2 and that is contended by the AP 2 is obtained based on AIFSN corresponding to an AC of the AP 2 in the second EDCA parameter set. The backoff count value c2 of the channel that is of the link 2 and that is contended by the AP 2 is a random value in (0, CW22]. CW22 is obtained based on CWmin and CWmax that are corresponding to the AC of the AP 2 in the second EDCA parameter set. At the moment T3, the AP 2 switches to the first EDCA parameter set to perform channel contention.

At the second moment T2 between T1 and T3, the transmission opportunity that is of the channel of the link 2 and that is obtained by the AP 2 ends. The AP 2 enters next channel contention, and listens to whether the channel of the link 2 is idle. The AP 2 senses, at a fourth moment T4 before T3, that the channel of the link 2 is idle within one AIFS, and starts backoff of the backoff count value c2 obtained based on the second EDCA parameter set. When the backoff count value c2 backs off to 3, the channel of the link 2 contended by the AP 2 is in a busy state. At a fifth moment T5 after T3, the AP 2 senses that the channel of the link 2 is idle within one AIFS, and the AP 2 continues backoff of c2. At the sixth moment T6, c2 backs off to 0, and the AP 2 obtains a transmission opportunity of the contended channel of the link 2. The AP 2 learns that the AP 1 performs PIFS access at T6, and the AP 2 generates a PIFS timer at T6, and starts backoff of the PIFS timer.

It can be learned that, at the third moment T3 at which the PIFS timer backs off to 0, the AP 2 perform backoff of the backoff count value c2. At the moment T3, the AP 2 may switch to the first EDCA parameter set to perform channel contention, and does not change the backoff count value c2 that is backing off. Based on a value of the backoff count value c2, backoff is continued to be performed based on the first EDCA parameter set after switching.

Further, if the AP 1 or the AP 2 performs PIFS access in a backoff process of the PIFS access timer, backoff duration of the PIFS access timer is prolonged. For example, the backoff duration of the PIFS access timer may be prolonged by increasing a remaining count value of the PIFS access timer, or the backoff duration of the PIFS access timer may be prolonged by suspending backoff of the PIFS access timer. In this way, duration in which an AP is limited to access a channel can be prolonged, and a probability of successfully accessing the channel by the AP can be further reduced.

Figure 7B:
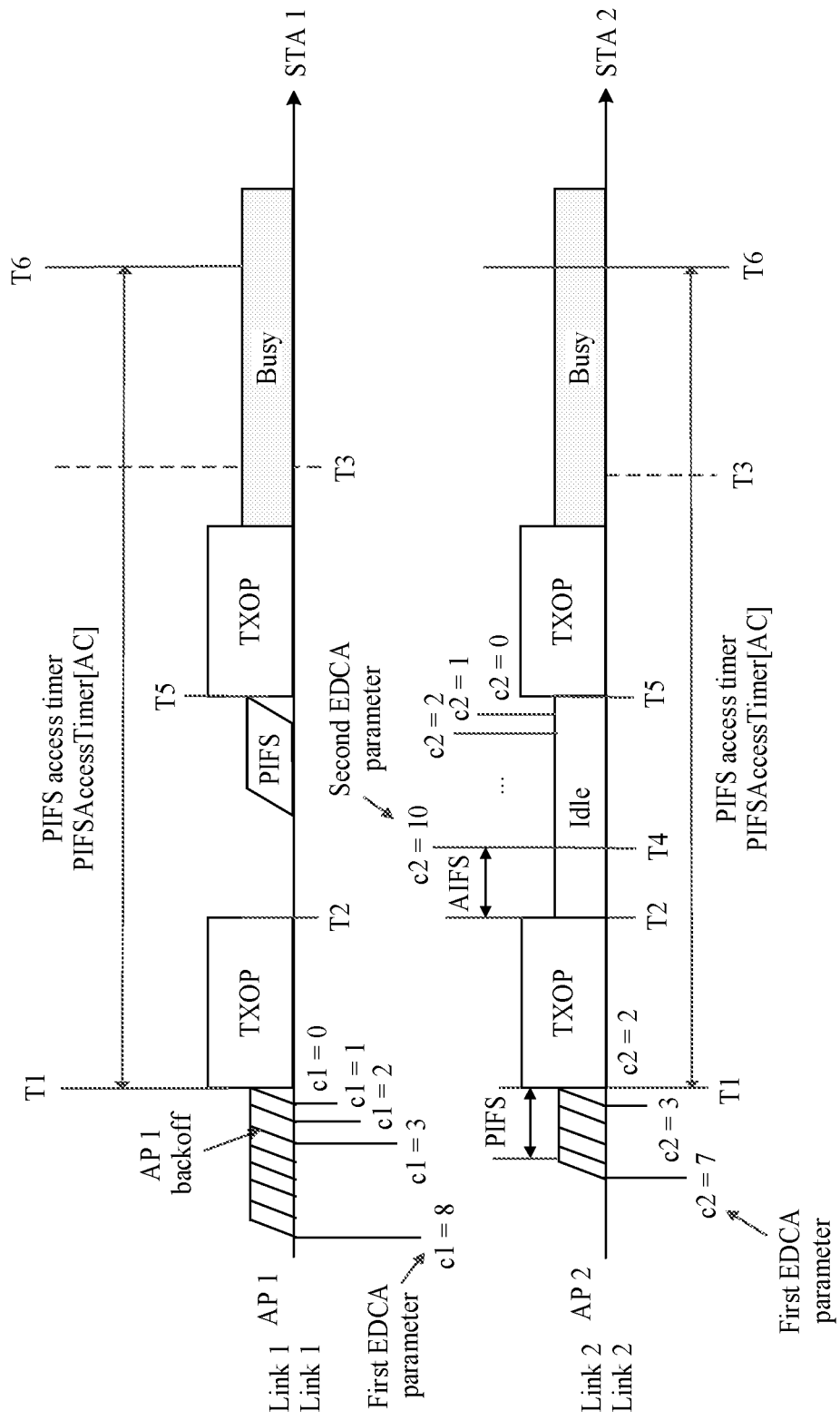
FIG. 7B is a schematic diagram of another scenario of a channel access process according to an embodiment of this disclosure.

FIG. 7B is a schematic diagram of a scenario of channel contention. The AP 1 and the AP 2 generate PIFS access timers at a first moment T1, and start backoff of the PIFS access timers. Duration corresponding to a count value obtained when the PIFS access timer is generated is duration from T1 to a third moment T3. Starting from T1, the AP 1 and the AP 2 perform channel contention based on the second EDCA parameter.

At a second moment T2 between T1 and T3, a transmission opportunity that is of a channel of the link 1 and that is obtained by the AP 1 ends, and a transmission opportunity that is of a channel of the link 2 and that is obtained by the AP 2 ends. The AP 2 listens to the channel of the link 2 at the moment T2 for one AIFS. The AIFS is determined by the AP 2 based on AIFSN that is in the second EDCA parameter and that corresponds to an AC of the AP 2. At a fourth moment T4, the AP 2 senses that the channel of the link 2 is idle within one AIFS, and the AP 2 starts backoff of a backoff count value c2 of the channel that is of the link 2 and that is contended by the AP 2. The backoff count value c2 of a contended channel of the link 2 is a random value in (0, CW22], and CW22 is obtained by the AP 2 based on CWmin and CWmax that are in the second EDCA parameter set and that are corresponding to an AC of the AP 2. At a fifth moment T5 at which the backoff count value c2 backs off to 0, the AP 2 accesses the contended channel of the link 2. When the backoff count value of the AP 2 backs off to 0, the AP 1 performs PIFS access to obtain a transmission opportunity of the contended link 1.

It can be learned that, when the PIFS access timer backs off, the AP 1 performs PIFS access again, and both the AP 2 and the AP 2 prolong backoff duration of the PIFS access timers. The PIFS access timer is prolonged to back off to 0 at a sixth moment T6.

Certainly, in another embodiment, if the AP 1 or the AP 2 performs PIFS access in a backoff process of the PIFS access timer, backoff duration of the PIFS access timer may alternatively not be prolonged.

Optionally, at least one of the AP 1 and the AP 2 may perform backoff of the PIFS access timer based on a state of a contended channel. For example, before the PIFS access timer of the AP 2 backs off to 0, the PIFS may perform backoff of the access timer only when the channel contended by the AP 2 is idle. If the channel contended by the AP 2 is busy before the PIFS access timer of the AP 2 backs off to 0, backoff of the access timer may be suspended. Alternatively, if the channel contended by the AP 2 is idle, backoff of the access timer is resumed or backoff of the access timer continues. The AP 1 may alternatively perform backoff of the PIFS access timer of the AP 1 in a manner in which the AP 2 performs backoff of the PIFS access timer in this example.

Certainly, in another embodiment, the AP 1 and the AP 2 may alternatively not consider a state of the contended channel in a backoff process of the PIFS access timer. For example, regardless of whether states of the channels contended by the AP 1 and the AP 2 are idle, both the AP 1 and the AP 2 keep performing backoff of the PIFS access timers until the access timers back off to 0.

In the embodiment in FIG. 7A, an end time point of the transmission opportunity that is of the channel of the link 1 and that is obtained by the AP 1 and an end time point of the transmission opportunity that is of the channel of the link 2 and that is obtained by the AP 2 are the same, and both are T2. In this way, duration of the transmission opportunity that is of the channel of the link 1 and that is obtained by the AP 1 is the same as duration of the transmission opportunity that is of the channel of the link 2 and that is obtained by the AP 2. If the AP 1 and the AP 2 are non-STR MLD APs, the AP 1 and the AP 2 of the non-STR MLD can end transmission simultaneously, to avoid sending data over one link by one AP of the non-STR MLD while receiving data over another link by another AP of the non-STR MLD. It should be understood that the method in this embodiment of this disclosure is not only applied to a non-STR MLD, but may also be applied to an STR MLD.

It should be understood that, in another embodiment, the end time points of the transmission opportunities that are of the channels and that are obtained by the AP 1 and the AP 2 may be different. To be specific, the end time point of the transmission opportunity that is of the channel of the link 1 and that is obtained by the AP 1 may be different from the end time point of the transmission opportunity that is of the channel of the link 2 and that is obtained by the AP 2.

It may be understood that in the foregoing embodiment, at a moment at which the AP 2 obtains the transmission opportunity of the channel of the link 2, all APs of the MLD may each generate a PIFS access timer, and start backoff of the PIFS access timer. In a backoff process in which the PIFS access timer backs off to 0, all APs of the MLD perform channel contention based on the second EDCA parameter set. This reduces a probability of successfully contend for a channel by each AP of the MLD, to increase a probability of successfully contending for a channel by another wireless network device that contends for a same channel as any AP of the MLD, and improve fairness in an access process of multiple channels more effectively.

In some other embodiments, the channel contention method includes steps 601 to 603. As shown in a schematic diagram of a channel access scenario in FIG. 7C, at a first moment T1, when a backoff count value of the link 1 contended by the AP 1 backs off to 0 and the AP 1 obtains a transmission opportunity of a channel of the link 1, the AP 1 generates a PIFS access timer, and starts backoff of the PIFS access timer. In a backoff process in which the PIFS access timer backs off to 0, the AP 1 performs channel contention based on the second EDCA parameter set.

An end time point of the transmission opportunity that is of the channel of the link 1 and that is obtained by the AP 1 is a second moment T2. For a solution in which the AP 1 performs backoff of the PIFS access timer, a solution in which the AP 1 performs channel contention based on the second EDCA parameter set after the second moment, and a solution in which the AP 1 performs channel contention after the PIFS access timer backs off to 0, refer to related descriptions in the embodiment corresponding to FIG. 7A and FIG. 7B. For ease of understanding, the following provides an example of using the technical solution of this embodiment.

Figure 7C:
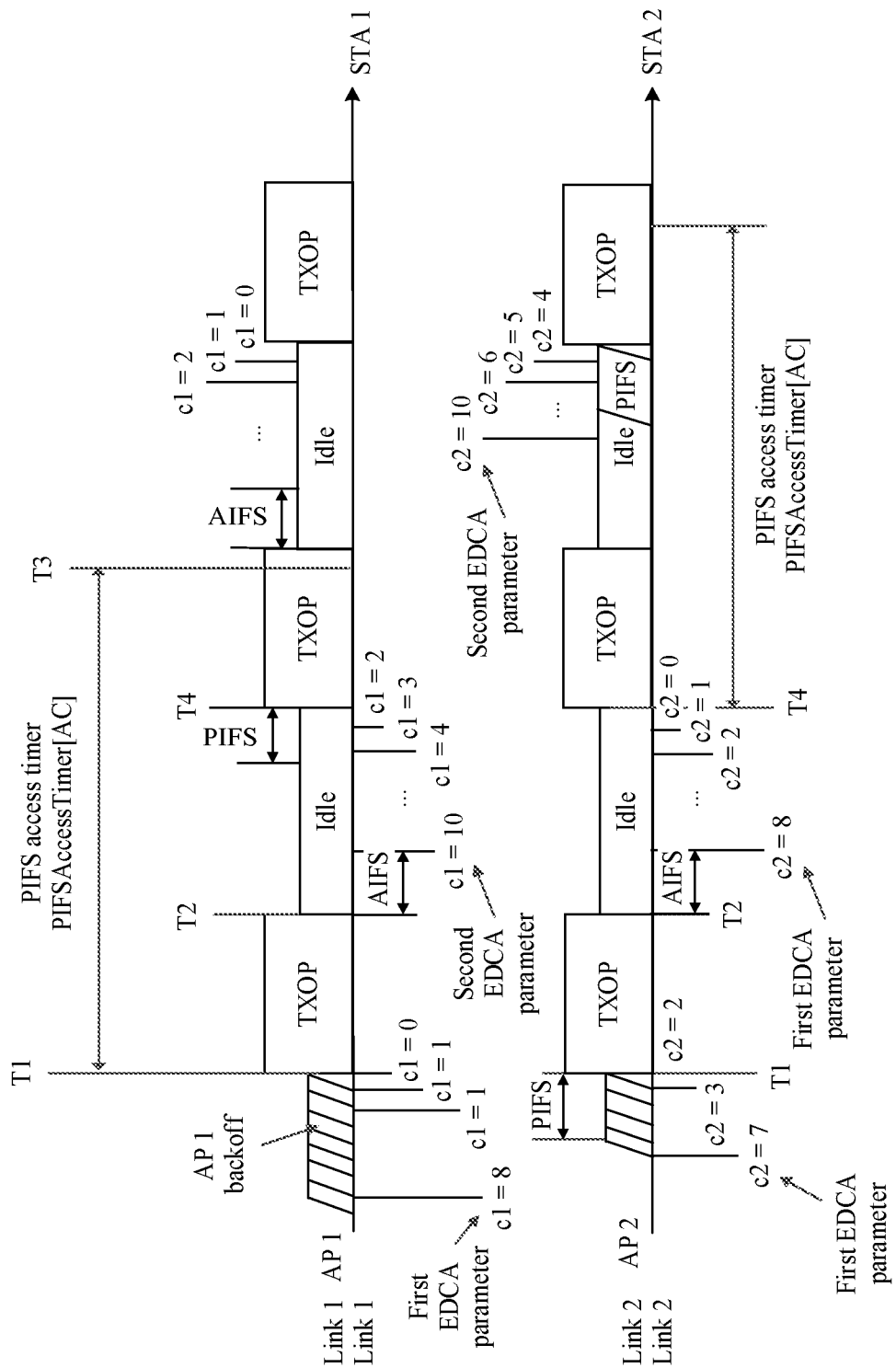
FIG. 7C is a schematic diagram of another scenario of a channel access process according to an embodiment of this disclosure.

As shown in FIG. 7C, before a first moment T1, the AP 1 and the AP 2 perform channel contention based on the first EDCA parameter set. A backoff count value c1 of a channel that is of the link 1 and that is contended by the AP 1 at the first moment T1 backs off to 0. The AP 1 performs EDCA access at T1. A channel that is of the link 2 and that is contended by the AP 2 is idle within one PIFS before the moment T1, and the AP 2 performs PIFS access at T1, to obtain a transmission opportunity of the channel of the link 2. An end time point of the transmission opportunity that is of the channel of the link 1 and that is obtained by the AP 1 is a second moment T2. An end time point of the transmission opportunity that is of the channel of the link 2 and that is obtained by the AP 2 is the second moment T2.

The AP 1 generates a PIFS access timer at the moment T1, and starts backoff of the PIFS access timer. At the moment T2, the transmission opportunity of the link 1 obtained by the AP 1 ends. After T2 and before a third moment T3 at which the PIFS access timer backs off to 0, the AP 1 contends for the channel of the link 1 based on the second EDCA parameter.

At the moment T2, the transmission opportunity of the link 2 obtained by the AP 2 ends, and the AP 2 continues to contend for the channel of the link 2 based on the first EDCA parameter set. At a fourth moment T4 in a backoff process before a PIFS backoff count value backs off to 0, a backoff count value c2 of the channel that is of the link 2 and that is contended by the AP 2 backs off to 0. The AP 2 obtains a transmission opportunity of the contended channel of the link 2. The AP 2 generates a PIFS access timer at the moment T4 at which the AP 2 obtains the transmission opportunity of the channel of the link 2, and starts backoff of a PIFS backoff count value. At a moment before the PIFS backoff count value backs off to 0, the AP 2 performs channel contention based on the second EDCA parameter set. For example, at the moment before the PIFS backoff count value backs off to 0, the AP 2 determines, based on the second EDCA parameter set, an AIFS and CW22 used for channel contention.

The channel that is of the link 1 and that is contended by the AP 1 is idle within one PIFS before the moment T4. The AP 1 performs PIFS access at T4, and obtains a transmission opportunity of the contended channel of the link 1.

Optionally, in such an embodiment, AIFSN, CWmax, and CWmin in the second EDCA parameter set may respectively be greater than AIFSN, CWmax, and CWmin in the first EDCA parameter set. In this way, during channel contention, required duration in which the backoff count value of the channel contended by the AP 1 backs off to 0 can be increased, and a probability of performing PIFS access by the AP 2 when a backoff count value of the channel that is of the link 1 and that is contended by the AP 1 next time backs off to 0 can be reduced. This reduces a probability of successfully accessing the channel by the AP 1 and the AP 2 in next channel contention, and increases a probability of successfully accessing the channel by another wireless network device that contends for a same channel as the AP 1 or the AP 2, to help improve fairness in an access process of multiple channels.

Figure 7D:
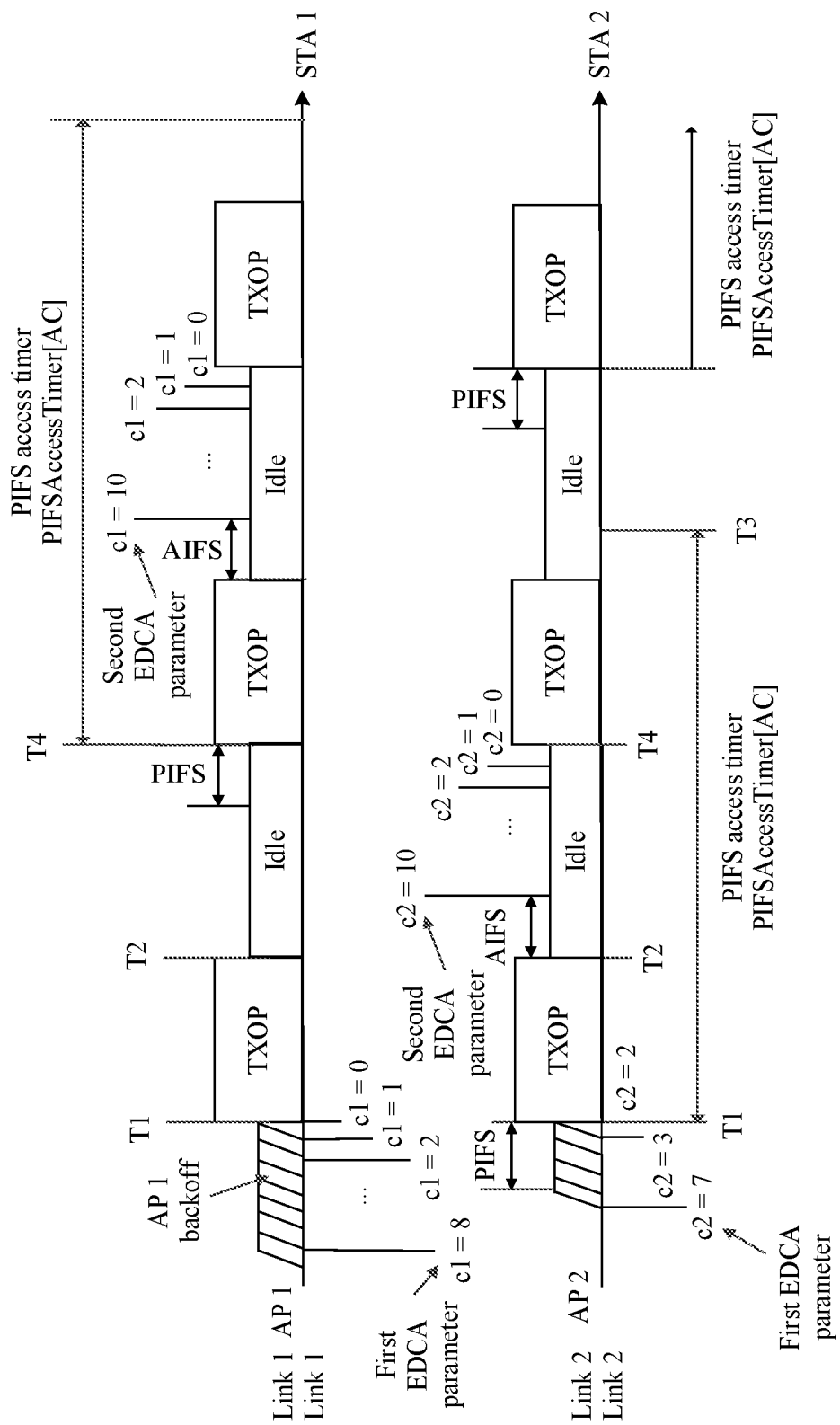
FIG. 7D is a schematic diagram of another scenario of a channel access process according to an embodiment of this disclosure.

In some other embodiments, the channel contention method includes steps 601, 602, and 604. As shown in FIG. 7D, the AP 2 generates a PIFS access timer at a first moment T1 at which the AP 2 obtains a transmission opportunity of a channel of the link 2, and starts backoff of the PIFS access timer. In a backoff process in which the PIFS access timer backs off to 0, the AP 2 performs channel contention based on the second EDCA parameter set.

An end time point of a transmission opportunity that is of a channel of the link 2 and that is obtained by the AP 2 is a second moment T2. For a solution in which the AP 2 performs backoff of the PIFS access timer, a solution in which the AP 2 performs channel contention based on the second EDCA parameter set within a backoff time before the PIFS access timer backs off to 0, and a solution in which the AP 2 performs channel contention after the PIFS access timer backs off to 0, refer to related descriptions in the embodiment corresponding to FIG. 7A and FIG. 7B. For ease of understanding, the following provides an example of using the technical solution of this embodiment.

As shown in FIG. 7D, before a first moment T1, the AP 1 and the AP 2 perform channel contention based on the first EDCA parameter set. A backoff count value c1 of a channel that is of the link 1 and that is contended by the AP 1 at the first moment T backs off to 0. The AP 1 performs EDCA access at T1. A channel that is of the link 2 and that is contended by the AP 2 is idle within one PIFS before the moment T1, and the AP 2 performs PIFS access at T1, to obtain a transmission opportunity of the channel of the link 2. An end time point of a transmission opportunity that is of the channel of the link 1 and that is obtained by the AP 1 is the second moment T2. The end time point of the transmission opportunity that is of the channel of the link 2 and that is obtained by the AP 2 is the second moment T2.

The AP 2 generates the PIFS access timer at the moment T1, and starts backoff of the PIFS access timer. At the moment T2, the transmission opportunity of the link 2 obtained by the AP 2 ends, and the AP 2 contends for the channel of the link 2 based on the second EDCA parameter set. At a fourth moment T4 in a backoff process before a PIFS backoff count value backs off to 0, a backoff count value c2 of the channel that is of the link 2 and that is contended by the AP 2 backs off to 0. The AP 2 obtains a transmission opportunity of the contended channel of the link 2.

At T2, the transmission opportunity that is of the channel of the link 1 and that is obtained by the AP 1 at T1 ends, and the AP 1 contends for the channel of the link 1 again based on the first EDCA parameter set. The channel that is of the link 1 and that is contended by the AP 1 is idle within one PIFS before the moment T4. The AP 1 performs PIFS access at T4, and obtains a transmission opportunity of the contended channel of the link 1. The AP 1 generates a PIFS access timer at the moment T4 at which the AP 1 obtains the transmission opportunity of the channel of the link 1, and starts backoff of a PIFS backoff count value. At a moment before the PIFS backoff count value backs off to 0, the AP 1 performs channel contention based on the second EDCA parameter set.

Optionally, in such an embodiment, AIFSN, CWmax, and CWmin in the second EDCA parameter set may respectively be greater than AIFSN, CWmax, and CWmin in the first EDCA parameter set. In this way, in next channel contention, required duration in which the backoff count value of the channel contended by the AP 2 backs off to 0 can be increased, and active contention of the AP 2 can be suppressed. This reduces a probability of successfully accessing the channel by the AP 2 in next channel contention process, and increases a probability of successfully accessing the channel by another wireless network device that contends for a same channel as the AP 2, to help improve fairness in an access process of multiple channels.

In a second channel access solution provided in embodiments of this disclosure, a new timer is provided. The timer is used for preventing the AP or the STA from performing PIFS access twice in a continuous period of time. For example, after the AP performs PIFS access, the timer starts to work, and the AP cannot perform PIFS access within counting duration of the timer. Alternatively, the timer is used for limiting the AP to perform PIFS access only within counting duration of the timer. For example, after the AP performs EDCA access, the timer starts to work, and the AP may perform PIFS access within the counting duration of the timer. In this way, this helps avoid continuously accessing a channel by a same AP through PIFS access twice, to improve fairness in an access process of multiple channels. The following describes the channel contention solution in detail with reference to a channel contention method.

Figure 8A:
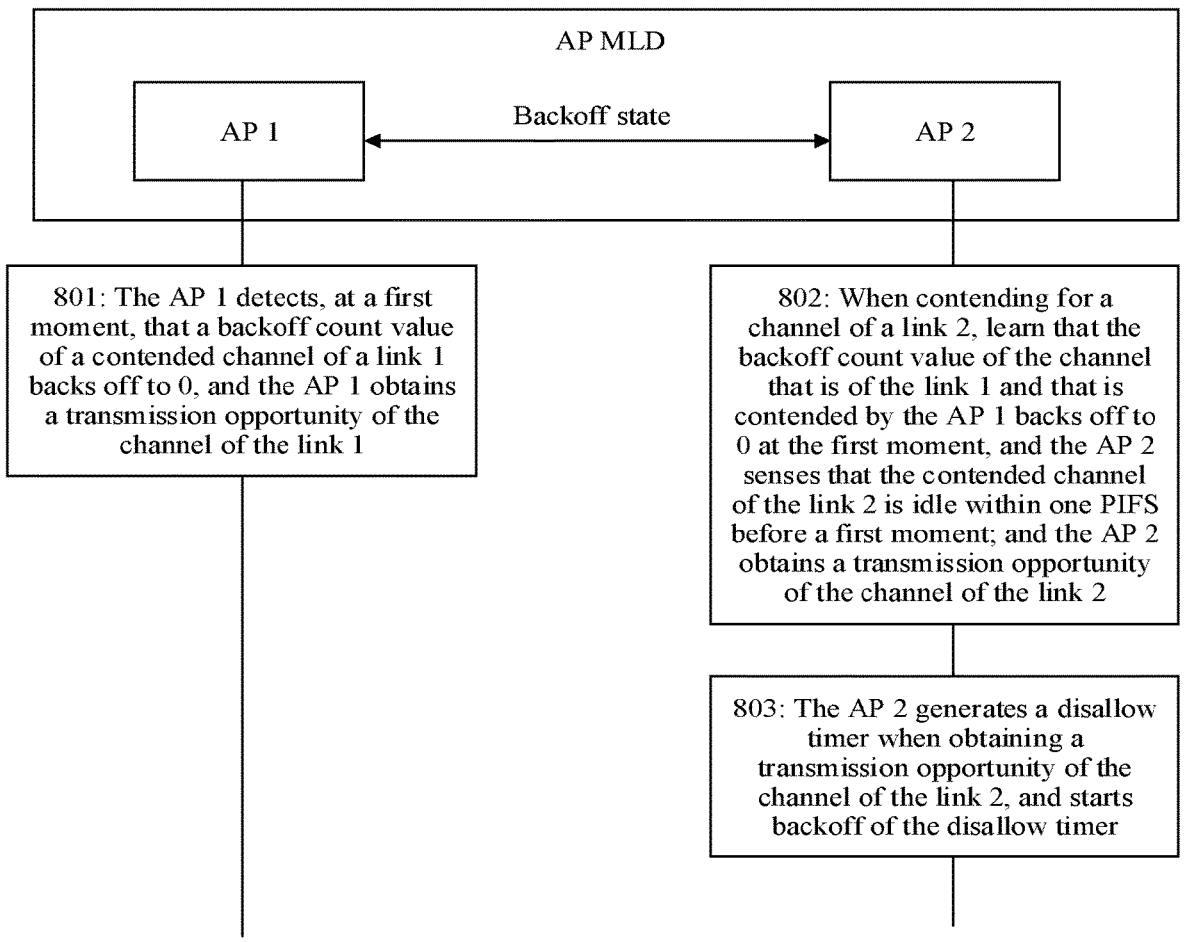
FIG. 8A is another schematic flowchart of a channel contention method according to an embodiment of this disclosure.
Figure 9A:
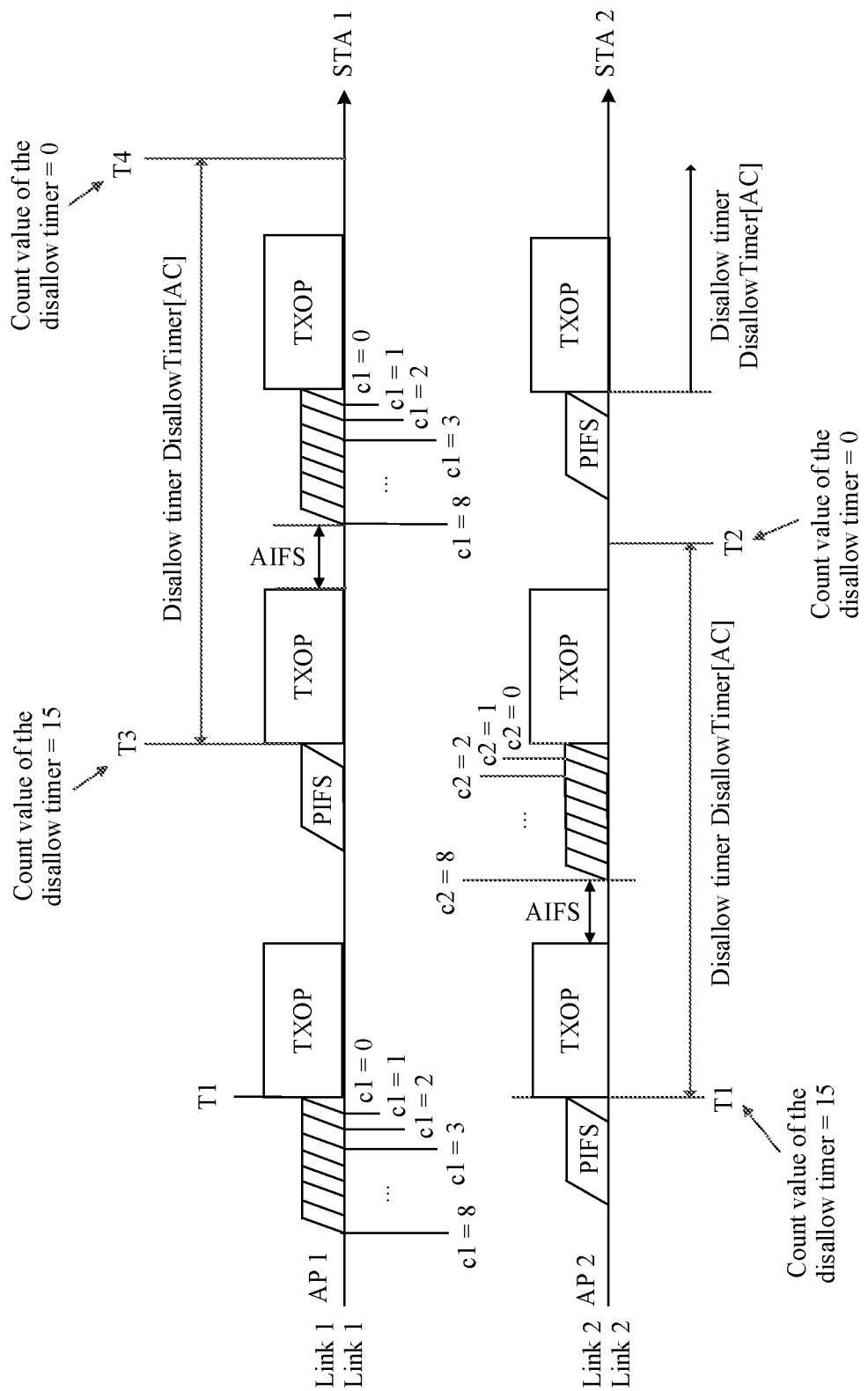
FIG. 9A is a schematic diagram of another scenario of a channel access process according to an embodiment of this disclosure.

Refer to a schematic flowchart of a channel contention method shown in FIG. 8A and a schematic diagram of a channel access scenario shown in FIG. 9A. In some embodiments, the new timer is a disallow timer, and is used for preventing the AP from performing PIFS access. Further, the channel contention method may include the following steps.

801: An AP 1 detects, at a first moment, that a backoff count value of a contended channel of a link 1 backs off to 0, and the AP 1 obtains a transmission opportunity of the channel of the link 1.

802: When contending for a channel of a link 2, an AP 2 learns that the backoff count value of the channel that is of the link 1 and that is contended by the AP 1 backs off to 0 at the first moment, and the AP 2 senses that the contended channel of the link 2 is idle within one PIFS before the first moment, and the AP 2 obtains a transmission opportunity of the channel of the link 2.

For a manner in which the AP 2 obtains a backoff state of the backoff count value of the channel that is of the link 1 and that is contended by the AP 1, refer to related descriptions in the embodiment corresponding to FIG. 6. Details are not described herein again.

803: The AP 2 generates a disallow timer (DisallowTimer [AC]) when obtaining a transmission opportunity of the channel of the link 2, and starts backoff of the disallow timer. Within a backoff period before the disallow timer backs off to 0, the disallow timer is used for preventing the AP 2 from accessing the channel when the backoff count value of the channel of the link 2 does not back off to 0.

To be specific, in a backoff period before the disallow timer backs off to 0, the AP 2 cannot perform PIFS access.

In this embodiment, the AP 2 may obtain a transmission opportunity of the channel of the link 2 at the first moment or a time point close to the first moment. There may be deviation between a moment at which the AP 2 obtains the transmission opportunity of the channel of the link 2 and the first moment.

After the AP 2 generates the disallow timer, the AP 2 performs backoff based on a count value of the disallow timer. When a remaining count value of the disallow timer is 0, it is considered that the disallow timer backs off to 0.

When the AP 2 generates the disallow timer, a count value obtained when the disallow timer is generated may be fixed, for example, may be specified in a communication standard. Alternatively, the count value obtained when the disallow timer is generated may be dynamic, for example, may be set by the AP 2 based on a channel state of the link 2.

The AP may send, to a STA that receives a signal transmitted by the AP, the set count value generated by the disallow timer. For example, the AP may send, to the STA by using a beacon frame, a probe request frame, or a probe response frame, the count value obtained when the disallow timer is generated.

The STA that receives the signal transmitted by the AP may first detect whether the count value obtained when the disallow timer is generated exists in the beacon frame, the probe request frame, or the probe response frame sent by the AP. If the count value exists, the STA obtains, from the beacon frame, the probe request frame, or the probe response frame sent by the AP, the count value when the disallow timer is generated. If the count value does not exist, in other words, if the STA does not obtain, from the AP, the count value when the disallow timer is generated, the count value obtained when the disallow timer is generated is a default value.

The count value obtained when the disallow timer is generated may be a number of slots or may be a number of seconds. In other words, the disallow timer may perform backoff in a unit of a slot, or may perform backoff in a time unit such as second, millisecond, or microsecond.

It can be learned that, in this embodiment, the disallow timer is used for limiting the second station to access a channel again through PIFS access within a period of time after the AP 2 accesses the channel through PIFS access and obtains a transmission opportunity of the channel. This helps reduce a probability of accessing a channel consecutively by a same AP through PIFS access, and improve fairness in an access process of multiple channels.

For example, as shown in FIG. 9A, the AP 2 performs PIFS access at a first moment T1, and generates a disallow timer, where a count value obtained when the disallow timer is generated is 15. The count value backs off to 0 at a second moment T2. Between T1 and T2 before the disallow timer backs off to 0, the AP 2 cannot perform PIFS access.

When transmission opportunities obtained by the AP 1 and the AP 2 at the first moment T1 end, the AP 1 and the AP 2 start channel contention again. At a third moment T3 between T1 and T2, a backoff count value of a channel that is of the link 2 and that is contended by the AP 2 backs off to 0, and a channel that is of the link 1 and that is contended by the AP 1 is idle within one PIFS before T3. The AP 1 obtains a transmission opportunity of the contended channel of the link 1 at the moment T3. In other words, the AP 2 performs EDCA access at T3, and the AP 1 performs PIFS access at T3. At a moment at which the AP 1 performs PIFS access, the AP 1 generates a disallow timer, and starts backoff of the disallow timer. The disallow timer backs off to 0 at a fourth moment T4. The AP 1 cannot perform PIFS access between T3 and T4 during which the disallow timer backs off.

It can be learned that the second channel access solution provided in this embodiment of this disclosure not only helps avoid performing PIFS access twice consecutively by an AP, but also enables multiple APs to alternately perform PIFS access. This can not only improve fairness of channel contention between an MLD and a single-link device that contends for a same channel with the MLD, but also improve fairness of channel access between multiple APs of the MLD.

In some optional embodiments, the AP 2 may perform backoff of the disallow timer based on a state of the contended channel. For example, in a backoff process before the disallow timer of the AP 2 backs off to 0, the disallow timer may back off only when the channel contended by the AP 2 is idle. If the channel contended by the AP 2 is busy before the disallow timer of the AP 2 backs off to 0, backoff may be suspended or the count value of the disallow timer may be increased. If the channel contended by the AP 2 is idle, backoff of the disallow timer is resumed or backoff of the disallow timer continues.

Certainly, in another embodiment, in a backoff process of the disallow timer, a channel state may alternatively not be considered. For example, the disallow timer may decrement directly based on time.

Figure 8B:
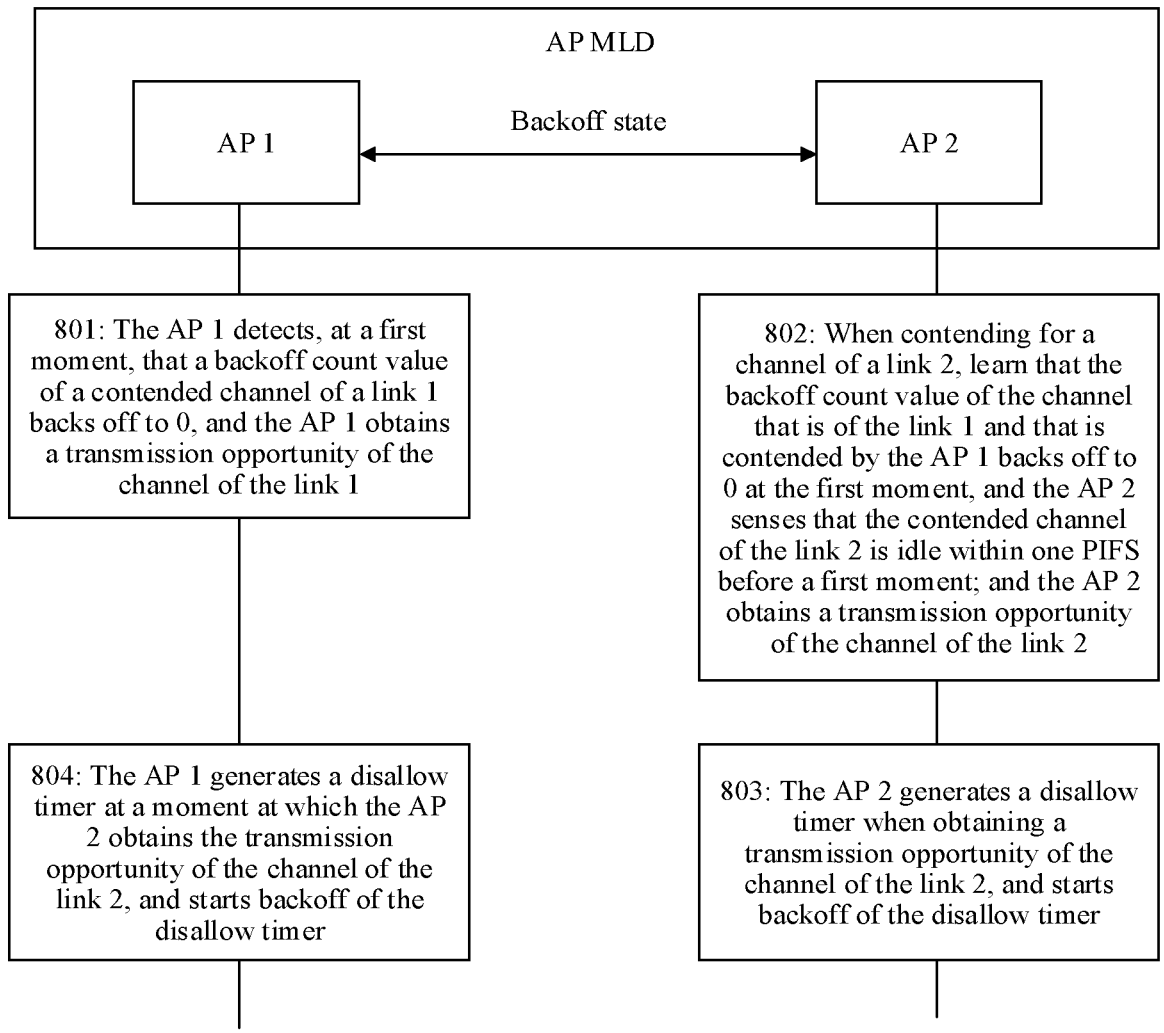
FIG. 8B is another schematic flowchart of a channel contention method according to an embodiment of this disclosure.
Figure 9B:
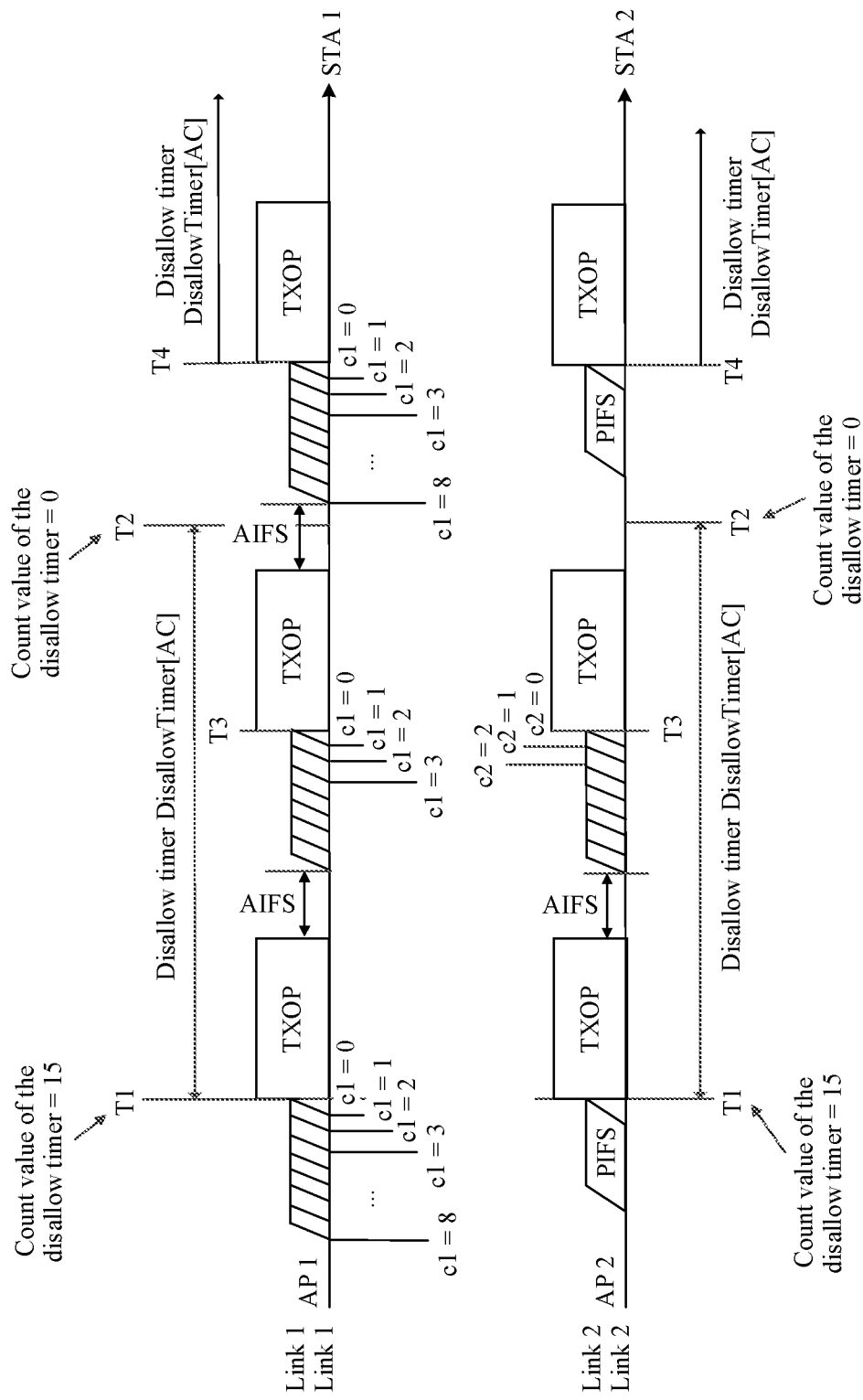
FIG. 9B is a schematic diagram of another scenario of a channel access process according to an embodiment of this disclosure.

FIG. 8B is a schematic flowchart of a channel contention method and FIG. 9B is a schematic diagram of a channel contention scenario. In some other optional embodiments, the channel contention method further includes step 804. The AP 1 generates a disallow timer at a moment at which the AP 2 obtains the transmission opportunity of the channel of the link 2, and starts backoff of the disallow timer. Within a backoff period before the disallow timer backs off to 0, the disallow timer prevents the AP 1 from accessing the channel when the backoff count value of the channel of the link 1 does not back off to 0. In this way, within a period of time after the AP 2 performs PIFS access, neither the AP 1 nor the AP 2 can perform PIFS access again. This reduces a probability of successfully contend for a channel by the AP 1 and the AP 2, to increase a probability of successfully accessing the channel by another wireless network device that contends for a same channel as the AP 1 or the AP 2, to help improve fairness in an access process of multiple channels, and better improve fairness of channel contention between an MLD and a single-link device that contends for a same channel with the MLD.

As shown in FIG. 9B, the AP 1 and the AP 2 generate disallow timers at a first moment T1. The disallow timers back off to 0 at a second moment T2. It should be understood that the moment at which the disallow timer of the AP 1 backs off to 0 may be different from the moment at which the disallow timer of the AP 2 backs off to 0. That is, backoff duration of disallow timers of different APs may be the same or may be different. For ease of description, in this disclosure, that both the moment at which the disallow timer of the AP 1 and the moment at which the disallow timer of the AP 2 backs off to 0 are T2 are used for description. The moment at which the disallow timer of the AP 1 backs off to 0 is not limited to be the same as the moment at which the disallow timer of the AP 2 backs off to 0.

Between T1 and T3, the AP 1 and the AP 2 are not allowed to perform PIFS access. For example, after a transmission opportunity that is of a channel of the link 1 and that is obtained by the AP 1 at the moment T1 ends, the AP 1 contends for the channel of the link 1 again. At the moment T3, a backoff count value c1 of the channel that is of the link 1 and that is currently contended for by the AP 1 backs off to 0. The AP 1 obtains a transmission opportunity of the contended channel of the link 1. In other words, the AP 1 performs EDCA access at T3. After a transmission opportunity that is of a channel of the link 2 and that is obtained by the AP 2 at the moment T1 ends, the AP 2 contends for the channel of the link 2 again. At the moment T3, a backoff count value c2 of the channel that is of the link 2 and that is currently contended for by the AP 2 backs off to 0. The AP 2 obtains a transmission opportunity of the contended channel of the link 2. In other words, the AP 2 performs EDCA access at T3.

At a fourth moment T4 after a backoff count value backs off to 0, the AP 2 performs PIFS access again. In this case, the AP 1 and the AP 2 generate backoff disallow timers at the fourth moment, and start backoff of the disallow timers.

Further, when the AP 2 obtains the transmission opportunity of the channel of the link 2, all APs of the MLD generate disallow timers, and start backoff of the disallow timers. Within a backoff period before the disallow timer backs off to 0, the disallow timer prevents an AP that performs backoff of the disallow timer or all the APs of the MLD from accessing a channel when a backoff count value of the contended channel of a current link does not back off to 0.

In this way, within a period of time after the AP 2 performs PIFS access, all APs of the MLD cannot perform PIFS access again. This can further improve fairness of channel contention between an MLD and a single-link device that contends for a same channel with the MLD.

It should be understood that, the foregoing related description of the disallow timer of the AP 2 is also applicable to a disallow timer of another AP of the MLD. The foregoing solution in which the AP 2 performs backoff of the disallow timer is also applicable to backoff performed by another AP of the MLD on a disallow timer.

Figure 10A:
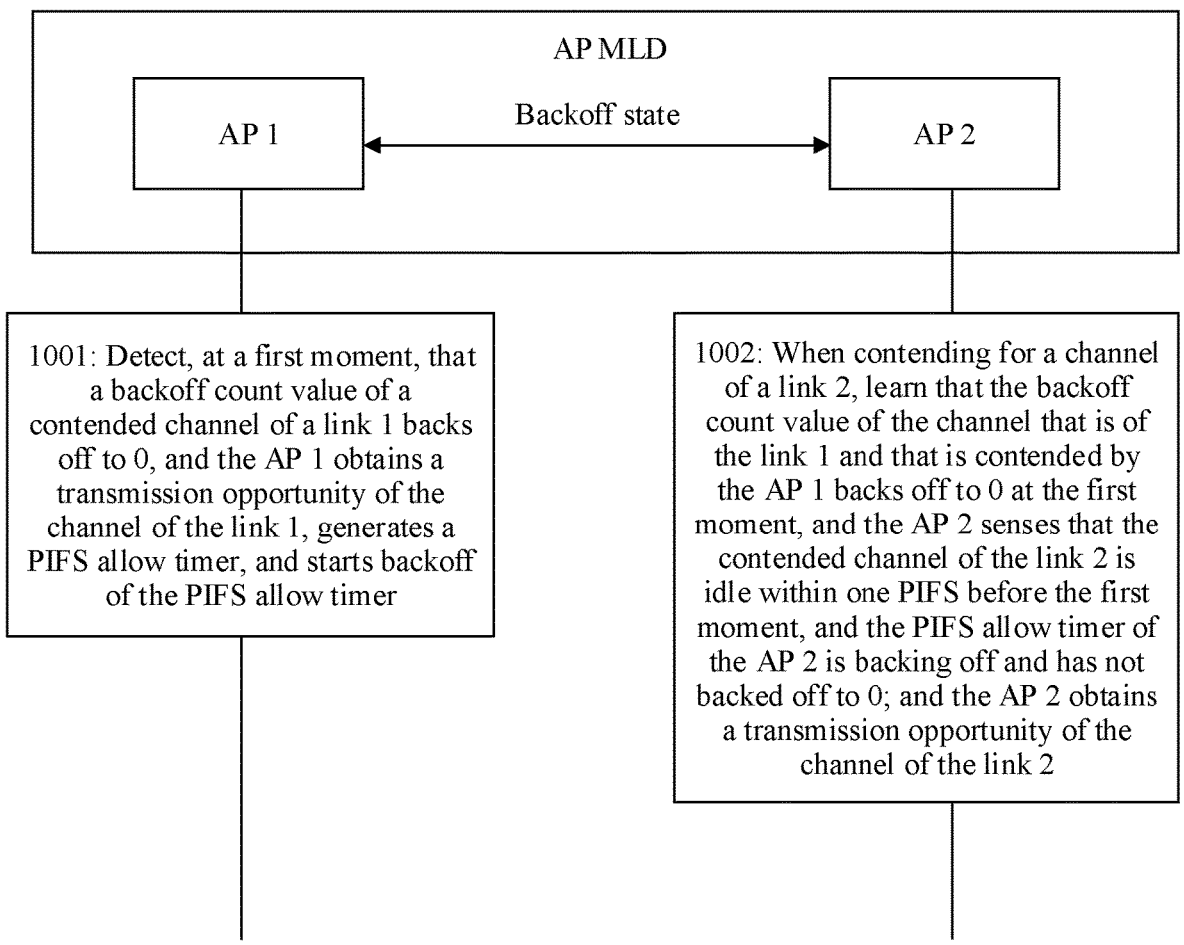
FIG. 10A is another schematic flowchart of a channel contention method according to an embodiment of this disclosure.
Figure 11A:
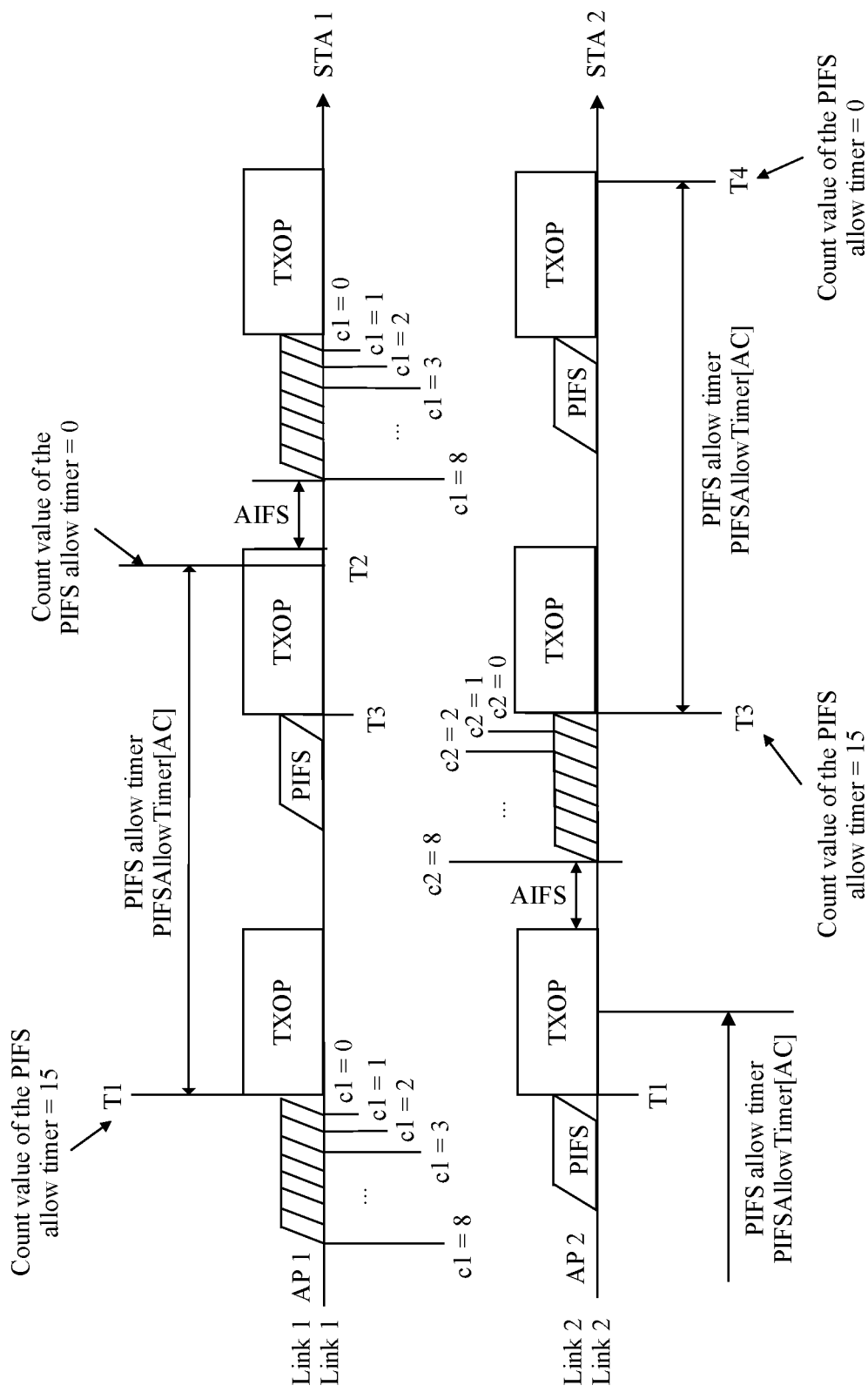
FIG. 11A is a schematic diagram of another scenario of a channel access process according to an embodiment of this disclosure.

Refer to a schematic flowchart of a channel contention method shown in FIG. 10A and a schematic diagram of a channel access scenario shown in FIG. 11A. In some other embodiments, the new timer is a PIFS allow timer, and is used for allowing an AP to perform PIFS access. Further, the channel contention method may include the following steps.

1001: An AP 1 detects, at a first moment, that a backoff count value of a contended channel of a link 1 backs off to 0, and the AP 1 obtains a transmission opportunity of the channel of the link 1, generates a PIFS allow timer (PIFSAllowTimer [AC]), and starts backoff of the PIFS allow timer.

In a backoff period before the PIFS allow timer backs off to 0, the PIFS allow timer is used for allowing the AP 1 to access a contended channel when a backoff count value of the channel that is of a current link and that is contended by another AP (for example, an AP 2) of an MLD other than the AP backs off to 0, and when the channel that is of the link 1 and that is contended by the AP 1 is idle within one PIFS before a moment at which the backoff count value of the channel that is of the current link and that is contended by the other AP backs off to 0. The AP 1 can access the channel through PIFS access only in the backoff period before the PIFS allow timer backs off to 0. In other words, in the backoff period before the PIFS allow timer backs off to 0, a corresponding AP is allowed to perform PIFS access. The AP can perform PIFS access only in the backoff period before the PIFS allow timer backs off to 0.

1002: When contending for a channel of a link 2, an AP 2 learns that the backoff count value of the channel that is of the link 1 and that is contended by the AP 1 backs off to 0 at the first moment, and the AP 2 senses that the contended channel of the link 2 is idle within one PIFS before the first moment, and the PIFS allow timer of the AP 2 is backing off and does not back off to 0, and the AP 2 obtains a transmission opportunity of the channel of the link 2.

For a manner in which the AP 2 obtains a backoff state of the backoff count value of the channel that is of the link 1 and that is contended by the AP 1, refer to the embodiment corresponding to FIG. 6. Details are not described herein again.

In this embodiment, the AP 2 obtains the transmission opportunity of the channel of the link 2 at the first moment, and a moment at which the AP 2 obtains the transmission opportunity of the channel of the link 2 is not strictly required to be the first moment. The moment at which the AP 2 obtains the transmission opportunity of the channel of the link 2 is the first moment, or may be another moment close to the first moment. There may be deviation between a moment at which the AP 2 obtains the transmission opportunity of the channel of the link 2 and the first moment.

After the AP 1 generates the PIFS allow timer, the AP 1 performs backoff based on a backoff count value of the PIFS allow timer. When a remaining count value of the PIFS allow timer is 0, it is considered that the PIFS allow timer backs off to 0.

When the AP 1 generates the PIFS allow timer, a count value obtained when the PIFS allow timer is generated by the AP 1 may be fixed, for example, may be specified in a communication standard. Alternatively, a count value obtained when the PIFS allow timer is generated may be dynamic, for example, may be set by the AP 1 based on a channel state of the link 1.

The AP may send the set count value to a STA that receives a signal transmitted by the AP. For example, the AP may send the count value to the STA by using a beacon frame, a probe request frame, or a probe response frame.

The STA that receives the signal transmitted by the AP may first detect whether the count value obtained when the PIFS allow timer is generated exists in the beacon frame, the probe request frame, or the probe response frame sent by the AP. If the count value exists, the STA obtains, from the beacon frame, the probe request frame, or the probe response frame sent by the AP, the count value when the PIFS allow timer is generated. If the count value does not exist, in other words, if the STA does not obtain, from the AP, the count value when the PIFS allow timer is generated, the count value obtained when the PIFS allow timer is generated is a default value.

The count value obtained when the PIFS allow timer is generated may be a number of slots or may be a number of seconds. In other words, the PIFS allow timer may perform backoff in a unit of a slot, or may perform backoff in a time unit such as second, millisecond, or microsecond.

Duration corresponding to the count value obtained when the PIFS allow timer is generated to be greater than duration of the transmission opportunity that is of the channel of the link 1 and that is obtained by the AP 1. In this way, when the transmission opportunity that is of the channel of the link 1 and that is obtained by the AP 1 through EDCA access ends, and the AP 1 performs next channel contention, the PIFS allow timer does not back off to 0, so that the AP 1 can perform PIFS access in next contention.

It can be learned that, in this embodiment, the PIFS allow timer is used, to allow the AP 1 to perform PIFS access only in a period of time after the first moment after the EDCA access is performed. This helps reduce a probability of accessing a channel consecutively by a same AP through PIFS access, and improve fairness in an access process of multiple channels.

For example, as shown in FIG. 11A, at a first moment T1, a backoff count value c1 of a channel that is of the link 1 and that is contended by the AP 1 backs off to 0. The AP 1 performs EDCA access, and generates a PIFS allow timer, where a count value obtained when the PIFS allow timer is generated is 15. The count value backs off to 0 at a second moment T2. Between T1 and T2 before the PIFS allow timer backs off to 0, the AP 1 may perform PIFS access.

When the AP 1 performs EDCA access at the first moment, the AP 2 performs PIFS access, and obtains a transmission opportunity of a contended channel of the link 2. When the transmission opportunity that is of the channel of the link 2 and that is obtained by the AP 2 at the first moment T1 ends, the AP 2 starts next channel contention, and starts to sense whether the channel of the link 2 is idle. When the AP 2 senses that the contended channel of the link 2 is idle within one AIFS, the AP 2 starts backoff of a backoff count value c2 of the contended channel of the link 2. The backoff count value is a value in (0, CW2]. CW2 is determined based on CWmin and CWmax that are in an EDCA parameter set and that correspond to an AC of the AP 2.

At a third moment T3 between T1 and T2, the backoff count value c2 of the channel that is of the link 2 and that is contended by the AP 2 backs off to 0. The channel that is of the link 1 and that is contended by the AP 1 is idle within one PIFS before T3, and the AP 1 obtains a transmission opportunity of the channel of the link 1 at the moment T3. In other words, the AP 2 performs EDCA access at T3, and the AP 1 performs PIFS access at T3. At a moment at which the AP 2 performs EDCA access, the AP 2 generates a PIFS allow timer, and starts backoff of the PIFS allow timer. The PIFS allow timer backs off to 0 at a fourth moment T4. Between T3 and T4 during which the PIFS allow timer backs off, the AP 2 may perform PIFS access.

It can be learned that the second channel access solution provided in this embodiment of this disclosure not only helps avoid performing PIFS access twice consecutively by an AP, but also enables multiple APs to alternately perform PIFS access. This can not only improve fairness of channel contention between the MLD and another wireless network device that contends for a same channel with the MLD, but also improve fairness of channel access between multiple APs of the MLD.

In some optional embodiments, the AP 1 and/or the AP2 may perform backoff of the PIFS allow timer based on a state of the contended channel. In a backoff process before the PIFS allow timer backs off to 0, the PIFS allow timer may back off only when a channel contended by an AP corresponding to the PIFS allow timer is idle. If the channel contended by the AP corresponding to the PIFS allow timer is busy before the PIFS allow timer backs off to 0, the AP may suspend backoff or increase a backoff count value of the PIFS allow timer. If the channel contended by the AP corresponding to the PIFS allow timer is idle, the AP resumes backoff of the PIFS allow timer or continues backoff of the PIFS allow timer.

Certainly, in another embodiment, in a backoff process of the PIFS allow timer, a channel state may alternatively not be considered.

Figure 10B:
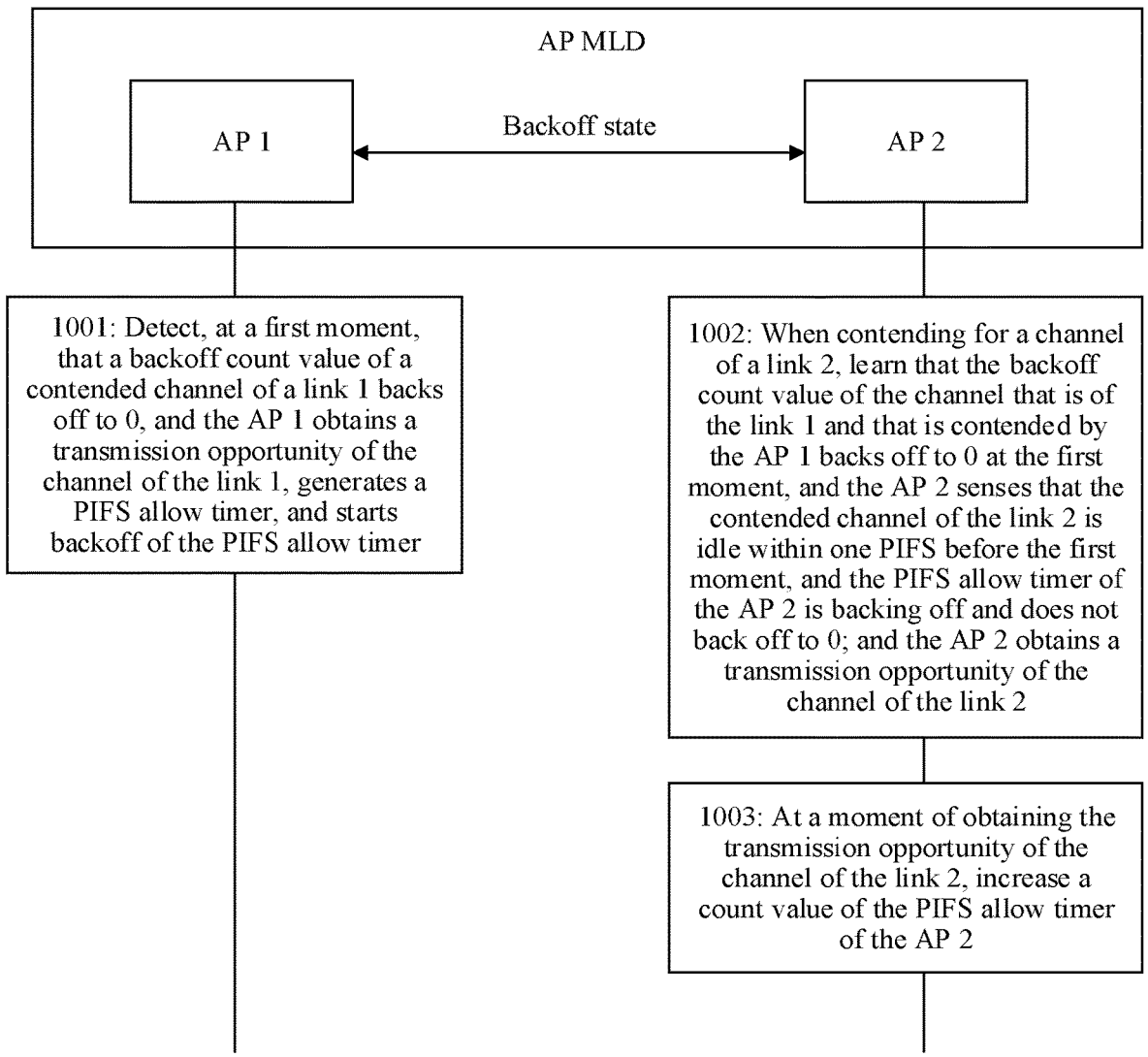
FIG. 10B is another schematic flowchart of a channel contention method according to an embodiment of this disclosure.
Figure 11B:
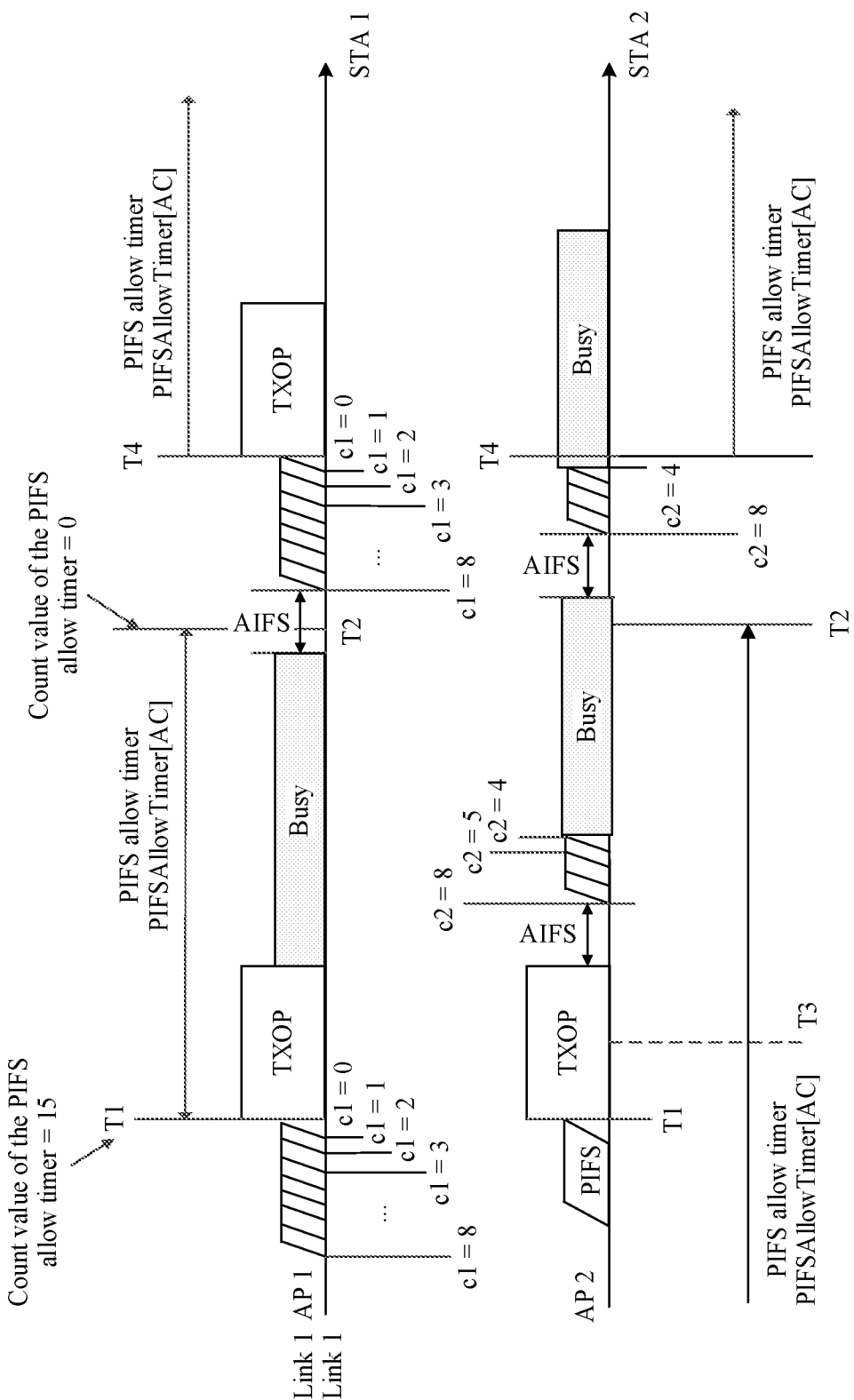
FIG. 11B is a schematic diagram of another scenario of a channel access process according to an embodiment of this disclosure.

FIG. 10B is a schematic flowchart of a channel contention method and FIG. 11B is a schematic diagram of a channel contention scenario. In some other optional embodiments, the channel contention method further includes step 1003: When obtaining the transmission opportunity of the channel of the link 2, the AP 2 increases a count value of the PIFS allow timer of the AP 2. In a backoff period before the PIFS allow timer backs off to 0, the PIFS allow timer is used for allowing the AP 2 to perform PIFS access. In this way, in a period of time after the AP 1 performs EDCA access, both the AP 1 and the AP 2 can perform PIFS access. In this solution, on the basis of improving fairness in an access process of multiple channels, a probability of successfully contending for a channel by each AP of the MLD can be appropriately increased, and data transmission efficiency of the MLD can be improved.

In an example shown in FIG. 11B, at a first moment T1, a backoff count value c1 of a channel that is of the link 1 and that is contended by the AP 1 backs off to 0. The AP 1 obtains the transmission opportunity of the contended channel of the link 1. The channel of the link 2 contended by AP 2 is idle within one PIFS before the first moment, and the AP 2 obtains the transmission opportunity of the channel that is of the link 2 and that is contended by the AP 2. In other words, the AP 1 performs EDCA access at the first moment, and the AP 2 performs PIFS access at the first moment T1. The AP 1 and the AP 2 generate PIFS allow timers at the first moment. The PIFS allow timers of the AP 1 and the AP 2 back off to 0 at T2. The AP 1 and the AP 2 may perform PIFS access between T1 and T2. After T2, the AP 1 performs EDCA access again at a fourth moment T4, and the AP 1 and the AP 2 generate PIFS allow timers at T4.

It should be understood that the moment at which the PIFS allow timer of the AP 1 backs off to 0 may be different from the moment at which the PIFS allow timer of the AP 2 backs off to 0. That is, backoff duration of PIFS allow timers of different APs may be the same or may be different. For ease of description, in this disclosure, that both the moment at which the PIFS allow timer of the AP 1 and the moment at which the PIFS allow timer of the AP 2 backs off to 0 are T2 are used for description. The moment at which the PIFS allow timer of the AP 1 backs off to 0 is not limited to be the same as the moment at which the PIFS allow timer of the AP 2 backs off to 0.

Further, at the moment at which the backoff count value of the channel that is of the link 1 and that is contended by the AP 1 backs off to 1, each AP of the MLD generates a PIFS allow timer and starts backoff of the PIFS allow timer or increases a count value of the PIFS allow timer that is backing off.

In this way, within a period of time after the AP 1 performs EDCA access, all APs of the MLD can perform PIFS access. This can further improve fairness of channel contention between an MLD and a single-link device that contends for a same channel with the MLD.

It should be understood that the foregoing related descriptions of the PIFS allow timers of the AP 1 and the AP 2 are also applicable to a PIFS allow timer of another AP of the MLD. The foregoing solution in which the AP 1 and AP 2 perform backoff of the PIFS allow timers is also applicable to backoff performed by another AP of the MLD on a PIFS allow timer.

In a third channel contention solution provided in embodiments of this disclosure, one switch parameter is configured for each AP. When the switch parameter of the AP is ON, the AP can perform PIFS access. When the switch parameter of the AP is OFF, the AP cannot perform PIFS access. After the AP performs PIFS access, the switch parameter of the AP is set to OFF. This avoids performing PIFS access twice consecutively by a same AP, to improve fairness in an access process of multiple channels.

The following describes the channel contention solution in detail with reference to a channel contention method in embodiments of this disclosure.

Figure 12:
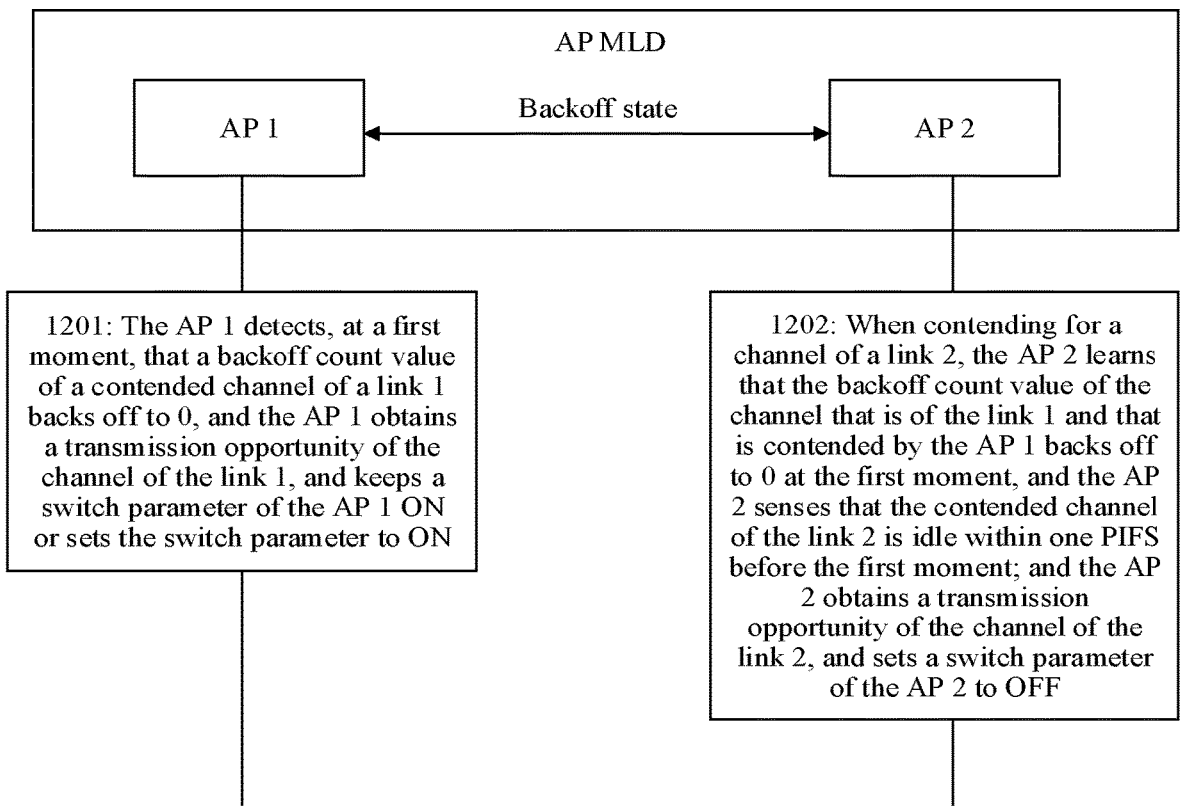
FIG. 12 is another schematic flowchart of a channel contention method according to an embodiment of this disclosure.
Figure 13:
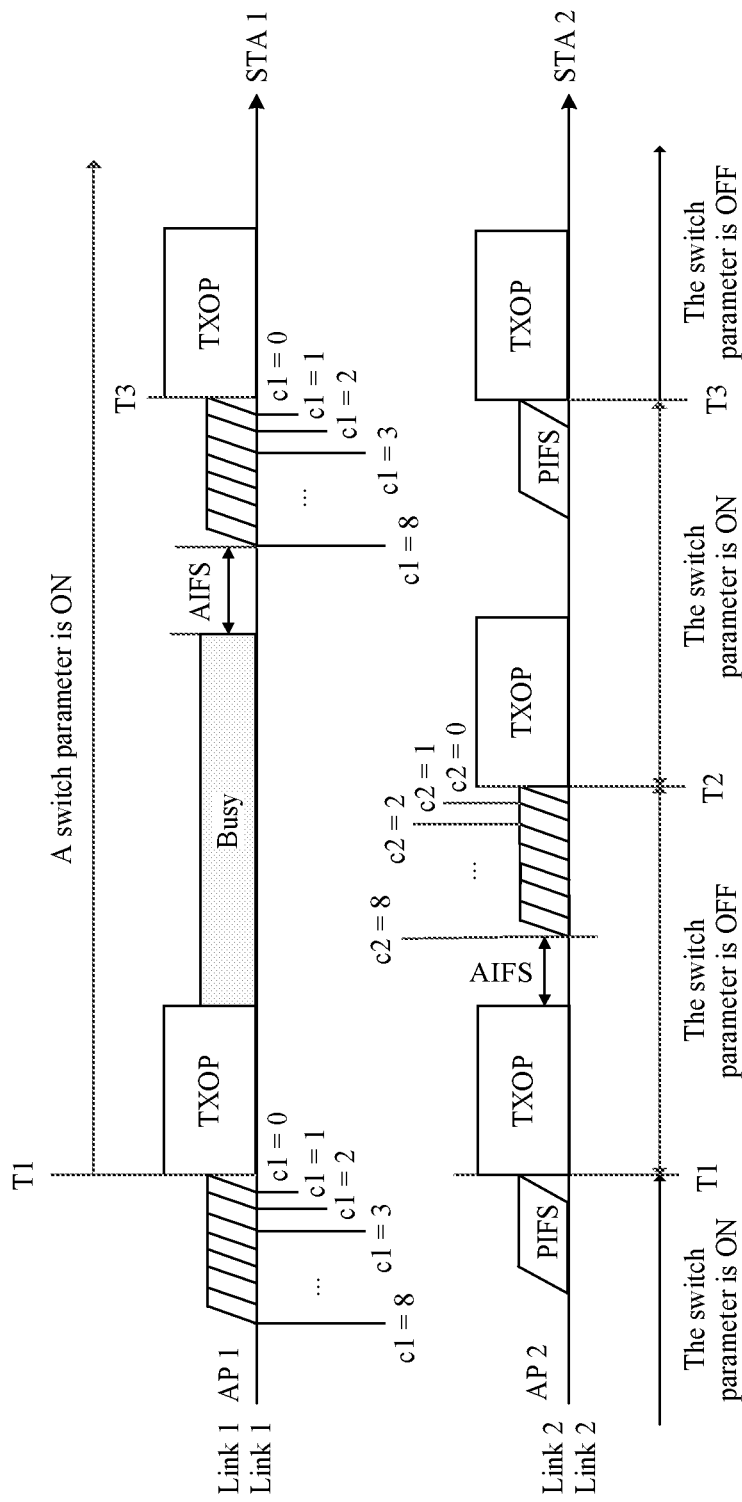
FIG. 13 is a schematic diagram of another scenario of a channel access process according to an embodiment of this disclosure.

Refer to a schematic flowchart of a channel contention method according to another embodiment shown in FIG. 12 and a schematic diagram of a channel access scenario shown in FIG. 13. The channel contention method in another embodiment of this disclosure may include the following steps.

1201: An AP 1 detects, at a first moment, that a backoff count value of a contended channel of a link 1 backs off to 0, and the AP 1 obtains a transmission opportunity of the channel of the link 1, and keeps a switch parameter of the AP 1 ON or sets the switch parameter to ON.

1202: When contending for a channel of a link 2, an AP 2 learns that the backoff count value of the channel that is of the link 1 and that is contended by the AP 1 backs off to 0 at the first moment, and the AP 2 senses that the contended channel of the link 2 is idle within one PIFS before the first moment, and the AP 2 obtains a transmission opportunity of the channel of the link 2, and sets a switch parameter of the AP 2 to OFF. When the switch parameter is OFF, the AP 2 cannot perform PIFS access.

The switch parameter indicates whether a corresponding AP can perform PIFS access. Further, when the switch parameter of the AP is ON, the AP can perform PIFS access. When the switch parameter of the AP is OFF, the AP cannot perform PIFS access. In other words, when the switch parameter of the AP is OFF, a channel access manner is EDCA access.

To be specific, if the switch parameter of the AP is ON, when a backoff count value of a channel that is of a current link and that is contended by any other AP of an MLD backs off to 0, and the channel that is of the current link and that is contended by the AP is idle within one PIFS before a moment at which the backoff count value backs off to 0, the AP obtains a transmission opportunity of the channel that is of the current link and that is contended by the AP. If the switch parameter of the AP is OFF, when a backoff count value of a channel that is of a current link and that is contended by any other AP of an MLD backs off to 0, and the channel that is of the current link and that is contended by the AP is idle within a PIFS, the AP cannot obtain a transmission opportunity of the channel. In other words, when the switch parameter of the AP is OFF, the AP can obtain the transmission opportunity of the channel only when a backoff count value of the channel of the current link backs off to 0. The current link is a channel for data transmission between the AP and a STA. For example, a current link of the AP 2 is the link 2.

It can be learned that in the technical solution of this disclosure, after performing PIFS access, the AP sets the switch parameter to OFF, to avoid performing PIFS access twice consecutively by the AP. This avoids performing PIFS access twice consecutively by a same AP, to help improve fairness in an access process of multiple channels.

After the transmission opportunity of the link 2 obtained by the AP 2 at the first moment ends, the AP 2 performs next channel contention if the switch parameter is OFF. In next channel contention, when a backoff count value of the channel of the link 2 contended by the AP 2 backs off to 0, the AP 2 obtains a transmission opportunity of the contended channel of the link 2, and sets the switch parameter to ON. As shown in FIG. 13, a backoff window of the channel that is of the link 2 and that is contended by the AP 2 backs off to 0 at a second moment T2 after a first moment T1. Since T2, the switch parameter of AP 2 is ON. When the switch parameter of AP 2 is ON, the AP 2 can perform PIFS access. To be specific, if the switch parameter of the AP 2 is ON, when a backoff count value of a channel contended by another AP (for example, the AP 1) of the MLD backs off to 0, and the channel that is of the link 2 and that is contended by the AP 2 is idle within one PIFS before a moment at which the backoff count value of the channel contended by the other AP (for example, the AP 1) backs off to 0, the AP 2 may obtain a transmission opportunity of the channel that is of the link 2 and that is contended by the AP 2.

In this way, after an AP performs EDCA access, a switch parameter is set to ON, and the AP is allowed to perform PIFS access, so that efficiency of accessing a channel by the AP can be improved while ensuring fairness.

It should be understood that, when the AP performs EDCA access, the switch parameter may be ON or OFF. For example, in the example shown in FIG. 13, at T3, the switch parameter of the AP 1 is ON. At T3, a backoff count value c1 of the channel that is of the link 1 and that is contended by the AP 1 backs off to 0, and the AP 1 performs EDCA access, and keeps the switch parameter of the AP 1 ON.

For another example, in the example shown in FIG. 13, at T2, the switch parameter of the AP 2 is OFF. At T2, a backoff count value c2 of the channel that is of the link 2 and that is contended by the AP 2 backs off to 0, and the AP 2 performs EDCA access, and sets the switch parameter of the AP 2 to ON.

In a fourth channel contention solution provided in embodiments of this disclosure, when at least one AP in multiple APs of an MLD performs PIFS access, a remaining backoff count value of a channel that is of a current link and that is contended by the AP that performs PIFS access is reserved. The remaining backoff count value of the channel that is of the current link and that is contended by the AP that performs PIFS access is added to a part or all of the multiple APs of the MLD. Backoff count values of channels that are of the current link and that are contended by the part of or all of the multiple APs of the MLD are increased, to reduce a probability of performing PIFS access consecutively by a same AP, to improve fairness in an access process of multiple channels.

Figure 14A:
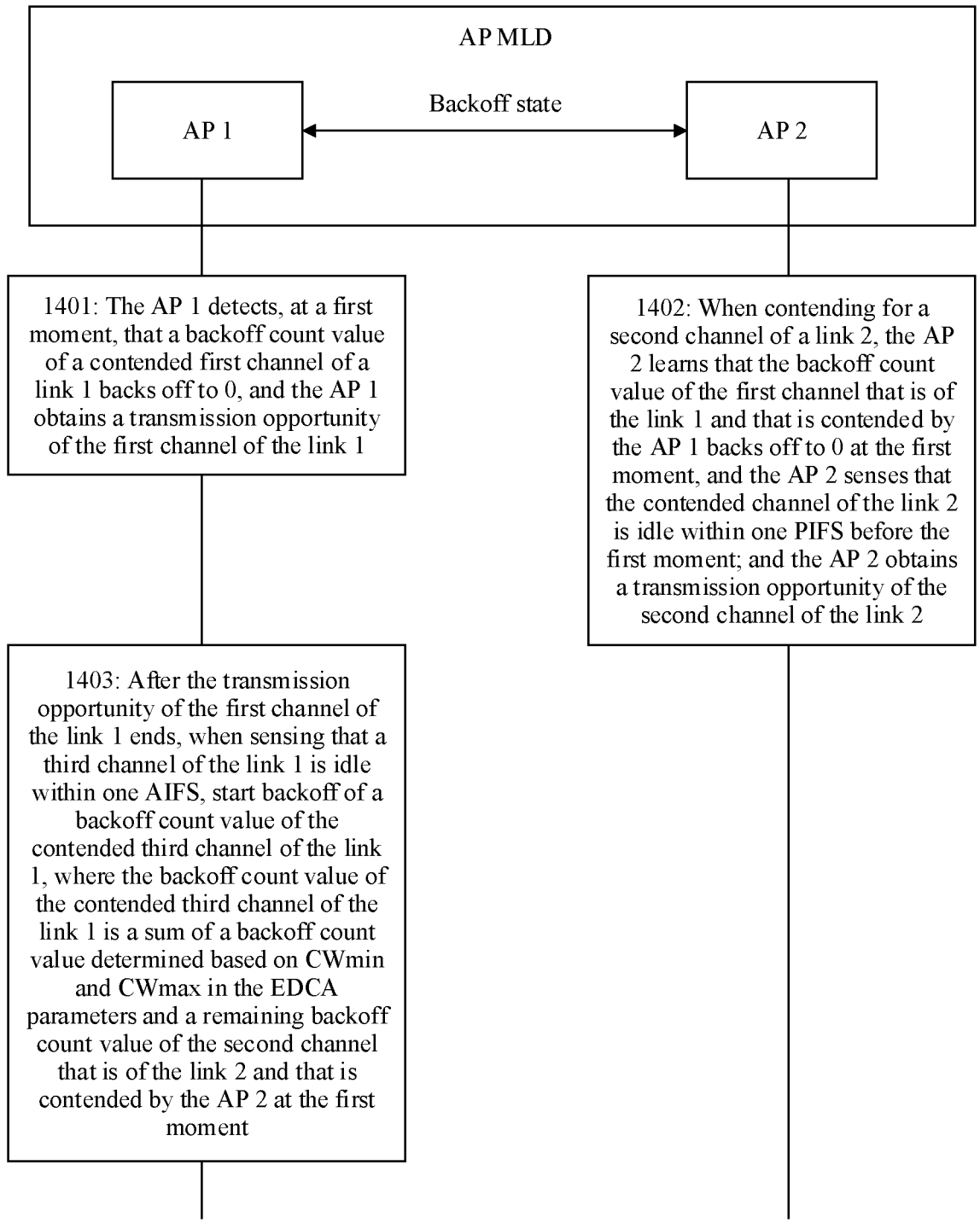
FIG. 14A is another schematic flowchart of a channel contention method according to an embodiment of this disclosure.

In some embodiments of this disclosure, the remaining backoff count value of the channel that is of the current link and that is contended by the AP that performs PIFS access is added to a remaining backoff count value of a channel that is of the current link and that is contended next time by an AP that performs EDCA access. Refer to a schematic flowchart of a channel contention method shown in FIG. 14A and a schematic diagram of a channel access scenario shown in FIG. 15. The channel contention method in another embodiment of this disclosure may include the following steps.

1401: An AP 1 detects, at a first moment, that a backoff count value of a contended channel of a link 1 backs off to 0, and the AP 1 obtains a transmission opportunity of a first channel of the link 1.

1402: When contending for a second channel of a link 2, an AP 2 learns that the backoff count value of the first channel that is of the link 1 and that is contended by the AP 1 backs off to 0 at the first moment, and the AP 2 senses that the contended channel of the link 2 is idle within one PIFS before the first moment, and the AP 2 obtains a transmission opportunity of the second channel of the link 2.

For a manner in which the AP 2 obtains a backoff state of the backoff count value of the channel that is of the link 1 and that is contended by the AP 1, refer to related descriptions in the embodiment corresponding to FIG. 6. Details are not described herein again.

1403: After the transmission opportunity of the first channel of the link 1 ends, when the AP 1 senses that a third channel of the link 1 is idle within one AIFS, the AP 1 starts backoff of a backoff count value of the contended third channel of the link 1, where the backoff count value of the contended third channel of the link 1 is a sum of a value randomly obtained from (0, CW1] and a remaining backoff count value of the second channel that is of the link 2 and that is contended by the AP 2, and CW1 is determined based on CWmin and CWmax in EDCA parameters. The AIFS is determined based on AIFSN in the EDCA parameters, and the third channel is a channel of the link 1. The third channel and the first channel may be a same channel, or may be different channels.

Figure 15:
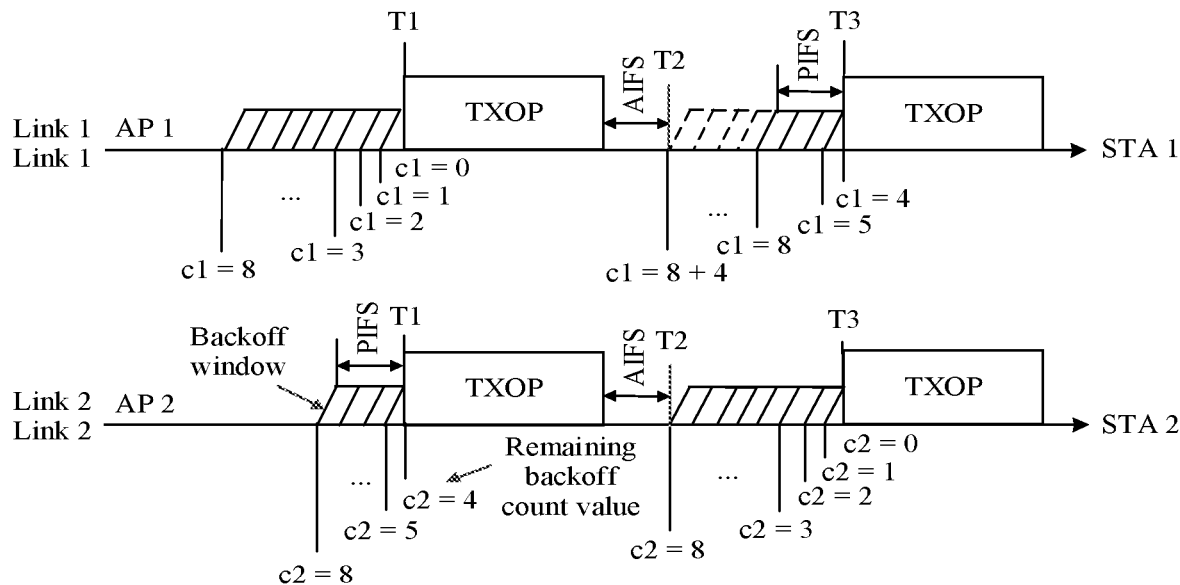
FIG. 15 is a schematic diagram of another scenario of a channel access process according to an embodiment of this disclosure.

For example, as shown in FIG. 15, the value randomly obtained by the AP 1 from (0, CW1] is 8, the remaining backoff count value of the second channel that is of the link 2 and that is contended by the AP 2 at the first moment is 4, and a backoff count value c1 of the third channel that is of the link 1 and that is contended by the AP 1 is equal to 8+4=12.

In this way, when the AP 1 performs next channel contention, a backoff count value to be backed off increases, to increase difficulty of backing off to 0 of the backoff count value of the second channel that is of the link 1 and that is contended by the AP 1, and increase difficulty of accessing the channel by the AP 1. This reduces a probability of performing PIFS access again by the AP 2 when the AP 1 performs EDCA again. In this way, when the AP 1 and the AP 2 perform next channel contention, a probability of successfully accessing a channel is reduced, to increase a probability of successfully accessing the channel by another network device that contends for the same channel as the AP 1 or the AP 2, and improve fairness in a process in which a wireless network device accesses multiple channels.

In other words, in such a solution, difficulty of backing off a backoff count value to 0 in next channel contention of an AP that performs EDCA access in the current channel contention is increased, to reduce a probability of performing PIFS access again in the next channel contention by an AP that performs PIFS access in the current channel contention, and reduce a probability of performing PIFS access consecutively by a same AP of the MLD.

If the AP 2 does not start backoff at the first moment, the remaining backoff count value is 0 or CWmin.

It may be understood that, the MLD may include two APs, in other words, the MLD may include only two APs: the AP 1 and the AP 2. Alternatively, the MLD may include more than two APs. In this way, the MLD further includes an AP other than the AP 1 and the AP 2.

At the first moment at which the AP 1 performs EDCA access, if multiple APs perform PIFS access, the backoff count value of the third channel contended by the AP 1 is a sum of a value randomly obtained from (0, CW1] and an accumulated value of remaining backoff count values of the multiple APs at the first moment. CW1 is a sum of a backoff count value determined based on CWmin and CWmax in the EDCA parameters and the accumulated value of the remaining backoff count values of the multiple APs that perform PIFS access at the first moment.

For example, the value randomly obtained by the AP 1 from (0, CW1] is 8, three APs (the AP 2, an AP 3, and an AP 4) perform PIFS access at the first moment. Remaining backoff count values of channels that are of the current link and that are contended by the three APs at the first moment are 4, 2, and 1. An accumulated value of the remaining backoff count values of the three APs at the first moment is 7. In this case, the backoff count value c1 of the third channel that is of the link 1 and that is contended by the AP 1 is equal to 8+7=15.

If multiple APs perform EDCA access at the first moment at which the AP 1 performs EDCA access, a backoff count value of a channel that is of a current link and that is contended next time by each AP that performs EDCA access at the first moment is a sum of a value randomly obtained from (0, CW1] and an accumulated value of remaining backoff count values of one or more APs that perform PIFS access at the first moment.

In this case, the backoff count value of the third channel that is of the link 1 and that is contended by the AP 1 is not limited by CWmax in the EDCA parameter. In other words, if the backoff count value of the third channel that is of the link 1 and that is contended by the AP 1 is greater than CWmax in the EDCA parameters, the backoff count value of the contended third channel of the link 1 is still used.

In this embodiment, the AP 1 is allowed to perform PIFS access only after the backoff count value of the third channel that is of the link 1 and that is contended by the AP 1 backs off to be less than or equal to a specified threshold. When the backoff count value of the third channel that is of the link 1 and that is contended by the AP 1 is greater than the specified threshold, the AP 1 is not allowed to perform PIFS access. The specified threshold may be specified in a standard, or may be set by the AP 1. The threshold is less than CWmax.

Figure 14B:
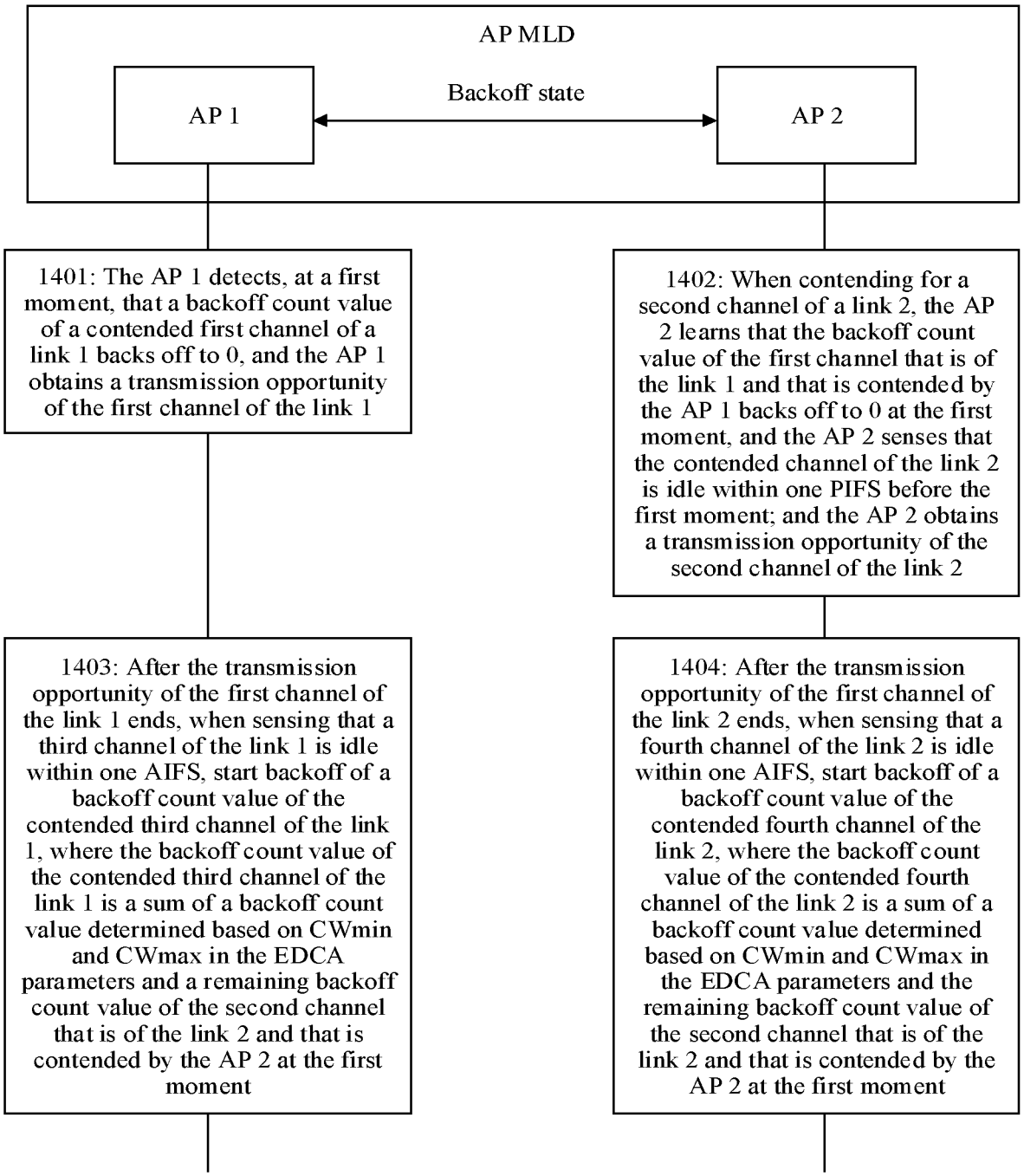
FIG. 14B is another schematic flowchart of a channel contention method according to an embodiment of this disclosure.
Figure 16:
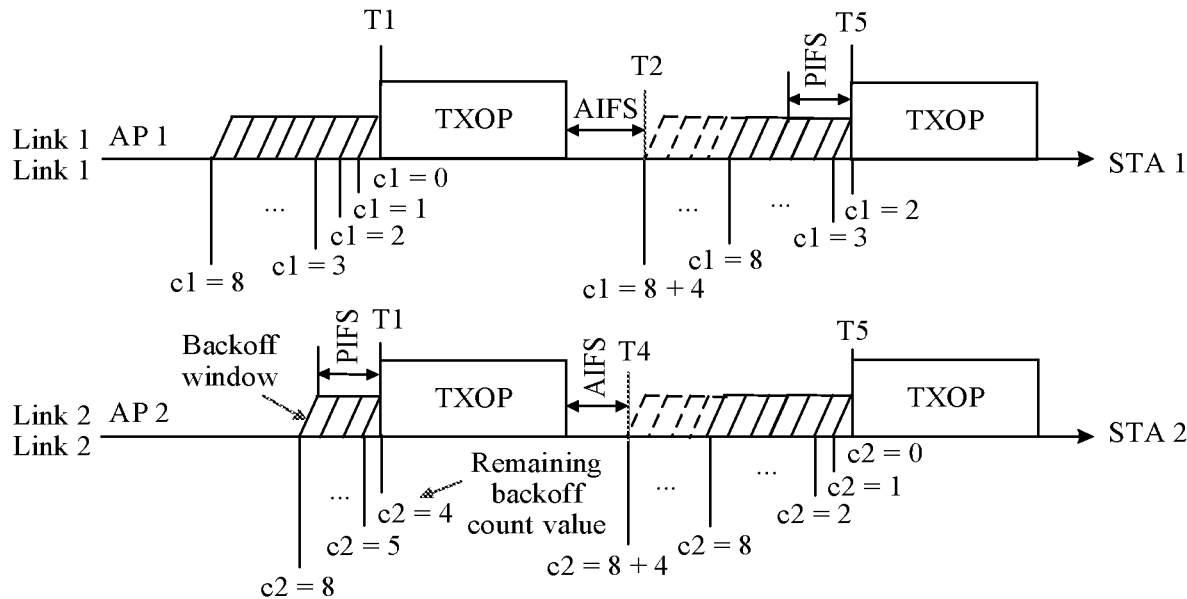
FIG. 16 is a schematic diagram of another scenario of a channel access process according to an embodiment of this disclosure.

FIG. 14B is a schematic flowchart of a channel contention method and FIG. 16 is a schematic diagram of a channel access scenario. In some embodiments of this disclosure, a remaining backoff count value of a channel that is of a current link and that is contended by an AP that performs PIFS access is added to a remaining backoff count value of a channel that is of the current link and that is contended next time by an AP that performs PIFS access and a remaining backoff count value of a channel that is of the current link and that is contended next time by an AP that performs EDCA access. Further, based on the embodiment in FIG. 14A, the channel contention method includes the following steps.

1404: After the transmission opportunity of the first channel of the link 2 ends, when the AP 2 senses that a fourth channel of the link 2 is idle within one AIFS, the AP 2 starts backoff of a backoff count value of the contended fourth channel of the link 2, where the backoff count value of the contended fourth channel of the link 2 is a sum of a value randomly obtained from (0, CW2] and a remaining backoff count value of the second channel that is of the link 2 and that is contended by the AP 2 at the first moment, and CW2 is determined based on CWmin and CWmax in EDCA parameters. The AIFS is determined based on AIFSN in the EDCA parameters, and the fourth channel is a channel of the link 2. The fourth channel and the second channel may be a same channel, or may be different channels.

In this way, required duration in which backoff count values of the channels contended by the AP 1 and the AP 2 in next channel contention back off to 0 can be increased. This increases difficulty of successfully accessing a channel by the AP 2 and the AP 1 in next channel contention, and increases a probability of successful access of another wireless network device that contends for the third channel or the fourth channel, to help improve fairness in an access process of multiple channels.

The remaining backoff count value of the second channel that is of the link 2 and that is contended by the AP 2 at the first moment included in the backoff count value of the fourth channel that is of the link 2 and that is contended by the AP 2 is the same as the remaining backoff count value of the second channel that is of the link 2 and that is contended by the AP 2 at the first moment included in the backoff count value of the third channel that is of the link 1 and that is contended by the AP 1.

If the AP 2 does not start backoff at the first moment, the remaining backoff count value is 0 or CWmin.

As shown in FIG. 16, when the transmission opportunity that is of the first channel of the link 1 and that is obtained by the AP 1 ends, the AP 1 performs next channel contention, to contend for the third channel of the link 1. At a second moment T2, the AP 1 senses that the third channel is idle within one AIFS, and the AP 1 starts backoff of the backoff count value of the contended third channel of the link 1. The backoff count value of the contended third channel of the link 1 is 12. Further, the value randomly obtained by the AP 1 from (0, CW1] is 8, the remaining backoff count value of the second channel that is of the link 2 and that is contended by the AP 2 at the first moment is 4, and a sum of the two is the backoff count value of the contended third channel of the link 1.

When the transmission opportunity that is of the second channel of the link 2 and that is obtained by the AP 2 ends, the AP 2 performs next channel contention, to contend for the fourth channel of the link 1. At a fourth moment T4, the AP 2 senses that the fourth channel is idle within one AIFS, and the AP 2 starts backoff of the backoff count value of the contended fourth channel of the link 2. The backoff count value of the contended fourth channel of the link 2 is 12. Further, the value randomly obtained by the AP 2 from (0, CW2] is 8, the remaining backoff count value of the second channel that is of the link 2 and that is contended by the AP 2 at the first moment is 4, and a sum of the two is the backoff count value of the contended fourth channel of the link 2.

At a fifth moment T5, the backoff count value of the contended fourth channel of the link 2 backs off to 0, and the AP 2 obtains a transmission opportunity of the fourth channel of the link 2. The channel of the link 1 contended by AP 1 is idle within one PIFS before the fifth moment, and the AP 1 obtains a transmission opportunity of the third channel of the link 1. In other words, the AP 2 performs EDCA access at the fifth moment. The AP 1 performs PIFS access when the AP 2 performs EDCA access.

It may be understood that, the MLD may include two APs, in other words, the MLD may include only two APs: the AP 1 and the AP 2. Alternatively, the MLD may include more than two APs. In this way, the MLD further includes an AP other than the AP 1 and the AP 2.

If at the first moment at which the AP 1 performs EDCA access, multiple APs perform PIFS access, the backoff count value of the fourth channel that is of the link 2 and that is contended by the AP 2 is a sum of a value randomly obtained from (0, CW2] and an accumulated value of remaining backoff count values of the multiple APs that perform PIFS access at the first moment.

For example, the value randomly obtained by the AP 2 from (0, CW1] is 8, three APs (the AP 2, an AP 3, and an AP 4) perform PIFS access at the first moment. An accumulated value of remaining backoff count values of channels of the three APs at the first moment is 7. In this case, a backoff count value c2 of the fourth channel that is of the link 2 and that is contended by the AP 2 is equal to 8+7=15.

In this case, the backoff count value of the fourth channel that is of the link 2 and that is contended by the AP 2 is not limited by CWmax in the EDCA parameter. In other words, if the backoff count value of the fourth channel that is of the link 2 and that is contended by the AP 2 is greater than CWmax in the EDCA parameters, the backoff count value of the contended fourth channel of the link 2 is still used.

In this embodiment, the AP 2 is allowed to perform PIFS access only after the backoff count value of the fourth channel that is of the link 2 and that is contended by the AP 2 backs off to be less than or equal to a specified threshold. When the backoff count value of the fourth channel that is of the link 2 and that is contended by the AP 2 is greater than the specified threshold, the AP 2 is not allowed to perform PIFS access. The specified threshold may be specified in a standard, or may be set by the AP 2. The threshold is less than CWmax.

Based on this embodiment, in a further embodiment, the remaining backoff count value of the channel that is of the current link and that is contended by the AP that performs PIFS access may be added to remaining backoff count values of channels that are of the current link and that are contended next time by all APs of the MLD. In this way, backoff count values of the channels that are of the current link and that are contended next time by all the APs of the MLD are a sum of a value randomly obtained from (0, CWi] and a remaining backoff count value of a channel that is of the current link and that is contended by the AP at the first moment. CWi is determined by the AP based on CWmin and CWmax that are in the EDCA parameters and that correspond to an AC of the AP. In this way, required duration in which the backoff count values of the channels that are of the current link and that are contended by all the APs of the MLD next time back off to 0 can be increased. This can reduce a probability of successfully accessing the channel by the APs of the MLD in next channel contention, and improve fairness in an access process of multiple channels.

In this embodiment, any AP of the MLD can obtain a transmission opportunity of a contended channel only when a backoff count value of the channel that is of the current link and that is contended by another AP backs off to 0, and a backoff count value of the channel that is of the current link and that is contended by the AP is less than or equal to a specified threshold. In other words, when the any AP performs PIFS access, the backoff count value of the channel that is of the current link and that is contended by the AP needs to be less than or equal to the specified threshold. In this way, difficulty of performing PIFS access by an AP of the MLD is increased, to further reduce a probability of performing PIFS access by the AP of the MLD, and better improve fairness in an access process of multiple channels.

Figure 14C:
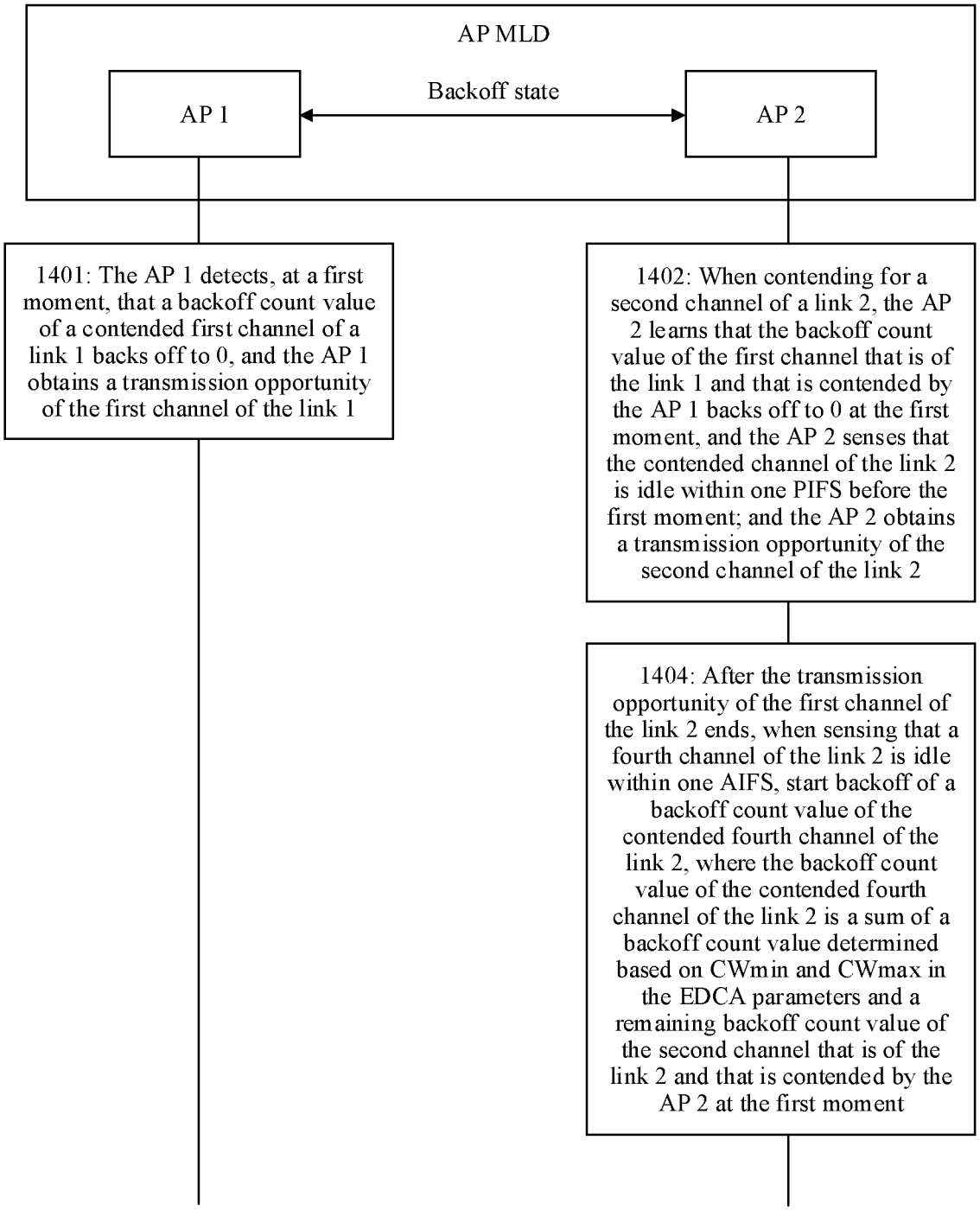
FIG. 14C is another schematic flowchart of a channel contention method according to an embodiment of this disclosure.
Figure 17:
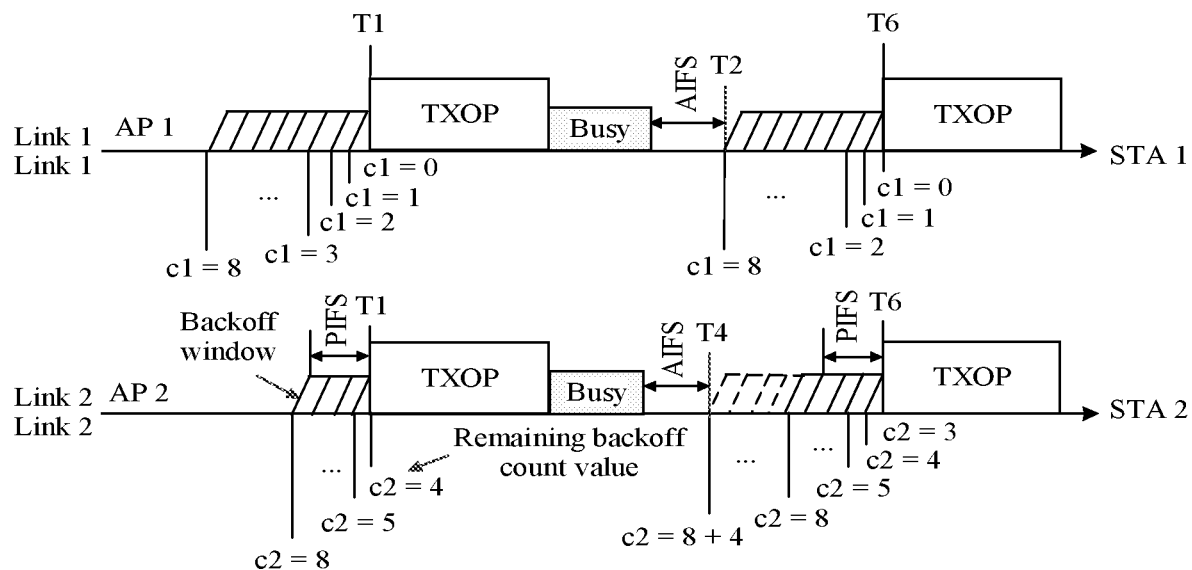
FIG. 17 is a schematic diagram of another scenario of a channel access process according to an embodiment of this disclosure.

FIG. 14C is a schematic flowchart of a channel contention method and FIG. 17 is a schematic diagram of a channel access scenario. In some other embodiments, a remaining backoff count value of a channel that is of a current link and that is contended by an AP that performs PIFS access is added to a remaining backoff count value of a channel that is of the current link and that is contended next time by an AP that performs PIFS access. Further, the channel transmission method includes the foregoing steps 1401, 1402, and 1404. In this embodiment, after the AP 2 performs PIFS access to access the second channel, the backoff count value of the contended fourth channel of the link 2 is increased, so that a probability of obtaining the transmission opportunity of the fourth channel by the AP 2 can be reduced, and a probability of obtaining the transmission opportunity of the fourth channel by another wireless network device that contends for the fourth channel simultaneously with the AP 2 is greater. This improves fairness in an access process of multiple channels.

It should be understood that related descriptions of step 1404 in the foregoing embodiment are also applicable to this embodiment, and details are not described herein again.

As shown in FIG. 17, when the transmission opportunity that is of the first channel of the link 1 and that is obtained by the AP 1 ends, the AP 1 performs next channel contention, to contend for the third channel of the link 1. The third channel and the first channel may be a same channel, or may be different channels. At a second moment T2, the AP 1 senses that the third channel is idle within one AIFS, and the AP 1 starts backoff of a backoff count value c1 of the third channel that is of the link 1 and that is contended by the AP 1. The backoff count value c1 is a value in (0, CW1]. CW1 is determined based on CWmin and CWmax in an EDCA parameter set.

When the transmission opportunity that is of the second channel of the link 2 and that is obtained by the AP 2 ends, the AP 2 performs next channel contention, to contend for the fourth channel of the link 1. At a fourth moment T4, the AP 2 senses that the fourth channel is idle within one AFIS, and the AP 2 starts backoff of a backoff count value of the contended fourth channel of the link 2 c2. The backoff count value of the contended fourth channel of the link 2 is 12. Further, the value randomly obtained by the AP 2 from (0, CW2] is 8, the remaining backoff count value of the second channel that is of the link 2 and that is contended by the AP 2 at the first moment is 4, and a sum of the two is the backoff count value of the contended fourth channel of the link 2. CW2 is determined based on CWmin and CWmax in an EDCA parameter set.

At a sixth moment T6, the backoff count value c1 of the contended third channel of the link 1 backs off to 0, and the AP 1 obtains a transmission opportunity of the third channel of the link 1. The AP 2 is idle within one PIFS before the sixth moment, and the AP 2 obtains a transmission opportunity of the fourth channel of the link 2. In other words, the AP 1 performs EDCA access at the sixth moment. The AP 2 performs PIFS access when the AP 1 performs EDCA access.

For example, based on the example shown in FIG. 17, at a fourth moment T4, the AP 2 senses that the fourth channel of the link 2 is idle within one AIFS, and the AP 2 starts backoff of the backoff count value of the contended fourth channel of the link 2. T4 is earlier than T3. Both the backoff count value c1 that is of the contended third channel of the link 1 and that is randomly obtained by the AP 1 from (0, CW1] and the backoff count value c2 that is of the contended fourth channel of the link 2 and that is randomly obtained by the AP 2 from (0, CW2] are 8.

In this case, it is assumed that the backoff count value of the fourth channel that is of the link 2 and that is contended by the AP 2 does not include the remaining backoff count value of the second channel that is of the link 2 and that is contended by the AP 2 at the first moment. In this case, the AP 2 first starts backoff of the backoff count value of the fourth channel that is of the link 2 and that is contended by the AP 2, and the backoff count value can back off to 0 before the backoff count value of the third channel that is of the link 1 and that is contended by the AP 1 backs off to 0. When the backoff count value of the fourth channel that is of the link 2 and that is contended by the AP 2 backs off to 0, the AP 2 performs EDCA access, and the AP 2 performs PIFS access. For example, if the backoff count value of the fourth channel that is of the link 2 and that is contended by the AP 2 does not include the remaining backoff count value of the second channel that is of the link 2 and that is contended by the AP 2 at the first moment, at a moment in which c2=4 after T4 in FIG. 17, both the AP 1 and the AP 2 can access the contended channels.

It can be learned that, according to the solution in this disclosure, the AP 1 and the AP 2 access the channels at a sixth moment T6. This prolongs duration required for the AP 1 and the AP 2 to access the channels. In this way, after an AP of the MLD performs PIFS access, a probability of successfully contending for a channel by the AP of the MLD is reduced, and a probability of successfully contending for a channel by another network device that contends for the third channel or the fourth channel is increased. This effectively improves fairness in an access process of multiple channels.

Figure 18:
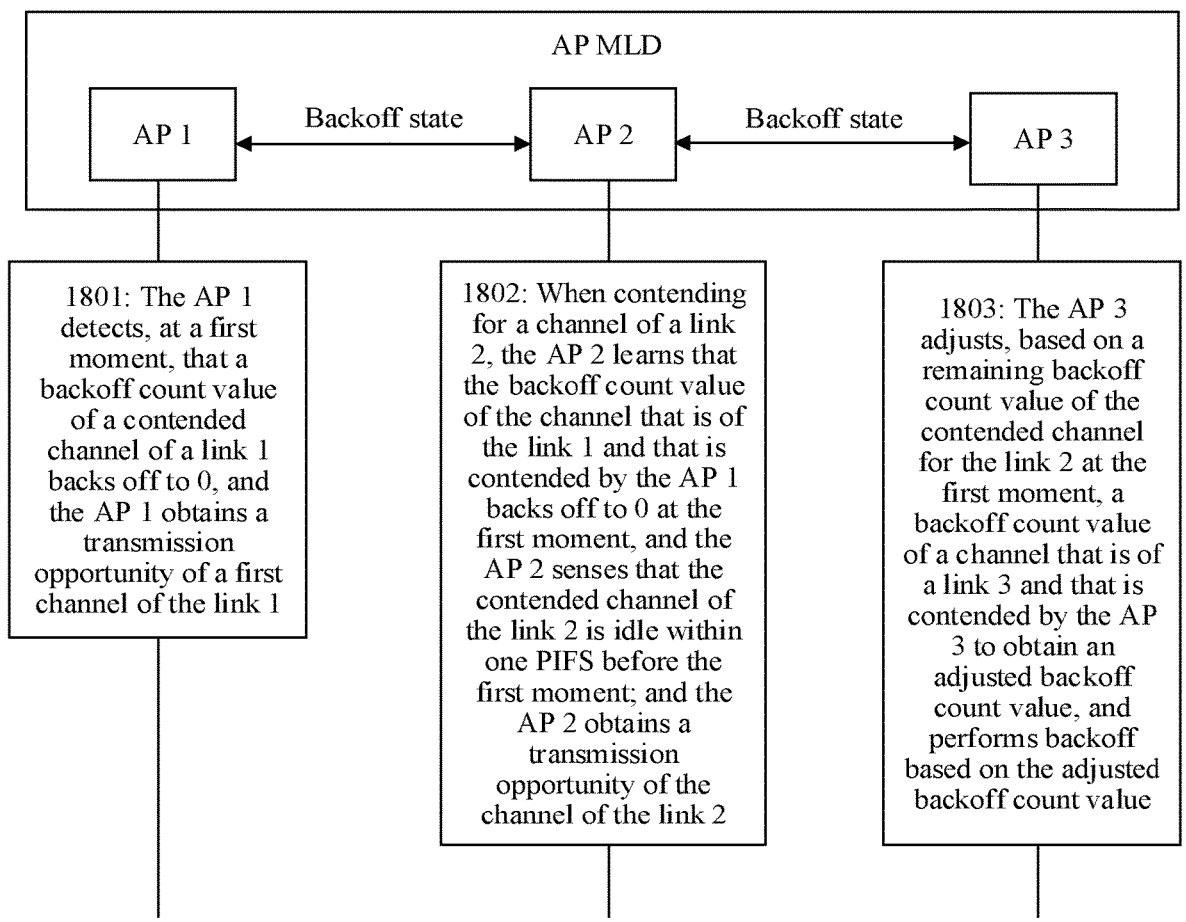
FIG. 18 is another schematic flowchart of a channel contention method according to an embodiment of this disclosure.
Figure 19:
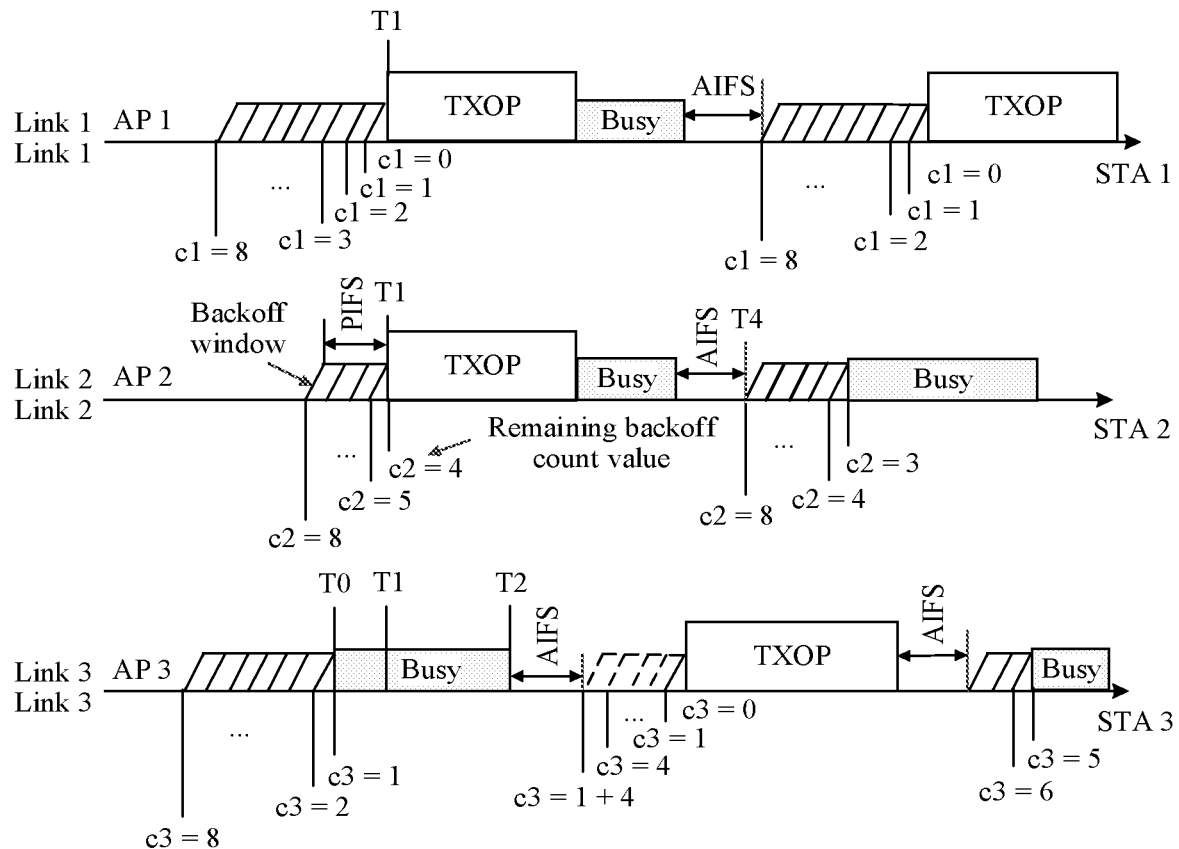
FIG. 19 is a schematic diagram of another scenario of a channel access process according to an embodiment of this disclosure.

FIG. 18 is a schematic flowchart of a channel contention method and FIG. 19 is a schematic diagram of a channel access scenario. In still some other embodiments, a remaining backoff count value of a channel that is of a current link and that is contended by an AP that performs PIFS access is added to a minimum backoff count value of backoff count values of channels that are of a current link and that are contended by multiple APs of an MLD during PIFS access. Further, the channel contention method includes the following steps.

1801: An AP 1 detects, at a first moment, that a backoff count value of a contended channel of a link 1 backs off to 0, and the AP 1 obtains a transmission opportunity of a first channel of the link 1.

1802: When contending for a channel of a link 2, an AP 2 learns that the backoff count value of the channel that is of the link 1 and that is contended by the AP 1 backs off to 0 at the first moment, and the AP 2 senses that the contended channel of the link 2 is idle within one PIFS before the first moment, and the AP 2 obtains a transmission opportunity of the channel of the link 2.

1803: An AP 3 adjusts, based on a remaining backoff count value of the contended channel for the link 2 at the first moment, a backoff count value of a channel that is of a link 3 and that is contended by the AP 3 to obtain an adjusted backoff count value, and performs backoff based on the adjusted backoff count value. The AP 3 is an AP in the multiple APs of the MLD, and a backoff count value of a channel that is of a current link and that is contended by the AP at the first moment is the smallest. The AP 3 is any AP of the MLD, and the AP 3 may be the AP 1, may be the AP 2, or may be an AP other than the AP 1 and the AP 2 of the MLD.

Further, a manner in which the AP 3 adjusts the backoff count value of the channel that is of the link 3 and that is contended by the AP 3 to obtain the adjusted backoff count value may be: using the backoff count value of the channel that is of the link 3 and that is contended by the AP 3 plus the remaining backoff count value of the contended channel for the link 2 at the first moment as the adjusted backoff count value.

As shown in FIG. 19, at T0, a remaining backoff count value c3 of a channel that is of a current link and that is contended by the AP 3 is 1, and the contended channel enters a busy state. The AP 3 reserves the remaining backoff count value c3.

At a first moment T1, a backoff count value c1 of a channel that is of the link 1 and that is contended by the AP 1 backs off to 0. The AP 1 accesses the channel of the link 1, and obtains a transmission opportunity of the channel. A channel that is of the link 2 and that is contended by the AP 2 is idle within one PIFS before T1. The AP 2 accesses the contended channel of the link 2, and obtains a transmission opportunity of the channel. A remaining backoff count value c2 in a backoff count value of a channel that is of the link 2 and that is contended by the AP 2 at T1 is equal to 4.

At the first moment, the remaining backoff count value c3 of the channel that is of the current link and that is contended by the AP 3 is the smallest in all the APs of the MLD, and is 1. The current link is the link 3 for transmitting data from the AP 3 to a STA 3.

The remaining backoff count value c2 in the backoff count value of the channel that is of the link 2 and that is contended by the AP 2 at T1 is added to c3. In this way, the remaining backoff count value c3 of the channel that is of the link 3 and that is contended by the AP 3 is equal to 1+4=5. At a second moment T2, the AP 3 detects that the contended channel of the link 3 is idle within one AIFS, and the AP 3 starts backoff of c3 at T2. When c3 backs off to 0, the AP 3 obtains a transmission opportunity of the contended channel of the link 3.

In this solution, to punish the AP 2 for PIFS access, an AP that is the fastest to successfully access a channel in all APs of the MLD does not access the channel. In this way, another network device that contends for a same channel as the AP that is the fastest to successfully access the channel is more possible to successfully access the channel. This helps improve fairness in an access process of multiple channels.

Based on any one of the foregoing embodiments, in a further embodiment, the AP 1 obtains a transmission opportunity of a channel of the link 1, and the AP 1 transmits a physical layer protocol data unit (PPDU) to the STA 1 through the channel of the link 1. The AP 2 obtains a transmission opportunity of a channel of the link 2, and the AP 2 transmits a PPDU to a STA 2 through the channel of the link 2. If the AP 1 or the AP 2 fails to transmit the PPDU, both the AP 2 and the AP 2 perform backoff recovery. To be specific, the AP 1 randomly obtains a backoff count value from (1, CW1], and starts backoff of the backoff count value. The AP 2 randomly obtains a backoff count value from (1, CW2], and starts backoff of the backoff count value. In this way, the AP 1 and the AP 2 can simultaneously access the channels and simultaneously end transmission. When the MLD is a non-STR MLD, data can be sent simultaneously through multiple links of the non-STR MLD, to avoid sending data over one link while receiving data over another link by the non-STR MLD.

In a process in which the AP 1 and the AP 2 perform backoff recovery, the channel contention solution in any one of the foregoing embodiments may be used for performing channel contention.

In this disclosure, embodiments of the fourth channel contention solution may be separately implemented, or may be implemented in combination with any one of embodiments of the first, second, and third channel contention solutions.

The channel contention solution in any one of the foregoing embodiments of this disclosure may also be applied to a scenario in which multiple primary channels are used for communication. In a scenario of multiple primary channel communication, data transmission bandwidth is divided into multiple frequency segments, and each frequency segment corresponds to one channel. Channels corresponding to at least two of the multiple frequency segments are primary channels. Each frequency segment is parked by one or more STAs. A STA that parks on a frequency segment corresponding to a primary channel can contend for a primary channel of the frequency segment on which the STA parks by using a solution in which an AP contends for a channel of a current link in the foregoing embodiments of the channel contention method.

In the foregoing embodiments provided in this disclosure, the method provided in embodiments of this disclosure is described from a perspective of an access point station or a non-access point station of an MLD. To implement the functions in the method provided in the embodiments of this disclosure, the access point station or the non-access point station of the MLD may include a hardware structure and a software module, and implement the foregoing functions in a form of the hardware structure, the software module, or a combination of the hardware structure and the software module. A function in the foregoing functions may be performed in a form of the hardware structure, the software module, or both the hardware structure and the software module.

Figure 20:
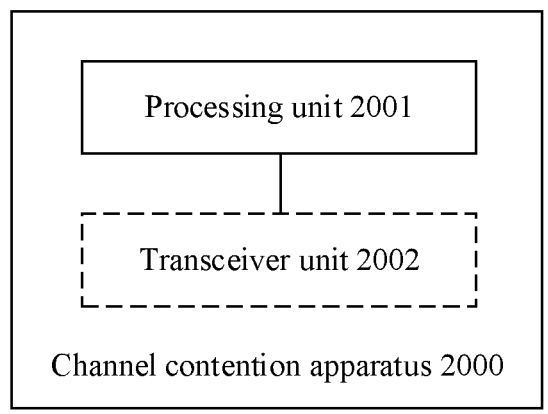
FIG. 20 is a schematic diagram of modules of a channel access apparatus according to an embodiment of this disclosure.

FIG. 20 is a schematic diagram of modules of a channel communication apparatus according to an embodiment of this disclosure. The channel contention apparatus 2000 in this embodiment of this disclosure may be applied to an MLD. The MLD includes a first station and a second station, a link on which the first station works is a first link, a link on which the second station works is a second link, and the first station and the second station are access point stations or non-access point stations. The channel contention apparatus may be deployed on the second station, and the channel contention apparatus 2000 includes a processing unit 2001 configured to, when contending for a second channel of the second link based on a first EDCA parameter set, if learning that at a first moment, a backoff count value of a first channel that is of the first link and that is contended by the first station backs off to 0, and the second channel is idle within one PIFS before the first moment, obtain a transmission opportunity of the second channel, and when obtaining the transmission opportunity of the second channel, generate a PIFS access timer, and start backoff of a count value of the PIFS access timer. Before the count value of the PIFS access timer backs off to 0, the second station performs channel contention based on a second EDCA parameter set, and at least one parameter of AIFSN, CWmax, or CWmin in the second EDCA parameter set is different from a corresponding parameter in the first EDCA parameter set.

Optionally, the channel contention apparatus 2000 may further include a transceiver unit 2002 configured to transmit data through the second channel when the transmission opportunity of the second channel is obtained.

The AP 1 in the foregoing channel contention method embodiments may be understood as the first station, and the AP 2 in the foregoing method embodiments may be understood as the second station.

In this way, a parameter in the second EDCA parameter set can be appropriately set, to increase a difficulty of successfully accessing a channel by the first station and the second station in subsequent channel contention, reduce a probability of successfully accessing the channel by the first station and the second station in subsequent channel contention, and increase a probability of successfully accessing the channel by another network device. This helps limit the second station to continue to perform PIFS access in next channel contention, and can improve fairness in an access process of multiple channels.

For example, AIFSN in the second EDCA parameter set is greater than AIFSN in the first EDCA parameter set, or CWmax in the second EDCA parameter set is greater than CWmax in the first EDCA parameter set, or CWmin in the second EDCA parameter set is greater than CWmin in the first EDCA parameter set. The second EDCA parameter set may meet one or more of the foregoing three cases.

In a possible implementation, the processing unit 2001 is further configured to, when contending for a fourth channel of the second link based on the second EDCA parameter set before the count value of the PIFS access timer backs off to 0, learn that a backoff count value of a third channel that is of the first link and that is contended by the first station at the second moment backs off to 0, and the fourth channel is idle within one PIFS before the first moment, and obtain a transmission opportunity of the fourth channel, and increase the count value of the PIFS access timer when obtaining the transmission opportunity of the fourth channel.

In another possible implementation, the processing unit 2001 is further configured to, when the second station contends for a fourth channel of the second link based on the second EDCA parameter set before the count value of the PIFS access timer backs off 0, if detecting that a count value for contending for the fourth channel backs off to 0 at a second moment, obtain a transmission opportunity of the fourth channel, and increase the count value of the PIFS access timer when learning that the first station accesses the contended channel at the second moment through PIFS access.

The third channel and the first channel in the foregoing two possible implementations may be a same channel or different channels, and the fourth channel and the second channel may be a same channel or different channels.

In the foregoing two possible implementations, after the first station obtains the transmission opportunity of the first channel and the second station obtains the transmission opportunity of the second channel, and before the PIFS access timers of the first station and the second station back off to 0, if the first station or the second station performs PIFS access again, count values of the PIFS access timers of the first station and the second station are increased, to prolong a backoff time of the PIFS access timers. In this way, backoff duration of the PIFS access timers is prolonged, so that duration in which the first station and the second station perform channel contention based on the second EDCA parameter set can be prolonged, to further increase a difficulty of successfully accessing a channel by the first station and the second station in subsequent channel contention, and increase a probability of successfully accessing the channel by another network device. This helps limit the second station to continue to perform PIFS access in next channel contention, and can improve fairness in an access process of multiple channels.

It should be understood that the AP 1 in the foregoing channel contention method may be understood as the first station in this embodiment, and the AP 2 in the foregoing channel contention method may be understood as the second station in this embodiment. Related descriptions of the foregoing embodiments of the channel contention method are also applicable to the channel contention apparatus in this embodiment, and details are not described herein again.

Figure 21:
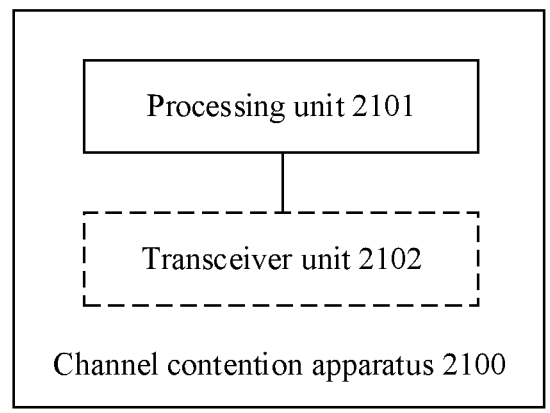
FIG. 21 is another schematic diagram of modules of a channel access apparatus according to an embodiment of this disclosure.

FIG. 21 is a schematic diagram of modules of a channel communication apparatus according to an embodiment of this disclosure. The channel contention apparatus 2100 in this embodiment of this disclosure may be applied to an MLD. The MLD includes a first station and a second station, a link on which the first station works is a first link, a link on which the second station works is a second link, and the first station and the second station are access point stations or non-access point stations. The channel contention apparatus may be deployed on the first station, and the channel contention apparatus 2100 includes a processing unit 2101 configured to, when contending for a first channel of the first link based on a first EDCA parameter set, detect, at a first moment, that a backoff count value of the contended first channel backs off to 0, and obtain a transmission opportunity of the first channel, and when learning that the second station accesses a second channel of the second link at the first moment through PIFS access, generate a PIFS access timer, and start backoff of a count value of the PIFS access timer. Before the count value of the PIFS access timer backs off to 0, the first station performs channel contention based on a second EDCA parameter set, and at least one parameter of AIFSN, CWmax, or CWmin in the second EDCA parameter set is different from a corresponding parameter in the first EDCA parameter set.

The first station in the foregoing channel contention method embodiments may be understood as the first station, and the second station in the foregoing method embodiments may be understood as the second station.

Optionally, the channel contention apparatus 2100 may further include a transceiver unit 2102 configured to transmit data through the first channel when the transmission opportunity of the first channel is obtained.

It can be learned that, in the technical solutions of this disclosure, when the first station performs EDCA access and the second station performs PIFS access, the first station and/or the second station generate/generates the PIFS access timer. In a backoff process before the PIFS access timer backs off to 0, a corresponding station performs channel contention based on the second EDCA parameter.

In this way, a parameter in the second EDCA parameter set can be appropriately set, to increase a difficulty of successfully accessing a channel by the first station and the second station in subsequent channel contention, reduce a probability of successfully accessing the channel by the first station and the second station in subsequent channel contention, and increase a probability of successfully accessing the channel by another network device. This helps limit the second station to continue to perform PIFS access in next channel contention, and can improve fairness in an access process of multiple channels.

For example, AIFSN in the second EDCA parameter set is greater than AIFSN in the first EDCA parameter set, or CWmax in the second EDCA parameter set is greater than CWmax in the first EDCA parameter set, or CWmin in the second EDCA parameter set is greater than CWmin in the first EDCA parameter set. The second EDCA parameter set may meet one or more of the foregoing three cases.

In a possible implementation, the processing unit 2101 is further configured to, when contending for a third channel of the first link based on the second EDCA parameter set before the PIFS access timer backs off to 0, if a backoff count value of the third channel contended by the first station backs off to 0 at a second moment, obtain a transmission opportunity of the third channel, and increase the count value of the PIFS access timer when learning that the second station accesses the fourth channel of the second link through PIFS access at the second moment.

In another possible implementation, the processing unit 2101 is further configured to, when contending for a third channel of the first link based on the second EDCA parameter set before the count value of the PIFS access timer backs off to 0, if learning that a backoff count value of a fourth channel that is of the second link and that is contended by the second station backs off to 0 at a second moment, and the third channel is idle within one PIFS before the second moment, obtain a transmission opportunity of the third channel, and increase the count value of the PIFS access timer when obtaining the transmission opportunity of the third channel.

The third channel and the first channel in the foregoing two possible implementations may be a same channel or different channels, and the fourth channel and the second channel may be a same channel or different channels.

In the foregoing two possible implementations, after the first station obtains the transmission opportunity of the first channel and the second station obtains the transmission opportunity of the second channel, and before the PIFS access timers of the first station and the second station back off to 0, if the first station or the second station performs PIFS access again, count values of the PIFS access timers of the first station and the second station are increased, to prolong a backoff time of the PIFS access timers. In this way, backoff duration of the PIFS access timers is prolonged, so that duration in which the first station and the second station perform channel contention based on the second EDCA parameter set can be prolonged, to further increase a difficulty of successfully accessing a channel by the first station and the second station in subsequent channel contention, and increase a probability of successfully accessing the channel by another network device. This helps limit the second station to continue to perform PIFS access in next channel contention, and can improve fairness in an access process of multiple channels.

It should be understood that the AP 1 in the foregoing channel contention method may be understood as the first station in this embodiment, and the AP 2 in the foregoing channel contention method may be understood as the second station in this embodiment. Related descriptions of the foregoing embodiments of the channel contention method are also applicable to the channel contention apparatus in this embodiment, and details are not described herein again.

Figure 22:
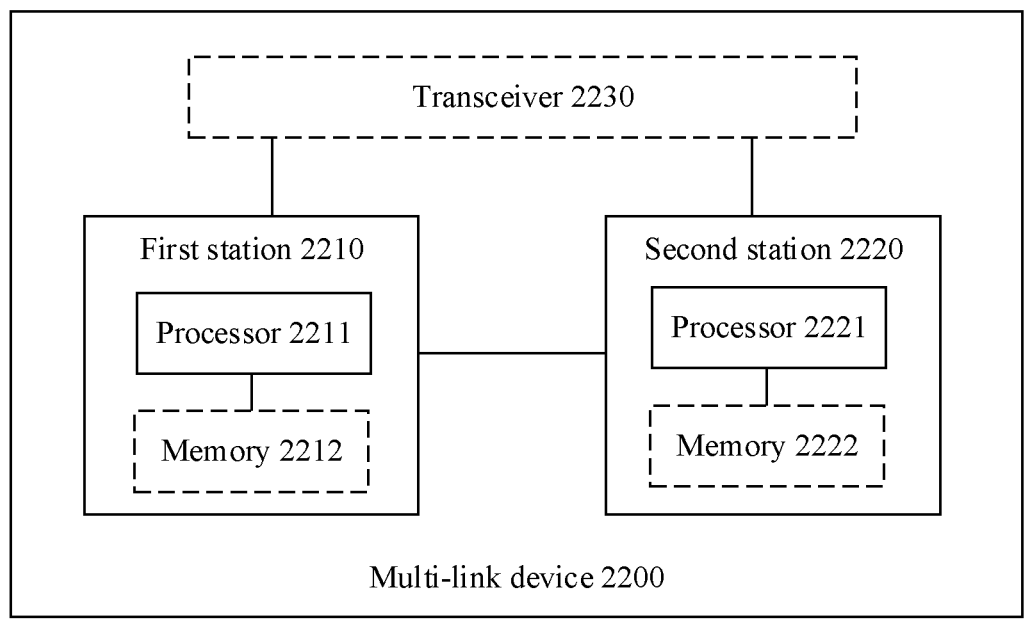
FIG. 22 is a schematic diagram of a structure of an MLD according to an embodiment of this disclosure.

FIG. 22 is a schematic diagram of a structure of an MLD according to an embodiment of this disclosure. The MLD 2200 includes a first station 2210 and a second station 2220. A link on which the first station 2210 works is a first link, a link on which the second station 2220 works is a second link. The first station 2210 and the second station 2220 are access point stations or non-access point stations.

The first station 2210 includes a processor 2211. The processor 2211 is coupled to the memory 2212. When the processor 2211 executes a computer program or instructions in the memory 2212, the first station is enabled to perform the steps that can be performed by the AP 1 in any one of the foregoing method embodiments. When the channel contention apparatus 2100 is deployed on the first station 2210, the processing unit 2101 may be understood as the processor 2211.

The second station 2220 includes a processor 2221. The processor 2221 is coupled to the memory 2222. When the processor 2221 executes a computer program or instructions in the memory 2222, the first station is enabled to perform steps that can be performed by the AP 2 in any one of the foregoing method embodiments. When the channel contention apparatus 2000 is deployed on the second station 2310, the processing unit 2001 may be understood as the processor 2311.

The first station 2210 and the second station 2220 may share one memory.

The foregoing processor is a central processing unit (CPU), an application-specific integrated circuit (ASIC), or one or more integrated circuits configured to implement this embodiment of this disclosure, for example, one or more microprocessors (or digital signal processor (DSP)), or one or more field-programmable gate arrays (FPGA). The processor may perform various functions of the station by running or executing a software program stored in the memory and invoking data stored in the memory.

The memory may be a ROM or another type of static storage communication device that can store static information and instructions, or a random-access memory (RAM) or another type of dynamic storage communication device that can store information and instructions, or may be an electrically erasable programmable ROM (EEPROM), a compact disc (CD) ROM (CD-ROM) or other compact disc storage, optical disc storage (including a CD, a laser disc, an optical disc, a DIGITAL VERSATILE DISC (DVD), a BLU-RAY disc, and the like), a magnetic disk storage medium or another magnetic storage communication device, or any other medium that can be used to carry or store expected program code in an instruction form or a data structure form and that can be accessed by a computer. However, the memory is not limited thereto.

The MLD may further include a transceiver 2230, and the transceiver 2230 is configured to communicate with another device. Certainly, the transceiver 2230 may be further configured to communicate with a communication network, for example, the Ethernet, a radio access network (RAN), or a wireless local area network (WLAN). The transceiver 2230 may include a receiving unit to implement a receiving function, and a sending unit to implement a sending function.

An embodiment of this disclosure further provides a chip system. The chip system includes a processor and an interface configured to support a communication transmission device in implementing functions in the foregoing channel contention method, for example, determining or processing at least one of data and information in the foregoing methods. In a possible design, the chip system further includes a memory, and the memory is configured to store information and data that are necessary for the channel contention apparatus. The chip system may include a chip, or may include a chip and another discrete component.

This disclosure further provides a computer-readable storage medium. The computer-readable storage medium stores a computer program. When the computer-readable storage medium is executed by a computer, functions of any one of the method embodiments are implemented.

This disclosure further provides a computer program product. When the computer program product is executed by a computer, functions of any one of the foregoing method embodiments are implemented.

It should be further understood that "first", "second", "third", "fourth", and various numbers in this specification are merely used for differentiation for ease of description, and are not intended to limit the scope of this disclosure.

It should be understood that the term "and/or" in this specification describes only an association relationship between associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of embodiments of this disclosure.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in embodiments of this disclosure. The foregoing storage medium includes any medium that can store program code, such as a Universal Serial Bus (USB) flash drive, a removable hard disk, a ROM, a RAM, a magnetic disk, or an optical disc.

A sequence of the steps of the method in embodiments of this disclosure may be adjusted, combined, or removed based on an actual requirement.

The modules in the apparatus in embodiments of this disclosure may be combined, divided, and deleted based on an actual requirement.

In conclusion, the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

What is claimed is:

1. A method implemented by a multi-link device (MLD), wherein the method comprises:
when a first station of the MLD contends for a first channel of a first link based on a first enhanced distributed channel access (EDCA) parameter set:
detecting, by the first station at a first moment, that a first backoff count value of the first channel backs off to 0, wherein the first station works on the first link, and wherein the first station is a first access point station or a first non-access point station; and
obtaining, by the first station, a first transmission opportunity of the first channel;
when a second station contends for a second channel of a second link based on the first EDCA parameter set:
learning, by the second station, that at the first moment, the first backoff count value backs off to 0, wherein the second station works on the second link, and wherein the second station is a second access point station or a second non-access point station;
sensing, by the second station, that the second channel is idle within one point coordination function (PCF) inter-frame space (PIFS) before the first moment; and
obtaining, by the second station, a second transmission opportunity of the second channel,
wherein at least one parameter of a first arbitration inter-frame space number (AIFSN), a first maximum contention window (CWmax), or a first minimum contention window (CWmin) in a second EDCA parameter set is different from a corresponding parameter in the first EDCA parameter set, and
wherein in response to the second station obtaining the second transmission opportunity, the method further comprises at least one of:
generating, by the first station, a first PIFS access timer of the first station, starting, by the first station, a first backoff of a first count value of the first PIFS access timer, and performing, by the first station, first channel contention based on the second EDCA parameter set within a first backoff time before the first count value of the first PIFS access timer backs off to 0; or
generating, by the second station, a second PIFS access timer of the second station, starting, by the second station, a second backoff of a second count value of the second PIFS access timer, and performing, by the second station, second channel contention based on the second EDCA parameter set within a second backoff time before the second count value backs of the second PIFS access timer off to 0.

2. The method of claim 1, wherein the first AIFSN is greater than a second AIFSN in the first EDCA parameter set, wherein the first CWmax is greater than a second CWmax in the first EDCA parameter set, and wherein the first CWmin is greater than a second CWmin in the first EDCA parameter set.

3. The method of claim 1, further comprising:
contending, by the second station, for a fourth channel of the second link based on the second EDCA parameter set within the second backoff time before the second count value backs off to 0;
obtaining, by the second station, a third transmission opportunity of the fourth channel when a second backoff count value of the fourth channel backs off to 0 at a second moment and in response to contending for the fourth channel;
within the first backoff time before the first count value backs off to 0:
learning, by the first station, that the second backoff count value backs off to 0 at the second moment;
sensing, by the first station, that a third channel of the first link is idle within one PIFS before the second moment;
accessing, by the first station and in response to learning that the second backoff count value backs off to 0 and sensing that the third channel is idle, the third channel through PIFS access; and
increasing, by the first station and in response to learning that the second backoff count value backs off to 0 and sensing that the third channel is idle, the first count value;
learning, by the second station, that the first station accesses the third channel at the second moment through the PIFS access; and
increasing, by the second station and in response to learning that the first station accesses the third channel, the second count value,
wherein the third channel and the first channel are the same, and
wherein the fourth channel and the second channel are the same.

4. The method of claim 1, further comprising:
contending, by the first station, for a third channel of the first link based on the second EDCA parameter set within the first backoff time before the first count value backs off to 0;
identifying, by the first station, that a second backoff count value of the third channel backs off to 0 at a second moment;
obtaining, by the first station in response to contending for the third channel and identifying that the second backoff count value backs off to 0 at the second moment, a third transmission opportunity of the third channel;
within the second backoff time before the second count value backs off to 0:
learning, by the second station, that the second backoff count value backs off to 0 at the second moment;
sensing, by the second station, that a fourth channel of the second link is idle within one PIFS before the second moment;
accessing, by the second station in response to learning that the second backoff count value backs off to 0 at the second moment and sensing that the fourth channel is idle, the fourth channel through PIFS access; and
increasing, by the second station in response to learning that the second backoff count value backs off to 0 at the second moment and sensing that the fourth channel is idle, the second count value;
learning, by the first station, that the second station accesses the fourth channel at the second moment through the PIFS access; and
increasing, by the first station, the first count value, wherein the third channel and the first channel are the same, and
wherein the fourth channel and the second channel are the same.

5. The method of claim 1, wherein the first AIFSN is greater than a second AIFSN in the first EDCA parameter set, wherein the first CWmax is greater than a second CWmax in the first EDCA parameter set, or wherein the first CWmin is greater than a second CWmin in the first EDCA parameter set.

6. The method of claim 1, further comprising:
contending, by the second station, for a fourth channel of the second link based on the second EDCA parameter set within the second backoff time before the second count value backs off to 0;
obtaining, by the second station, a third transmission opportunity of the fourth channel when a second backoff count value of the fourth channel backs off to 0 at a second moment and in response to contending for the fourth channel;
within the first backoff time before the first count value backs off to 0:
learning, by the first station, that the second backoff count value backs off to 0 at the second moment;
sensing, by the first station, that a third channel of the first link is idle within one PIFS before the second moment;
accessing, by the first station and in response to learning that the second backoff count value backs off to 0 and sensing that the third channel is idle, the third channel through PIFS access; and
increasing, by the first station and in response to and in response to learning that the second backoff count value backs off to 0 and sensing that the third channel is idle, the first count value;
learning, by the second station, that the first station accesses the third channel at the second moment through the PIFS access; and
increasing, by the second station and in response to learning that the first station accesses the third channel, the second count value,
wherein the third channel and the first channel are first different channels, and
wherein the fourth channel and the second channel are second different channels.

7. The method of claim 1, further comprising:
contending, by the first station, for a third channel of the first link based on the second EDCA parameter set within the first backoff time before the first count value backs off to 0;
identifying that a second backoff count value of the third channel backs off to 0 at a second moment;
obtaining, by the first station in response to contending for the third channel and identifying that the second backoff count value backs off to 0 at the second moment, a third transmission opportunity of the third channel;
within the second backoff time before the second count value backs off to 0:
learning, by the second station, that the second backoff count value backs off to 0 at the second moment;
sensing, by the second station, that a fourth channel of the second link is idle within one PIFS before the second moment;
accessing, by the second station in response to learning that the second backoff count value backs off to 0 at the second moment and sensing that the fourth channel is idle, the fourth channel through PIFS access; and
increasing, by the second station in response to learning that the second backoff count value backs off to 0 at the second moment and sensing that the fourth channel is idle, the second count value;
learning, by the first station, that the second station accesses the fourth channel at the second moment through the PIFS access; and
increasing, by the first station, the first count value,
wherein the third channel and the first channel are first different channels, and
wherein the fourth channel and the second channel are second different channels.

8. A method implemented by a second station of a multi-link device (MLD), wherein the method comprises:
when the second station contends for a second channel of a second link based on a first enhanced distributed channel access (EDCA) parameter set:
learning that at a first moment, a first backoff count value of a first channel that is of a first link and that is contended by a first station of the MLD backs off to 0 and the second channel is idle within one point coordination function (PCF) inter-frame space (PIFS) before the first moment, wherein the first station works on the first link, wherein the second station works on the second link, and wherein the first station and the second station are access point stations or non-access point stations; and
obtaining a first transmission opportunity of the second channel; and
when obtaining the first transmission opportunity:
generating a PIFS access timer;
starting backoff of a count value of the PIFS access timer; and
performing channel contention based on a second EDCA parameter set before the count value of the PIFS access timer backs off to 0,
wherein at least one parameter of first arbitration inter-frame space number (AIFSN), a first maximum contention window (CWmax), or a first minimum contention window (CWmin) in the second EDCA parameter set is different from a corresponding parameter in the first EDCA parameter set.

9. The method of claim 8, wherein the first AIFSN is greater than a second AIFSN in the first EDCA parameter set, wherein the first CWmax is greater than a second CWmax in the first EDCA parameter set, and wherein the first CWmin is greater than a second CWmin in the first EDCA parameter set.

10. The method of claim 8, further comprising:
contending for a fourth channel of the second link based on the second EDCA parameter set before the count value backs off to 0;
learning, in response to contending for the third channel, that a second backoff count value of a third channel that is of the first link and that is contended by the first station at the second moment backs off to 0 and the fourth channel is idle within one PIFS before the first moment;
obtaining a second transmission opportunity of the fourth channel; and
increasing the count value in response to obtaining the second transmission opportunity,
wherein the third channel and the first channel are the same or are first different channels, and wherein the fourth channel and the second channel are the same or are second different channels.

11. The method of claim 8, further comprising:
contending for a third channel of the second link based on the second EDCA parameter set before the count value backs off 0;
detecting, in response to contending for the third channel, that a second count value for contending for the third channel backs off to 0 at a second moment;
obtaining, in response to contending for the third channel, a second transmission opportunity of the fourth channel;
learning that the first station accesses the first channel at the second moment through PIFS access; and
increasing, in response to learning that the first station accesses the first channel, the count value,
wherein the third channel and the second channel are the same or different channels.

12. The method of claim 8, wherein the first AIFSN is greater than a second AIFSN in the first EDCA parameter set, wherein the first CWmax is greater than a second CWmax in the first EDCA parameter set, or wherein the first CWmin is greater than a second CWmin in the first EDCA parameter set.

13. A method implemented by a first station of a multi-link device (MLD), wherein the method comprises:
when the first station contends for a first channel of a first link based on a first enhanced distributed channel access (EDCA) parameter set:
detecting, at a first moment, that a first backoff count value of the first channel backs off to 0, wherein the first station works on the first link, and wherein the first station is a first access point station or a first non-access point station;
obtaining a first transmission opportunity of the first channel; and
when the first station learns that the second station accesses a second channel of a second link at the first moment through point coordination function (PCF) inter-frame space (PIFS) access:
generating a PIFS access timer;
starting backoff of a count value of the PIFS access timer; and
performing channel contention based on a second EDCA parameter set before the count value of the PIFS access timer backs off to 0,
wherein at least one parameter of first arbitration inter-frame space number (AIFSN), a first maximum contention window (CWmax), or a first minimum contention window (CWmin) in the second EDCA parameter set is different from a corresponding parameter in the first EDCA parameter set.

14. The method of claim 13, wherein the first AIFSN is greater than a second AIFSN in the first EDCA parameter set, wherein the first CWmax is greater than a second CWmax in the first EDCA parameter set, or wherein the first CWmin is greater than a second CWmin in the first EDCA parameter set.

15. The method of claim 13, further comprising:
contending for a third channel of the first link based on the second EDCA parameter set before the PIFS access timer backs off to 0;
obtaining a second transmission opportunity of the third channel when a second backoff count value of the third channel backs off to 0 at a second moment and in response to contending for the third channel;
learning that the second station accesses a fourth channel of the second link at the second moment through PIFS access;
increasing, in response to learning that the second station accesses the fourth channel, the count value,
wherein the third channel and the first channel are the same or first different channels, and
wherein the fourth channel and the second channel are the same or second different channels.

16. The method of claim 13, further comprising:
contending for a third channel of the first link based on the second EDCA parameter set before the count value backs off to 0;
learning, in response to contending for the third channel, that a second backoff count value of a fourth channel that is of the second link and that is contended by the second station backs off to 0 at a second moment and the third channel is idle within one PIFS before the second moment;
obtaining, in response to contending for the third channel, a second transmission opportunity of the third channel; and
increasing the count value in response to obtaining the second transmission opportunity,
wherein the third channel and the first channel are the same or first different channels, and
wherein the fourth channel and the second channel are the same or second different channels.

17. A multi-link device (MLD) comprising:
a first station configured to:
when contending for a first channel of a first link based on a first enhanced distributed channel access (EDCA) parameter set:
detect, at a first moment, that a first backoff count value of the first channel backs off to 0, wherein the first station works on the first link, and wherein the first station is a first access point station or a first non-access point station; and
obtain a first transmission opportunity of the first channel; and
a second station coupled to the first station and configured to:
when contending for a second channel of a second link based on the first EDCA parameter set:
learn that at the first moment, the first backoff count value backs off to 0, wherein the second station works on the second link, and wherein the second station is a second access point station or a second non-access point station;
sense that the second channel is idle within one point coordination function (PCF) inter-frame space (PIFS) before the first moment; and
obtain a second transmission opportunity of the second channel,
wherein in response to the second station obtaining the second transmission opportunity, the first station is further configured to:
generate a first PIFS access timer of the first station;
start first backoff of a first count value of the first PIFS access timer; and
perform first channel contention based on a second EDCA parameter set within a first backoff time before the first count value of the first PIFS access timer backs off to 0, or
wherein in response to the second station obtaining the second transmission opportunity, the second station is further configured to:

generate a second PIFS access timer of the second station;

start second backoff of a second count value of the second PIFS access timer; and perform second channel contention based on the second EDCA parameter set within a second backoff time before the second count value of the second PIFS access timer backs off to 0, wherein at least one parameter of a first arbitration inter-frame space number (AIFSN), a first maximum contention window (CWmax), or a first minimum contention window (CWmin) in the second EDCA parameter set is different from a corresponding parameter in the first EDCA parameter set.

18. The MLD of claim 17, wherein the first AIFSN is greater than a second AIFSN in the first EDCA parameter set, wherein the first CWmax is greater than a second CWmax in the first EDCA parameter set, or wherein the first CWmin is greater than a second CWmin in the first EDCA parameter set.

19. The MLD of claim 17, wherein the second station is further configured to:

contend for a fourth channel of the second link based on the second EDCA parameter set within the second backoff time before the second count value backs off to 0;

obtain a third transmission opportunity of the fourth channel when a second backoff count value of the fourth channel backs off to 0 at a second moment and in response to contending for the fourth channel, wherein within the first backoff time before the first count value backs off to 0, the first station is further configured to:

learn that the second backoff count value backs off to 0 at the second moment;

sense that a third channel of the first link is idle within one PIFS before the second moment;

access, in response to learning that the second backoff count value backs off to 0 and sensing that the third channel is idle, the third channel through PIFS access; and increase, in response to learning that the second backoff count value backs off to 0 and sensing that the third channel is idle, the first count value, and wherein the second station is further configured to:

learning that the first station accesses the third channel at the second moment through the PIFS access; and increase, in response to learning that the first station accesses the third channel, the second count value, wherein the third channel and the first channel are the same or are first different channels, and wherein the fourth channel and the second channel are the same or are second different channels.

20. The MLD of claim 17, wherein the first station is further configured to:

contend for a third channel of the first link based on the second EDCA parameter set within the first backoff time before the first count value backs off to 0;

identify that a second backoff count value of the third channel backs off to 0 at a second moment; and obtain, in response to contending for the third channel and identifying that the second backoff count value backs off to 0 at the second moment, a third transmission opportunity of the third channel, wherein within the second backoff time before the second count value backs off to 0, the second station is further configured to:

learn that the second backoff count value backs off to 0 at the second moment;

sense that a fourth channel of the second link is idle within one PIFS before the second moment;

access, in response to learning that the second backoff count value backs off to 0 at the second moment and sensing that the fourth channel is idle, the fourth channel through PIFS access; and increase, in response to learning that the second backoff count value backs off to 0 at the second moment and sensing that the fourth channel is idle, the second count value, and wherein the first station is further configured to:

learn that the second station accesses the fourth channel at the second moment through the PIFS access; and increase, in response to learning that the second station accesses the fourth channel, the first count value, wherein the third channel and the first channel are the same or are first different channels, and wherein the fourth channel and the second channel are the same or are second different channels.

* * * * *